US012764811B2

(12) United States Patent
Hui

(10) Patent No.: US 12,764,811 B2
(45) Date of Patent: Oct. 13, 2026

(54) WIRELESS NETWORK CONFIGURATION METHOD AND APPARATUS WITH ADAPTIVE POWER CONTROL

(71) Applicant: Huawei Technologies Co., Ltd., Shenzhen (CN)

(72) Inventor: Shaobo Hui, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 265 days.

(21) Appl. No.: 18/580,059

(22) PCT Filed: Jul. 21, 2022

(86) PCT No.: PCT/CN2022/107193
§ 371 (c)(1),
(2) Date: Jan. 17, 2024

(87) PCT Pub. No.: WO2023/001254
PCT Pub. Date: Jan. 26, 2023

(65) Prior Publication Data

US 2024/0349369 A1 Oct. 17, 2024

(30) Foreign Application Priority Data

Jul. 23, 2021 (CN) ......................... 202110835621.1

(51) Int. Cl.
*H04W 76/14* (2018.01)
*H04W 24/08* (2009.01)
(Continued)

(52) U.S. Cl.
CPC ........... *H04W 76/14* (2018.02); *H04W 24/08* (2013.01); *H04W 40/10* (2013.01); *H04W 84/12* (2013.01)

(58) Field of Classification Search
CPC ......... H04L 12/2807; H04L 2012/2841; H04L 2012/2849; H04L 2012/285; H04W 24/08;
(Continued)

(56) References Cited

U.S. PATENT DOCUMENTS

| | | | | |
|---|---|---|---|---|
| 9,819,901 | B1 * | 11/2017 | Zhu | H04W 52/46 |
| 10,405,366 | B1 * | 9/2019 | Liu | H04W 76/15 |

(Continued)

FOREIGN PATENT DOCUMENTS

| | | |
|---|---|---|
| CN | 112286147 A | 1/2021 |
| WO | 2016065644 A1 | 5/2016 |

OTHER PUBLICATIONS

IEEE Standard for a Convergent Digital Home Network for Heterogeneous Technologies, IEEE Communications Society, IEEE Std 1905.1-2013, Apr. 12, 2013, total 93 pages.

*Primary Examiner* — Dung B Huynh
(74) *Attorney, Agent, or Firm* — Slater Matsil, LLP

(57) ABSTRACT

After discovering an electronic device in a to-be-network-configured state, a wireless access device sends, at ultra-low power, a name of a wireless local area network in which the wireless access device is located to an electronic device, and/or sends, at ultra-low power, a message in response to a network configuration request to the electronic device. After the electronic device receives the name of the wireless local area network in which the wireless access device is located and the message in response to the network configuration request which are sent by the wireless access device, the electronic device negotiates with the wireless access device to transmit a password of the wireless local area network in which the wireless access device is located, and is connected to the wireless access device based on the name and the (Continued)

password of the wireless local area network in which the wireless access device is located.

20 Claims, 22 Drawing Sheets

(51) Int. Cl.
*H04W 40/10* (2009.01)
*H04W 84/12* (2009.01)

(58) Field of Classification Search
CPC ....... H04W 4/80; H04W 40/10; H04W 48/08; H04W 52/288; H04W 52/42; H04W 52/50; H04W 76/10; H04W 76/14; H04W 84/12
See application file for complete search history.

(56) References Cited

U.S. PATENT DOCUMENTS 10,716,075 B1 * 7/2020 Choi ................... H04W 52/367
10,887,837 B1 * 1/2021 Chu .................. H04W 52/0229
10,986,563 B2 * 4/2021 Boodannavar ...... H04W 12/062
11,251,960 B1 * 2/2022 Wei ....................... H04W 12/04
11,405,789 B1 * 8/2022 Wei ......................... H04W 4/50
11,778,663 B1 * 10/2023 Jiang ................. H04W 74/0816 370/445
2001/0024953 A1 * 9/2001 Balogh ................... H04L 45/00 455/560
2005/0135624 A1 * 6/2005 Tsai .................... H04L 63/0853 380/270
2006/0040663 A1 * 2/2006 Ise ........................ H04W 88/08 455/434
2006/0209720 A1 * 9/2006 Nelson .................... H04L 45/16 370/254
2009/0054096 A1 * 2/2009 Single ................. H04W 52/325 455/509
2010/0039969 A1 2/2010 Sukenari et al.
2010/0215025 A1 * 8/2010 Fujii ..................... H04L 63/083 370/338
2012/0033568 A1 * 2/2012 Park ...................... H04W 76/14 370/252
2012/0322391 A1 * 12/2012 Suzuki .................. H04W 76/10 455/68
2013/0044739 A1 * 2/2013 Huang .............. H04W 52/0216 370/338
2013/0065585 A1 * 3/2013 Pelletier ............. G06Q 30/0267 455/456.6
2013/0229930 A1 * 9/2013 Akay .................... H04W 12/64 370/252
2014/0297820 A1 * 10/2014 Grubis .................. H04W 12/02 709/222
2015/0003433 A1 * 1/2015 Sinha ...................... H04L 63/18 370/338
2015/0098377 A1 * 4/2015 Amini ................... H04W 76/10 370/311
2015/0146548 A1 * 5/2015 Wang .................... H04W 52/04 370/252
2015/0200710 A1 * 7/2015 Wilczewski .......... H04W 28/04 375/133
2015/0223047 A1 * 8/2015 Abraham .......... H04W 52/0216 370/328
2015/0245268 A1 * 8/2015 Williams .............. H04W 36/22 370/331
2015/0264514 A1 * 9/2015 Qi ........................... H04W 4/70 370/338
2016/0037444 A1 * 2/2016 Jung ................. H04W 52/0203 370/338
2016/0057677 A1 * 2/2016 Williams .............. H04W 36/18 370/331
2016/0080591 A1 * 3/2016 Asakura .................. H04W 4/80 358/1.15
2016/0127996 A1 * 5/2016 Patil ...................... H04W 48/16 370/311
2016/0353382 A1 * 12/2016 Xue .................. H04W 52/0251
2017/0006643 A1 * 1/2017 Zakaria ................. H04W 12/50
2017/0048705 A1 * 2/2017 Fujita .................. H04W 12/069
2017/0048783 A1 * 2/2017 Savolainen ........... H04W 84/18
2017/0134365 A1 * 5/2017 Li ......................... H04L 63/083
2017/0181059 A1 * 6/2017 Townend .............. H04W 24/06
2017/0223610 A1 * 8/2017 Qi ........................... H04W 4/80
2017/0250737 A1 * 8/2017 Rivière .................. H04B 7/028
2017/0265244 A1 * 9/2017 Nogawa ................ H04W 12/06
2017/0303320 A1 * 10/2017 Meng ................. H04W 12/068
2017/0311143 A1 * 10/2017 Yamaura ................. H04W 8/00
2017/0339737 A1 * 11/2017 Shimazaki ............ H04L 67/141
2018/0217789 A1 * 8/2018 Tsuji ....................... H04W 4/80
2018/0248697 A1 * 8/2018 Shimada ............... G06F 3/1204
2018/0263078 A1 * 9/2018 Asakura .................. H04W 8/24
2018/0279033 A1 * 9/2018 Gunasekara ......... H04R 1/1016
2018/0285035 A1 * 10/2018 Asakura ................ G06F 3/1286
2018/0288820 A1 * 10/2018 Shibata ................. H04W 76/14
2018/0376284 A1 * 12/2018 Soro ....................... H04W 4/80
2019/0023140 A1 * 1/2019 Kim ........................ B60L 53/12
2019/0069340 A1 * 2/2019 Wang .................... H04W 88/04
2019/0089686 A1 * 3/2019 Jung ..................... H04W 76/14
2019/0104454 A1 * 4/2019 Shibata ................. H04W 76/14
2019/0104463 A1 * 4/2019 Khoury ................. H04W 48/14
2019/0200289 A1 * 6/2019 Panje ................ H04W 52/0209
2019/0208512 A1 * 7/2019 Hirvi ....................... H04W 4/06
2019/0223101 A1 * 7/2019 Li ..................... H04W 52/0229
2019/0306702 A1 * 10/2019 Yoon ..................... H04W 92/10
2019/0306707 A1 * 10/2019 Shibata ............. H04W 12/0431
2019/0334766 A1 * 10/2019 Lee ......................... H04L 49/25
2020/0059861 A1 * 2/2020 Huang .............. H04W 72/0446
2020/0112924 A1 * 4/2020 Takahashi ........... H04W 52/322
2020/0280932 A1 * 9/2020 Down ................. H04W 52/283
2020/0351247 A1 * 11/2020 Song ..................... H04W 12/06
2020/0359413 A1 * 11/2020 Bohn .................... H04W 74/04
2021/0014732 A1 * 1/2021 Chen ................. H04W 28/0861
2021/0068179 A1 * 3/2021 Takeuchi .............. G06F 3/1292
2021/0099950 A1 * 4/2021 Shibata ................. H04L 9/3247
2021/0120483 A1 * 4/2021 Hodoshima ........... H04W 48/20
2021/0125143 A1 * 4/2021 Bartlett .............. G06Q 10/0832
2021/0152421 A1 * 5/2021 Wang .................... H04L 63/083
2021/0176703 A1 * 6/2021 Shibuya ................ H04W 76/10
2021/0266989 A1 * 8/2021 Rooney ................. H04W 24/02
2021/0329462 A1 * 10/2021 Bernsen ................ H04W 12/02
2022/0174455 A1 * 6/2022 Guillaume .............. H04W 4/06
2022/0210717 A1 * 6/2022 Sun ....................... H04W 76/14
2022/0248344 A1 * 8/2022 Kalavakuru ........ H04W 52/242
2022/0400365 A1 * 12/2022 Bains ...................... H04W 4/80
2023/0171575 A1 * 6/2023 Thubert ................ H04W 48/18 370/255
2023/0199509 A1 * 6/2023 Liu ....................... H04W 16/14 370/329
2024/0107345 A1 * 3/2024 Lopez ................... H04W 24/08

* cited by examiner

User interface 40

WIRELESS NETWORK CONFIGURATION METHOD AND APPARATUS WITH ADAPTIVE POWER CONTROL

CROSS-REFERENCE TO RELATED APPLICATIONS

This application is a national stage of International Application No. PCT/CN2022/107193, filed on Jul. 21, 2022, which claims priority to Chinese Patent Application No. 202110835621.1, filed on Jul. 23, 2021. Both of the aforementioned applications are hereby incorporated by reference in their entireties.

TECHNICAL FIELD

This application relates to the field of communication technologies, and in particular, to a network configuration method and an apparatus.

BACKGROUND

With development of the Internet, people have increasing requirements for a wireless network, and network configuration is often required for an electronic device, so that the electronic device accesses a wireless network and can access the Internet. For example, when a new router is accessed to a network-configured router as a slave router, a user needs to observe a blinking status of an indicator light of the router, to press a network configuration button of the router in time. Alternatively, a user needs to perform a series of network configuration operations by using a display interface of an electronic device with a screen, to perform network configuration for the new router, and consequently, an operation procedure is complex. For another example, when a mobile phone accesses a wireless network for the first time, the user needs to select the correct wireless network from a wireless network list based on a name of the wireless network, and then manually enter a password of the wireless network. Consequently, the entire operation process is complex and error-prone, resulting in poor user experience. Currently, there is no network configuration method that is simple to operate to complete network configuration of the electronic device.

SUMMARY

This application provides a network configuration method and an apparatus, so that an electronic device can automatically establish a wireless local area network connection to a wireless access device when the electronic device is close to the wireless access device, and a distance between the electronic device and the wireless access device is close enough (for example, within a first distance), and a user operation is simple.

According to a first aspect, this application provides a network configuration method, where the method is applied to a system including an electronic device and a wireless access device, and the method includes: The electronic device sends a probe request frame; the wireless access device receives and responds to the probe request frame sent by the electronic device, and sends a probe response frame to the electronic device at first power by using a first antenna; the electronic device establishes a wireless local area network connection to the wireless access device after receiving the probe response frame; and after the electronic device establishes the wireless local area network connection to the wireless access device, the wireless access device sends a data frame to the electronic device at second power by using a second antenna, where the first antenna and the second antenna are a same antenna or two antennas, and the first power is less than the second power.

The electronic device may be a smart home device, and the smart home device may be any one of the following: a smart light, a smart oven, a smart fan, a smart air conditioner, a smart television, a smart large screen, a smart band, a smart watch, a smart speaker, a smart refrigerator, a smart door or window, a smart car, a smart monitor, a smart robot, a smart camera, or the like.

The electronic device may be a terminal device, and the terminal device may be any one of the following: a mobile phone, a tablet computer, a smart screen, a desktop computer, a laptop computer, a handheld computer, a notebook computer, an ultra-mobile personal computer UMPC, or a netbook.

The electronic device may alternatively be a wireless access device, for example, a router.

According to the method in the first aspect, first, it is implemented that a user does not need to perform manual intervention on the wireless access device or manually enter a primary router password on the electronic device, and only needs to make the electronic device close to the wireless access device, so that when a distance between the electronic device and the wireless access device is close enough (for example, within a first distance), the electronic device can automatically establish a wireless local area network connection to the wireless access device, and a user operation is simple. Second, the wireless access device sends a message to an electronic device that is being network-configured only at ultra-low power (namely, the first power) in the network configuration process, and when the wireless access device sends the message to the electronic device at the ultra-low power (namely, the first power), the wireless access device may send a message to another electronic device that is connected to the wireless access device at normal power (namely, the second power). In this way, normal services of the another electronic device connected to the wireless access device are not affected.

With reference to the first aspect, in a possible implementation, a coverage area of a signal that is sent by the wireless access device at the first power by using the first antenna is less than a coverage area of a signal that is sent by the wireless access device at the second power by using the second antenna. The wireless access device sends the probe response frame at ultra-low power (namely, the first power) only in the network configuration process. In this way, the probe response frame sent by the wireless access device at the ultra-low power (namely, the first power) can be received only when the distance between the electronic device and the wireless access device is close enough.

With reference to the first aspect, in a possible implementation, when a distance between the electronic device and the wireless access device is less than a first distance, the electronic device is at a location at which the probe response frame and the data frame can be received; and when the distance between the electronic device and the wireless access device is greater than the first distance, the electronic device is at a location at which the probe response frame cannot be received but the data frame can be received. In this way, in the network configuration process, only when the distance between the electronic device and the wireless access device is close enough (for example, within the first distance), it may be considered that the electronic device has an intention of joining a wireless local area network in which the wireless access device is located. In this case, the electronic device can complete the network configuration process with the wireless access device.

With reference to the first aspect, in a possible implementation, when the distance between the electronic device and the wireless access device is less than the first distance and a location of the electronic device is not moved, power of the probe response frame received by the electronic device is lower than power of the data frame received by the electronic device. In this way, in the network configuration process, the wireless access device sends the probe response frame at the ultra-low power (namely, the first power), to ensure that only an electronic device close to the wireless access device can receive the probe response frame. After the network configuration is completed, when the location of the electronic device is not moved, the electronic device receives, at a same location, a data frame sent by the wireless access device at the normal power (namely, the second power). The power of the probe response frame received by the electronic device is lower than the power of the received data frame.

Optionally, when the wireless access device sends the probe response frame at the ultra-low power (namely, the first power), power of a power supply signal of a radio frequency link in the wireless access device is third power. When the wireless access device sends the data frame at the normal power (namely, the second power), the power of the power supply signal of the radio frequency link in the wireless access device is fourth power. The third power is less than the fourth power.

With reference to the first aspect, in a possible implementation, the probe request frame includes a first probe request frame and a second probe request frame, and the probe response frame includes a first probe response frame and a second probe response frame. That the electronic device sends a probe request frame includes: The electronic device sends the first probe request frame. That the wireless access device receives and responds to the probe request frame sent by the electronic device, and sends a probe response frame to the electronic device at first power by using a first antenna includes: The wireless access device receives and responds to the first probe request frame sent by the electronic device, and sends the first probe response frame to the electronic device at the first power by using the first antenna. That the electronic device sends a probe request frame further includes: The electronic device receives and responds to the first probe response frame sent by the wireless access device, and sends the second probe request frame to the wireless access device. That the wireless access device receives and responds to the probe request frame sent by the electronic device, and sends a probe response frame to the electronic device at first power by using a first antenna further includes: The wireless access device receives and responds to the second probe request frame sent by the electronic device, and sends the second probe response frame to the electronic device at the first power by using the first antenna.

That is, in the network configuration process, the wireless access device sends the first probe response frame and the second response frame at the ultra-low power (namely, the first power). In the network configuration process, the electronic device can receive the first probe response frame and the second response frame only when the distance between the electronic device and the wireless access device is close enough (for example, within the first distance).

With reference to the first aspect, in a possible implementation, the probe request frame includes a first probe request frame, and the probe response frame includes a first probe response frame. That the electronic device sends a probe request frame includes: The electronic device sends the first probe request frame. That the wireless access device receives and responds to the probe request frame sent by the electronic device, and sends a probe response frame to the electronic device at first power by using a first antenna includes: The wireless access device receives and responds to the first probe request frame sent by the electronic device, and sends the first probe response frame to the electronic device at the first power by using the first antenna. Before the electronic device establishes the wireless local area network connection to the wireless access device, the method further includes: The electronic device receives and responds to the first probe response frame sent by the wireless access device, and sends a second probe request frame to the wireless access device; and the wireless access device receives and responds to the second probe request frame sent by the electronic device, and sends a second probe response frame to the electronic device at the second power by using the second antenna.

That is, the wireless access device only sends the first probe response frame at the ultra-low power (for example, the first power). In this way, in a network configuration process between the electronic device and the wireless access device, after receiving a probe response frame 1 sent by the wireless access device at the first power, the electronic device does not need to continue to be in a state of being close to the wireless access device, and duration in which the electronic device needs to be in the state of being close to the primary router in the network configuration process can be reduced.

With reference to the first aspect, in a possible implementation, the probe request frame includes a second probe request frame, and the probe response frame includes a second probe response frame. Before the electronic device sends the probe request frame, the method further includes: The electronic device sends a first probe request frame; and the wireless access device receives and responds to the first probe request frame sent by the electronic device, and sends the first probe response frame to the electronic device at the second power by using the second antenna. That the electronic device sends a probe request frame includes: The electronic device receives and responds to the first probe response frame sent by the wireless access device, and sends the second probe request frame to the wireless access device. That the wireless access device receives and responds to the probe request frame sent by the electronic device, and sends a probe response frame to the electronic device at first power by using a first antenna includes: The wireless access device receives and responds to the second probe request frame sent by the electronic device, and sends the second probe response frame to the electronic device at the first power by using the first antenna.

That is, the wireless access device only sends the second probe response frame at the ultra-low power (for example, the first power). In this way, the electronic device does not need to be in a state of being close to the wireless access device at a timepoint other than a timepoint at which the second probe response frame is received, so that duration in which the electronic device needs to be in the state of being close to the wireless access device can be reduced.

With reference to the first aspect, in a possible implementation, before the wireless access device sends the probe response frame to the electronic device at the first power by using the first antenna, the method further includes: enabling a network configuration indicator light of the wireless access device to blink. After the electronic device establishes the wireless local area network connection to the wireless access device, the method further includes: enabling the network configuration indicator light of the wireless access device to be steady on. In this way, the blinking of the network configuration indicator light of the wireless access device may be used as prompt information, to prompt the user that the wireless access device discovers a device in a to-be-network-configured state. The steady-on of the network configuration indicator light of the wireless access device may be used as prompt information, to prompt the user that network configuration between the device in the to-be-network-configured state and the wireless access device succeeds.

With reference to the first aspect, in a possible implementation, after the electronic device receives the probe response frame, and before the electronic device establishes the wireless local area network connection to the wireless access device, the method further includes: The wireless access device determines a first key through negotiation with the electronic device; the wireless access device encrypts based on the first key, a password of a wireless local area network in which the wireless access device is located to obtain an encrypted password, and sends the encrypted password to the electronic device; and after receiving the encrypted password, the electronic device decrypts the encrypted password based on the first key to obtain the password of the wireless local area network in which the wireless access device is located.

In a possible implementation, that the wireless access device determines a first key through negotiation with the electronic device may include the following steps: The wireless access device generates a first random number before determining the first key through negotiation with the electronic device; the wireless access device generates a key 1 based on the first random number; the wireless access device sends the first random number to the electronic device; after receiving the first random number, the electronic device generates a key 2 based on the first random number; the electronic device further sends the key 2 to the wireless access device; and the wireless access device uses the key 1 as the first key after determining that the key 1 is the same as the key 2.

In this way, the electronic device and the wireless access device transmit, by using the first key, the password of the wireless local area network in which the wireless access device is located, to ensure security of information transmission between the electronic device and the wireless access device, and avoid leakage of the password of the wireless local area network in which the wireless access device is located.

With reference to the first aspect, in a possible implementation, that the electronic device establishes a wireless local area network connection to the wireless access device includes: The electronic device establishes the wireless local area network connection to the wireless access device based on the password of the wireless local area network in which the wireless access device is located.

With reference to the first aspect, in a possible implementation, when a device type of the electronic device is a router, after the electronic device establishes the wireless local area network connection to the wireless access device, the method further includes: synchronizing parameter information with the wireless access device through negotiation, where the parameter information includes one or more of the following: a frequency band of the wireless access device, a channel type of the wireless access device, and a data transmission rate of the wireless access device.

In a possible implementation, that the electronic device synchronizes parameter information with the wireless access device through negotiation may include the following steps: The electronic device sends a parameter negotiation request to the wireless access device after establishing the wireless local area network connection to the wireless access device; the wireless access device sends a first parameter type set to the electronic device in response to the parameter negotiation request; the electronic device is further configured to: receive the first parameter type set, and determine a third parameter type set based on the first parameter type set and a second parameter type set, where the third parameter type set includes one or more parameters; the electronic device sends an identifier/identifiers of one or more parameters in the third parameter type set to the wireless access device; the wireless access device receives the identifier/identifiers of the one or more parameters in the third parameter type set; the wireless access device determines a value/values of the one or more parameters in the third parameter type set based on the identifier/identifiers of the one or more parameters in the third parameter type set; the wireless access device sends the value/values of the one or more parameters of the wireless access device in the third parameter type set to the electronic device; the electronic device is further configured to receive the value/values of the one or more parameters of the wireless access device in the third parameter type set; and the electronic device is further configured to determine a common value of the value/values of the one or more parameters of the electronic device and the wireless access device in the third parameter type based on the value/values of the one or more parameters of the electronic device in the third parameter type set and the value/values of the one or more parameters of the wireless access device in the third parameter type set. The electronic device sets the common value of the value/values of the one or more parameters of the electronic device and the wireless access device in the third parameter type to the value/values of the one or more parameters of the electronic device in the third parameter type set.

In this way, it is ensured that after the electronic device establishes a networking connection to the wireless access device, parameter information of the electronic device is consistent with parameter information of the wireless access device. In this way, the electronic device and the wireless access device can form a mesh network.

Optionally, when the device type of the electronic device is a smart home device or a terminal device, the electronic device does not need to synchronize parameter information with the wireless access device. This is because the electronic device does not need to form a mesh network with the wireless access device. That is, the electronic device is always in a STA mode, and the electronic device only needs to access a wireless local area network of the wireless access device, and does not need to be in an AP mode as an access point of another device. Therefore, the electronic device does not need to complete a parameter negotiation and parameter synchronization process with the wireless access device.

With reference to the first aspect, in a possible implementation, the first probe request frame includes a network configuration information element of the electronic device.

The first probe response frame includes a basic service set identifier of the wireless access device.

The second probe request frame includes the basic service set identifier of the wireless access device.

The second probe response frame includes a password transmission mode negotiation capability identifier and a media access control address of the electronic device.

The first probe request frame is used by another electronic device near the electronic device to discover an electronic device in a to-be-network-configured state. The first probe request frame may be sent by the electronic device in a broadcast manner.

In a possible implementation, the electronic device periodically sends the first probe request frame. The electronic device stops sending the first probe request frame until the electronic device receives the first probe response frame.

The foregoing network configuration indicator light of the wireless access device blinks, and the network configuration indicator light of the wireless access device blinks only when the wireless access device receives the first probe request frame.

In a possible implementation, when the electronic device is a terminal device, before the electronic device sends the first probe request frame, the electronic device displays a first user interface, where the first user interface includes a first icon; the electronic device receives a second operation performed by the user on the first icon in the first user interface; and the electronic device sends the first probe request frame in response to the second operation.

In a possible implementation, when the electronic device is a wireless access device or a smart home device, before sending the first probe request frame, the electronic device receives a first operation performed by the user on a first button on the electronic device; and the electronic device sends the first probe request frame to the wireless access device in response to the first operation.

The first probe response frame is used to notify the electronic device that the wireless access device discovers the electronic device in the to-be-network-configured state. The first probe response frame may be sent by the wireless access device in a unicast manner.

In a possible implementation, the wireless access device periodically sends the first probe response frame. Every time the wireless access device receives the first probe request frame once, the wireless access device sends the first probe response frame once.

The second probe request frame is used by the electronic device to send a connection establishment request to the wireless access device. The second probe request frame may be sent by the electronic device in a unicast manner.

In a possible implementation, the electronic device periodically sends the second probe request frame. The electronic device stops sending the second probe request frame until the electronic device receives the second probe response frame.

The second probe response frame is used to notify the electronic device that the wireless access device agrees to establish a connection to the electronic device. The second probe response frame may be sent by the wireless access device in a unicast manner.

In a possible implementation, if the distance between the electronic device and the wireless access device exceeds the first distance, the electronic device receives no second probe response frame sent by the wireless access device at ultra-low power. In this case, the wireless access device may receive and respond to the first user operation (for example, an operation of pressing a network configuration button), and send the second probe response frame at normal power. In this way, even if the distance between the electronic device and the wireless access device exceeds the first distance, the second probe response frame sent by the wireless access device at the normal power (namely, the second power) can be received.

According to a second aspect, this application provides a network configuration method, where the method is applied to an electronic device, and the method includes: sending a probe request frame; receiving a probe response frame sent by a wireless access device at first power by using a first antenna; establishing a wireless local area network connection to the wireless access device after receiving the probe response frame; and after establishing the wireless local area network connection to the wireless access device, receiving a data frame sent by the wireless access device at second power by using a second antenna, where the first antenna and the second antenna are a same antenna or two antennas, and the first power is less than the second power.

The electronic device may be a smart home device, and the smart home device may be any one of the following: a smart light, a smart oven, a smart fan, a smart air conditioner, a smart television, a smart large screen, a smart band, a smart watch, a smart speaker, a smart refrigerator, a smart door or window, a smart car, a smart monitor, a smart robot, a smart camera, or the like.

The electronic device may be a terminal device, and the terminal device may be any one of the following: a mobile phone, a tablet computer, a smart screen, a desktop computer, a laptop computer, a handheld computer, a notebook computer, an ultra-mobile personal computer UMPC, or a netbook.

The electronic device may alternatively be a wireless access device, for example, a router.

According to the method in the second aspect, first, it is implemented that a user does not need to perform manual intervention on the wireless access device or manually enter a primary router password on the electronic device, and only needs to make the electronic device close to the wireless access device, so that when a distance between the electronic device and the wireless access device is close enough (for example, within a first distance), the electronic device can automatically establish a wireless local area network connection to the wireless access device, and a user operation is simple. Second, the wireless access device sends a message to an electronic device that is being network-configured only at ultra-low power (namely, the first power) in the network configuration process, and when the wireless access device sends the message to the electronic device at the ultra-low power (namely, the first power), the wireless access device may send a message to another electronic device that is connected to the wireless access device at normal power (namely, the second power). In this way, normal services of the another electronic device connected to the wireless access device are not affected.

With reference to the second aspect, in a possible implementation, a coverage area of a signal that is sent by the wireless access device at the first power by using the first antenna is less than a coverage area of a signal that is sent by the wireless access device at the second power by using the second antenna. The wireless access device sends the probe response frame at the ultra-low power (namely, the first power) only in the network configuration process. In this way, the probe response frame sent by the wireless access device at the ultra-low power (namely, the first power) can be received only when the distance between the electronic device and the wireless access device is close enough.

With reference to the second aspect, in a possible implementation, when a distance between the electronic device and the wireless access device is less than a first distance, the electronic device is at a location at which the probe response frame and the data frame can be received.

When the distance between the electronic device and the wireless access device is greater than the first distance, the electronic device is at a location at which the probe response frame cannot be received but the data frame can be received. In this way, in the network configuration process, only when the distance between the electronic device and the wireless access device is close enough (for example, within the first distance), it may be considered that the electronic device has an intention of joining a wireless local area network in which the wireless access device is located. In this case, the electronic device can complete the network configuration process with the wireless access device.

With reference to the second aspect, in a possible implementation, when the distance between the electronic device and the wireless access device is less than the first distance and a location of the electronic device is not moved, power of the probe response frame received by the electronic device is lower than power of the data frame received by the electronic device. In this way, in the network configuration process, the wireless access device sends the probe response frame at the ultra-low power (namely, the first power), to ensure that only an electronic device close to the wireless access device can receive the probe response frame. After the network configuration is completed, when the location of the electronic device is not moved, the electronic device receives, at a same location, a data frame sent by the wireless access device at the normal power (namely, the second power). The power of the probe response frame received by the electronic device is lower than the power of the received data frame.

Optionally, when the wireless access device sends the probe response frame at the ultra-low power (namely, the first power), power of a power supply signal of a radio frequency link in the wireless access device is third power. When the wireless access device sends the data frame at the normal power (namely, the second power), the power of the power supply signal of the radio frequency link in the wireless access device is fourth power. The third power is less than the fourth power.

With reference to the second aspect, in a possible implementation, the probe request frame includes a first probe request frame and a second probe request frame, and the probe response frame includes a first probe response frame and a second probe response frame.

The sending a probe request frame includes: sending the first probe request frame. The receiving a probe response frame sent by a wireless access device at first power by using a first antenna includes: receiving the first probe response frame sent by the wireless access device at the first power by using the first antenna. The sending a probe request frame further includes: sending the second probe request frame to the wireless access device in response to the first probe response frame sent by the wireless access device. The receiving a probe response frame sent by a wireless access device at first power by using a first antenna further includes: receiving the second probe response frame sent by the wireless access device at the first power by using the first antenna.

That is, in the network configuration process, the wireless access device sends the first probe response frame and the second response frame at the ultra-low power (namely, the first power). In the network configuration process, the electronic device can receive the first probe response frame and the second response frame only when the distance between the electronic device and the wireless access device is close enough (for example, within the first distance).

With reference to the second aspect, in a possible implementation, the probe request frame includes a first probe request frame, and the probe response frame includes a first probe response frame. The sending a probe request frame includes: sending the first probe request frame. The receiving a probe response frame sent by a wireless access device at first power by using a first antenna includes: receiving the first probe response frame sent by the wireless access device at the first power by using the first antenna. Before the establishing a wireless local area network connection to the wireless access device, the method further includes:

sending a second probe request frame to the wireless access device in response to the first probe response frame sent by the wireless access device; and receiving a second probe response frame sent by the wireless access device at the second power by using the second antenna.

That is, the wireless access device only sends the first probe response frame at the ultra-low power (for example, the first power). In this way, in a network configuration process between the electronic device and the wireless access device, after receiving a probe response frame 1 sent by the wireless access device at the first power, the electronic device does not need to continue to be in a state of being close to the wireless access device, and duration in which the electronic device needs to be in the state of being close to the primary router in the network configuration process can be reduced.

With reference to the second aspect, in a possible implementation, the probe request frame includes a second probe request frame, and the probe response frame includes a second probe response frame. Before the sending a probe request frame, the method further includes: sending a first probe request frame; and receiving a first probe response frame sent by the wireless access device at the second power by using the second antenna. The sending a probe request frame includes:

sending the second probe request frame to the wireless access device in response to the first probe response frame sent by the wireless access device. The receiving a probe response frame sent by a wireless access device at first power by using a first antenna includes: receiving the second probe response frame sent by the wireless access device at the first power by using the first antenna.

That is, the wireless access device only sends the second probe response frame at the ultra-low power (for example, the first power). In this way, the electronic device does not need to be in a state of being close to the wireless access device at a timepoint other than a timepoint at which the second probe response frame is received, so that duration in which the electronic device needs to be in the state of being close to the wireless access device can be reduced.

With reference to the second aspect, in a possible implementation, after the receiving a probe response frame and before the establishing a wireless local area network connection to the wireless access device, the method further includes: determining a first key through negotiation with the wireless access device; and after receiving a password, which is encrypted based on the first key and is sent by the wireless access device, of a wireless local area network in which the wireless access device is located, decrypting, based on the first key, the encrypted password of the wireless local area network in which the wireless access device is located, to obtain the password of the wireless local area network in which the wireless access device is located.

In a possible implementation, that the wireless access device determines a first key through negotiation with the electronic device may include the following steps: The wireless access device generates a first random number before determining the first key through negotiation with the electronic device; the wireless access device generates a key 1 based on the first random number; the wireless access device sends the first random number to the electronic device; after receiving the first random number, the electronic device generates a key 2 based on the first random number; the electronic device further sends the key 2 to the wireless access device; and the wireless access device uses the key 1 as the first key after determining that the key 1 is the same as the key 2.

In this way, the electronic device and the wireless access device transmit, by using the first key, the password of the wireless local area network in which the wireless access device is located, to ensure security of information transmission between the electronic device and the wireless access device, and avoid leakage of the password of the wireless local area network in which the wireless access device is located.

With reference to the second aspect, in a possible implementation, the establishing a wireless local area network connection to the wireless access device includes: establishing the wireless local area network connection to the wireless access device based on the password of the wireless local area network in which the wireless access device is located.

With reference to the second aspect, in a possible implementation, when a device type of the electronic device is a router, after the electronic device establishes the wireless local area network connection to the wireless access device, the method further includes: synchronizing parameter information with the wireless access device through negotiation, where the parameter information includes one or more of the following: a frequency band of the wireless access device, a channel type of the wireless access device, and a data transmission rate of the wireless access device.

In a possible implementation, that the electronic device synchronizes parameter information with the wireless access device through negotiation may include the following steps: The electronic device sends a parameter negotiation request to the wireless access device after establishing the wireless local area network connection to the wireless access device; the wireless access device sends a first parameter type set to the electronic device in response to the parameter negotiation request; the electronic device is further configured to: receive the first parameter type set, and determine a third parameter type set based on the first parameter type set and a second parameter type set, where the third parameter type set includes one or more parameters; the electronic device sends an identifier/identifiers of the one or more parameters in the third parameter type set to the wireless access device; the wireless access device receives the identifier/identifiers of the one or more parameters in the third parameter type set; the wireless access device determines a value/values of the one or more parameters in the third parameter type set based on the identifier/identifiers of the one or more parameters in the third parameter type set; the wireless access device sends the value/values of the one or more parameters of the wireless access device in the third parameter type set to the electronic device; the electronic device is further configured to receive the value/values of the one or more parameters of the wireless access device in the third parameter type set; and the electronic device is further configured to determine a common value of the value/values of the one or more parameters of the electronic device and the wireless access device in the third parameter type based on the value/values of the one or more parameters of the electronic device in the third parameter type set and the value/values of the one or more parameters of the wireless access device in the third parameter type set. The electronic device sets the common value of the value/values of the one or more parameters of the electronic device and the wireless access device in the third parameter type to the value/values of the one or more parameters of the electronic device in the third parameter type.

In this way, it is ensured that after the electronic device establishes a networking connection to the wireless access device, parameter information of the electronic device is consistent with parameter information of the wireless access device. In this way, the electronic device and the wireless access device can form a mesh network.

Optionally, when the device type of the electronic device is a smart home device or a terminal device, the electronic device does not need to synchronize parameter information with the wireless access device. This is because the electronic device does not need to form a mesh network with the wireless access device. That is, the electronic device is always in a STA mode, and the electronic device only needs to access a wireless local area network of the wireless access device, and does not need to be in an AP mode as an access point of another device. Therefore, the electronic device does not need to complete a parameter negotiation and parameter synchronization process with the wireless access device.

With reference to the second aspect, in a possible implementation, the first probe request frame includes a network configuration information element of the electronic device. The first probe response frame includes a basic service set identifier of the wireless access device. The second probe request frame includes the basic service set identifier of the wireless access device. The second probe response frame includes a password transmission mode negotiation capability identifier and a media access control address of the electronic device.

The first probe request frame is used by another electronic device near the electronic device to discover an electronic device in a to-be-network-configured state. The first probe request frame may be sent by the electronic device in a broadcast manner.

In a possible implementation, the electronic device periodically sends the first probe request frame. The electronic device stops sending the first probe request frame until the electronic device receives the first probe response frame.

The foregoing network configuration indicator light of the wireless access device blinks, and the network configuration indicator light of the wireless access device blinks only when the wireless access device receives the first probe request frame.

In a possible implementation, when the electronic device is a terminal device, before the electronic device sends the first probe request frame, the electronic device displays a first user interface, where the first user interface includes a first icon; the electronic device receives a second operation performed by the user on the first icon in the first user interface; and the electronic device sends the first probe request frame in response to the second operation.

In a possible implementation, when the electronic device is a wireless access device or a smart home device, before sending the first probe request frame to the wireless access device, the electronic device receives a first operation performed by the user on a first button on the electronic device;

and the electronic device sends the first probe request frame to the wireless access device in response to the first operation.

The first probe response frame is used to notify the electronic device that the wireless access device discovers the electronic device in the to-be-network-configured state. The first probe response frame may be sent by the wireless access device in a unicast manner.

In a possible implementation, the wireless access device periodically sends the first probe response frame. Every time the wireless access device receives the first probe request frame once, the wireless access device sends the first probe response frame once.

The second probe request frame is used by the electronic device to send a connection establishment request to the wireless access device. The second probe request frame may be sent by the electronic device in a unicast manner.

In a possible implementation, the electronic device periodically sends the second probe request frame. The electronic device stops sending the second probe request frame until the electronic device receives the second probe response frame.

The second probe response frame is used to notify the electronic device that the wireless access device agrees to establish a connection to the electronic device. The second probe response frame may be sent by the wireless access device in a unicast manner.

In a possible implementation, if the distance between the electronic device and the wireless access device exceeds the first distance, the electronic device receives no second probe response frame sent by the wireless access device at ultra-low power. In this case, the wireless access device may receive and respond to the first user operation (for example, an operation of pressing a network configuration button), and send the second probe response frame at normal power. In this way, even if the distance between the electronic device and the wireless access device exceeds the first distance, the second probe response frame sent by the wireless access device at the normal power (namely, the second power) can be received.

According to a third aspect, this application provides a network configuration method, where the method is applied to a wireless access device, and the method includes: receiving and responding to a probe request frame sent by an electronic device, and sending a probe response frame to the electronic device at first power by using a first antenna; establishing a wireless local area network connection to the electronic device; and after establishing the wireless local area network connection to the electronic device, sending a data frame to the electronic device at second power by using a second antenna, where the first antenna and the second antenna are a same antenna or two antennas, and the first power is less than the second power.

The electronic device may be a smart home device, and the smart home device may be any one of the following: a smart light, a smart oven, a smart fan, a smart air conditioner, a smart television, a smart large screen, a smart band, a smart watch, a smart speaker, a smart refrigerator, a smart door or window, a smart car, a smart monitor, a smart robot, a smart camera, or the like.

The electronic device may be a terminal device, and the terminal device may be any one of the following: a mobile phone, a tablet computer, a smart screen, a desktop computer, a laptop computer, a handheld computer, a notebook computer, an ultra-mobile personal computer UMPC, or a netbook.

The electronic device may alternatively be a wireless access device, for example, a router.

According to the method in the third aspect, first, it is implemented that a user does not need to perform manual intervention on the wireless access device or manually enter a primary router password on the electronic device, and only needs to make the electronic device close to the wireless access device, so that when a distance between the electronic device and the wireless access device is close enough (for example, within a first distance), the electronic device can automatically establish a wireless local area network connection to the wireless access device, and a user operation is simple. Second, the wireless access device sends a message to an electronic device that is being network-configured only at ultra-low power (namely, the first power) in the network configuration process, and when the wireless access device sends the message to the electronic device at the ultra-low power (namely, the first power), the wireless access device may send a message to another electronic device that is connected to the wireless access device at normal power (namely, the second power). In this way, normal services of the another electronic device connected to the wireless access device are not affected.

With reference to the third aspect, in a possible implementation, a coverage area of a signal that is sent at the first power by using the first antenna is less than a coverage area of a signal that is sent at the second power by using the second antenna. In this way, the probe response frame sent by the wireless access device at the ultra-low power (namely, the first power) can be received only when the distance between the electronic device and the wireless access device is close enough.

With reference to the third aspect, in a possible implementation, when a distance between the electronic device and the wireless access device is less than a first distance, the electronic device is at a location at which the probe response frame and the data frame can be received; and when the distance between the electronic device and the wireless access device is greater than the first distance, the electronic device is at a location at which the probe response frame cannot be received but the data frame can be received. In this way, in the network configuration process, only when the distance between the electronic device and the wireless access device is close enough (for example, within the first distance), it may be considered that the electronic device has an intention of joining a wireless local area network in which the wireless access device is located. In this case, the electronic device can complete the network configuration process with the wireless access device.

With reference to the third aspect, in a possible implementation, when the distance between the electronic device and the wireless access device is less than the first distance and a location of the electronic device is not moved, power of the probe response frame received by the electronic device is lower than power of the data frame received by the electronic device. In this way, in the network configuration process, the wireless access device sends the probe response frame at the ultra-low power (namely, the first power), to ensure that only an electronic device close to the wireless access device can receive the probe response frame. After the network configuration is completed, when the location of the electronic device is not moved, the electronic device receives, at a same location, a data frame sent by the wireless access device at the normal power (namely, the second power). The power of the probe response frame received by the electronic device is lower than the power of the received data frame.

Optionally, when the wireless access device sends the probe response frame at the ultra-low power (namely, the first power), power of a power supply signal of a radio frequency link in the wireless access device is third power. When the wireless access device sends the data frame at the normal power (namely, the second power), the power of the power supply signal of the radio frequency link in the wireless access device is fourth power. The third power is less than the fourth power.

With reference to the third aspect, in a possible implementation, the probe request frame includes a first probe request frame and a second probe request frame, and the probe response frame includes a first probe response frame and a second probe response frame. The receiving and responding to a probe request frame sent by an electronic device includes: receiving and responding to the first probe request frame sent by the electronic device. The sending a probe response frame to the electronic device at first power by using a first antenna includes: sending the first probe response frame to the electronic device at the first power by using the first antenna. The receiving and responding to a probe request frame sent by an electronic device further includes: receiving and responding to the second probe request frame sent by the electronic device. The sending a probe response frame to the electronic device at first power by using a first antenna further includes: sending the second probe response frame to the electronic device at the first power by using the first antenna.

That is, in the network configuration process, the wireless access device sends the first probe response frame and the second response frame at the ultra-low power (namely, the first power). In the network configuration process, the electronic device can receive the first probe response frame and the second response frame only when the distance between the electronic device and the wireless access device is close enough (for example, within the first distance).

With reference to the third aspect, in a possible implementation, the probe request frame includes a first probe request frame, and the probe response frame includes a first probe response frame. The receiving and responding to a probe request frame sent by an electronic device includes: receiving and responding to the first probe request frame sent by the electronic device. The sending a probe response frame to the electronic device at first power by using a first antenna includes: sending the first probe response frame to the electronic device at the first power by using the first antenna. Before the establishing a wireless local area network connection to the electronic device, the method further includes: receiving and responding to a second probe request frame sent by the electronic device, and sending a second probe response frame to the electronic device at the second power by using the second antenna.

That is, the wireless access device only sends the first probe response frame at the ultra-low power (for example, the first power). In this way, in a network configuration process between the electronic device and the wireless access device, after receiving a probe response frame 1 sent by the wireless access device at the first power, the electronic device does not need to continue to be in a state of being close to the wireless access device, and duration in which the electronic device needs to be in the state of being close to the primary router in the network configuration process can be reduced.

With reference to the third aspect, in a possible implementation, the probe request frame includes a second probe request frame, and the probe response frame includes a second probe response frame. Before the receiving and responding to a probe request frame sent by an electronic device, the method further includes: receiving and responding to a first probe request frame sent by the electronic device, and sending a first probe response frame to the electronic device at the first power by using the first antenna. The receiving and responding to a probe request frame sent by an electronic device includes: receiving and responding to the second probe request frame sent by the electronic device. The sending a probe response frame to the electronic device at first power by using a first antenna includes: sending the second probe response frame to the electronic device at the first power by using the first antenna.

That is, the wireless access device only sends the second probe response frame at the ultra-low power (for example, the first power). In this way, the electronic device does not need to be in a state of being close to the wireless access device at a timepoint other than a timepoint at which the second probe response frame is received, so that duration in which the electronic device needs to be in the state of being close to the wireless access device can be reduced.

With reference to the third aspect, in a possible implementation, before the sending a probe response frame to the electronic device at first power by using a first antenna, the method further includes: enabling a network configuration indicator light of the wireless access device to blink. After the establishing a wireless local area network connection to the electronic device, the method further includes: enabling the network configuration indicator light of the wireless access device to be steady on. In this way, the blinking of the network configuration indicator light of the wireless access device may be used as prompt information, to prompt the user that the wireless access device discovers a device in a to-be-network-configured state. The steady-on of the network configuration indicator light of the wireless access device may be used as prompt information, to prompt the user that network configuration between the device in the to-be-network-configured state and the wireless access device succeeds.

With reference to the third aspect, in a possible implementation, after the sending a probe response frame to the electronic device at first power by using a first antenna, and before the establishing a wireless local area network connection to the electronic device, the method further includes: determining a first key through negotiation with the electronic device; and encrypting, based on the first key, a password of a wireless local area network in which the wireless access device is located to obtain an encrypted password, and sending the encrypted password to the electronic device, where the encrypted password is used by the electronic device to decrypt the encrypted password based on the first key to obtain the password of the wireless local area network in which the wireless access device is located.

In a possible implementation, that the wireless access device determines a first key through negotiation with the electronic device may include the following steps: The wireless access device generates a first random number before determining the first key through negotiation with the electronic device; the wireless access device generates a key 1 based on the first random number; the wireless access device sends the first random number to the electronic device; after receiving the first random number, the electronic device generates a key 2 based on the first random number; the electronic device further sends the key 2 to the wireless access device; and the wireless access device uses the key 1 as the first key after determining that the key 1 is the same as the key 2.

In this way, the electronic device and the wireless access device transmit, by using the first key, the password of the wireless local area network in which the wireless access device is located, to ensure security of information transmission between the electronic device and the wireless access device, and avoid leakage of the password of the wireless local area network in which the wireless access device is located.

With reference to the third aspect, in a possible implementation, when a device type of the electronic device is a router, after the establishing a wireless local area network connection to the electronic device, the method further includes: synchronizing parameter information with the electronic device through negotiation, where the parameter information includes one or more of the following: a frequency band of the wireless access device, a channel type of the wireless access device, and a data transmission rate of the wireless access device.

In a possible implementation, that the electronic device synchronizes parameter information with the wireless access device through negotiation may include the following steps: The electronic device sends a parameter negotiation request to the wireless access device after establishing the wireless local area network connection to the wireless access device; the wireless access device sends a first parameter type set to the electronic device in response to the parameter negotiation request; the electronic device is further configured to: receive the first parameter type set, and determine a third parameter type set based on the first parameter type set and a second parameter type set, where the third parameter type set includes one or more parameters; the electronic device sends an identifier/identifiers of the one or more parameters in the third parameter type set to the wireless access device; the wireless access device receives the identifier/identifiers of the one or more parameters in the third parameter type set; the wireless access device determines a value/values of the one or more parameters in the third parameter type set based on the identifier/identifiers of the one or more parameters in the third parameter type set; the wireless access device sends the value/values of the one or more parameters of the wireless access device in the third parameter type set to the electronic device; the electronic device is further configured to receive the value/values of the one or more parameters of the wireless access device in the third parameter type set; and the electronic device is further configured to determine a common value of the value/values of the one or more parameters of the electronic device and the wireless access device in the third parameter type based on the value/values of the one or more parameters of the electronic device in the third parameter type set and the value/values of the one or more parameters of the wireless access device in the third parameter type set. The electronic device sets the common value of the value/values of the one or more parameters of the electronic device and the wireless access device in the third parameter type to the value/values of the one or more parameters of the electronic device in the third parameter type.

In this way, it is ensured that after the electronic device establishes a networking connection to the wireless access device, parameter information of the electronic device is consistent with parameter information of the wireless access device. In this way, the electronic device and the wireless access device can form a mesh network.

Optionally, when the device type of the electronic device is a smart home device or a terminal device, the electronic device does not need to synchronize parameter information with the wireless access device. This is because the electronic device does not need to form a mesh network with the wireless access device. That is, the electronic device is always in a STA mode, and the electronic device only needs to access a wireless local area network of the wireless access device, and does not need to be in an AP mode as an access point of another device. Therefore, the electronic device does not need to complete a parameter negotiation and parameter synchronization process with the wireless access device.

With reference to the third aspect, in a possible implementation, the first probe request frame includes a network configuration information element of the electronic device. The first probe response frame includes a basic service set identifier of the wireless access device. The second probe request frame includes the basic service set identifier of the wireless access device. The second probe response frame includes a password transmission mode negotiation capability identifier and a media access control address of the electronic device.

The first probe request frame is used by another electronic device near the electronic device to discover an electronic device in a to-be-network-configured state. The first probe request frame may be sent by the electronic device in a broadcast manner.

In a possible implementation, the electronic device periodically sends the first probe request frame. The electronic device stops sending the first probe request frame until the electronic device receives the first probe response frame.

The foregoing network configuration indicator light of the wireless access device blinks, and the network configuration indicator light of the wireless access device blinks only when the wireless access device receives the first probe request frame.

In a possible implementation, when the electronic device is a terminal device, before the electronic device sends the first probe request frame, the electronic device displays a first user interface, where the first user interface includes a first icon; the electronic device receives a second operation performed by the user on the first icon in the first user interface; and the electronic device sends the first probe request frame in response to the second operation.

In a possible implementation, when the electronic device is a wireless access device or a smart home device, before sending the first probe request frame to the wireless access device, the electronic device receives a first operation performed by the user on a first button on the electronic device; and the electronic device sends the first probe request frame to the wireless access device in response to the first operation.

The first probe response frame is used to notify the electronic device that the wireless access device discovers the electronic device in the to-be-network-configured state. The first probe response frame may be sent by the wireless access device in a unicast manner.

In a possible implementation, the wireless access device periodically sends the first probe response frame. Every time the wireless access device receives the first probe request frame once, the wireless access device sends the first probe response frame once.

The second probe request frame is used by the electronic device to send a connection establishment request to the wireless access device. The second probe request frame may be sent by the electronic device in a unicast manner.

In a possible implementation, the electronic device periodically sends the second probe request frame. The electronic device stops sending the second probe request frame until the electronic device receives the second probe response frame.

The second probe response frame is used to notify the electronic device that the wireless access device agrees to establish a connection to the electronic device. The second probe response frame may be sent by the wireless access device in a unicast manner.

In a possible implementation, if the distance between the electronic device and the wireless access device exceeds the first distance, the electronic device receives no second probe response frame sent by the wireless access device at ultra-low power. In this case, the wireless access device may receive and respond to the first user operation (for example, an operation of pressing a network configuration button), and send the second probe response frame at normal power. In this way, even if the distance between the electronic device and the wireless access device exceeds the first distance, the second probe response frame sent by the wireless access device at the normal power (namely, the second power) can be received.

According to a fourth aspect, this application provides an electronic device, where the electronic device includes one or more processors and one or more memories, the one or more memories are coupled to the one or more processors, the one or more memories are configured to store computer program code, the computer program code includes computer instructions, and the one or more processors invoke the computer instructions to enable the electronic device to perform the method steps performed by the electronic device in any one of the possible implementations of any one of the foregoing aspects.

According to a fifth aspect, this application provides a wireless access device, where the wireless access device includes one or more processors and one or more memories, the one or more memories are coupled to the one or more processors, the one or more memories are configured to store computer program code, the computer program code includes computer instructions, and the one or more processors invoke the computer instructions to enable the wireless access device to perform the method steps performed by the wireless access device in any one of the possible implementations of any one of the foregoing aspects.

According to a sixth aspect, this application provides a chip apparatus, where the chip apparatus includes at least one processor and a memory, the memory is configured to store computer program code, the computer program code includes computer instructions, and the at least one processor invokes the computer instructions to enable an electronic device on which the chip apparatus is installed to perform the method steps performed by the electronic device in any one of the possible implementations of any one of the foregoing aspects.

According to a seventh aspect, this application provides a chip apparatus, where the chip apparatus includes at least one processor and a memory, the memory is configured to store computer program code, the computer program code includes computer instructions, and the at least one processor invokes the computer instructions to enable a wireless access device on which the chip apparatus is installed to perform the method steps performed by the wireless access device in any one of the possible implementations of any one of the foregoing aspects.

According to an eighth aspect, an embodiment of this application provides a readable storage medium, configured to store computer instructions. When the computer instructions are run on an electronic device, the electronic device is enabled to perform the method steps performed by the electronic device in any one of the possible implementations of any one of the foregoing aspects.

According to a ninth aspect, an embodiment of this application provides a readable storage medium, configured to store computer instructions. When the computer instructions are run on a wireless access device, the wireless access device is enabled to perform the method steps performed by the wireless access device in any one of the possible implementations of any one of the foregoing aspects.

According to a tenth aspect, an embodiment of this application provides a computer program product. When the computer program product runs on an electronic device, the electronic device is enabled to perform the method steps performed by the electronic device in any one of the possible implementations of any one of the foregoing aspects.

According to an eleventh aspect, an embodiment of this application provides a computer program product. When the computer program product runs on a wireless access device, the wireless access device is enabled to perform the method steps performed by the wireless access device in any one of the possible implementations of any one of the foregoing aspects.

DETAILED DESCRIPTION OF ILLUSTRATIVE EMBODIMENTS

Figure 1:
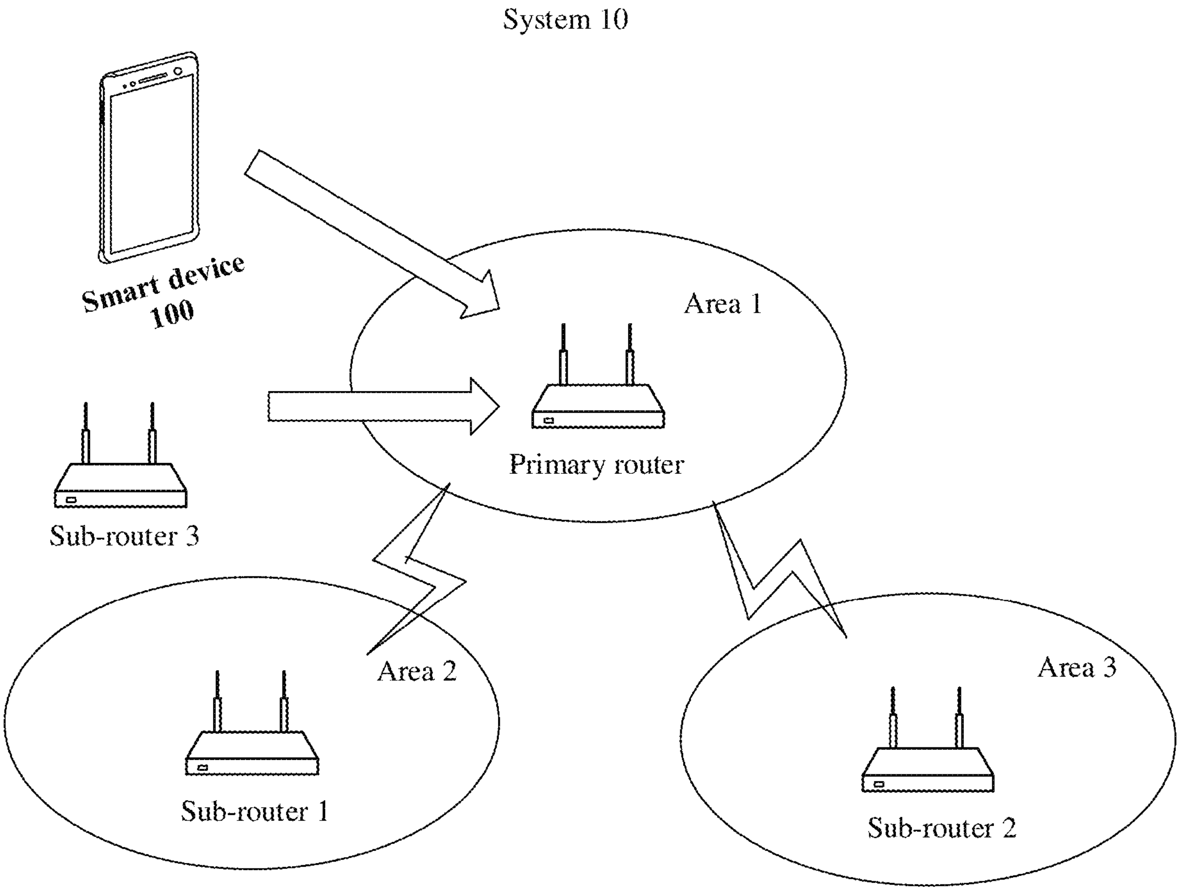
FIG. 1 shows an example of a schematic diagram of a system architecture according to an embodiment of this application.

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (user interface, UI)" in the specification, claims, and accompanying drawings of this application is a medium interface for interaction and information exchange between a user and an application or an operating system, and implements conversion between an internal form of information and a form acceptable to the user. A user interface of an application is source code written in a specific computer language, for example, Java or an extensible markup language (extensible markup language, XML). The source code of the interface is parsed and rendered on a terminal device, and is finally presented as user-recognizable content, for example, a control like an image, a text, or a button. A control (control) is also referred to as a widget (widget), and is a basic element of a user interface. Typical controls include a toolbar (toolbar), a menu bar (menu bar), an input box, a button (button), a scrollbar (scrollbar), an image, and a text. An attribute and content of a control on an interface are defined by using a tag or a node. For example, the control included in the interface is defined in the XML by using a node, for example, <Textview>, <ImgView>, or <VideoView>. One node corresponds to one control or one attribute on the interface. After being parsed and rendered, the node is presented as user-visible content. In addition, interfaces of many applications such as a hybrid application (hybrid application) usually further include a web page. A web page, also referred to as a page, may be understood as a special control embedded in an interface of an application. A web page is source code written in a specific computer language, for example, a hypertext markup language (hypertext markup language, HTML), cascading style sheets (cascading style sheets, CSS), or JavaScript (JavaScript, JS). The web page source code may be loaded and displayed as user-recognizable content by a browser or a web page display component with a function similar to a function of the browser. Specific content included in the web page is also defined by using a tag or a node in the web page source code. For example, an element and an attribute of the web page are defined in the HTML by using <p>, <img>, <video>, or <canvas>.

The user interface is generally represented in a form of a graphic user interface (graphic user interface, GUI), and is a user interface that is related to a computer operation and that is displayed in a graphic manner. The graphic user interface may be an interface element, for example, a window or a control displayed on a display of an electronic device.

FIG. 1 shows an example of a schematic diagram of a system architecture according to an embodiment of this application.

As shown in FIG. 1, a system 10 may include one or more routers, one or more smart devices, and the like. The router is a device that may be used as an access point (access point, AP) to provide a network for a smart device. The smart device may be a portable terminal device on which a Wi-Fi module is disposed, for example, a mobile phone, a tablet computer, a smart screen, a desktop computer, a laptop computer, a handheld computer, a notebook computer, an ultra-mobile personal computer (ultra-mobile personal computer, UMPC), or a netbook. Alternatively, the smart device may be a smart home device, for example, a smart speaker, a smart television lamp, a curtain, a robotic vacuum cleaner, a refrigerator, an oven, a water heater, or a smart lock. A device type of a smart device 100 is not limited in embodiments of this application. The smart device on which a Wi-Fi module is disposed may work in a station (station, STA) mode, and the smart device 100 is connected to a router, so that the smart device can receive and/or send data.

As shown in FIG. 1, a primary router, a sub-router 1, and a sub-router 2 form a mesh network in the area. The system architecture to which embodiments of this application are applied may further include more or fewer routers. This is not limited in this application. For example, the primary router may alternatively be connected to more sub-routers or smart devices. For another example, the sub-router 1 may alternatively be connected to another router as a role of the primary router. For still another example, the sub-router 1 may be connected to a sub-router 11 and a sub-router 12 (the sub-router 11 and the sub-router 12 are not shown in FIG. 1). For another example, the smart device may alternatively access a wireless network through the sub-router 1, the sub-router 2, or another sub-router in addition to the primary router.

The primary router provides wireless network services for an area 1. After a networking connection is established between the sub-router 1 and the primary router, the sub-router 1 provides wireless network services for an area 2. After a networking connection is established between the sub-router 2 and the primary router, the sub-router 2 provides wireless network services for an area 3. It should be noted that the area 1, the area 2, and the area 3 may be different from each other, or may partially overlap. This is not limited in this application. If there is an overlapping area, the smart device 100 in the overlapping area may access any router that covers the area. Preferably, the smart device 100 accesses a router with best signal quality. When the smart device 100 is moved from one area to another area, the smart device 100 may switch an accessed router.

In some embodiments, if coverage of a wireless network provided by the primary router, the sub-router 1, and the sub-router 2 does not meet a user requirement, for example, some areas are far away from the primary router, the sub-router 1, and the sub-router 2, a wireless network signal in the area is poor, and user experience is poor. To enable the wireless network to meet the requirement of full-home coverage, the user may perform networking on another sub-router (for example, a sub-router 3) and one or more existing routers. For example, the sub-router 3 may establish a networking connection to the primary router, and then the sub-router 3 is placed in an area with a poor wireless network signal, to resolve a problem that wireless network signals in some areas are poor as the current wireless network cannot implement full coverage.

In some other embodiments, the smart device 100 may be connected to any one of the primary router, the sub-router 1, and the sub-router 2, to receive and/or send data by using a wireless network provided by the device. For example, the smart device 100 may be connected to the primary router and communicate with another device (for example, another smart device 100) through a wireless network provided by the primary router.

Figure 2:
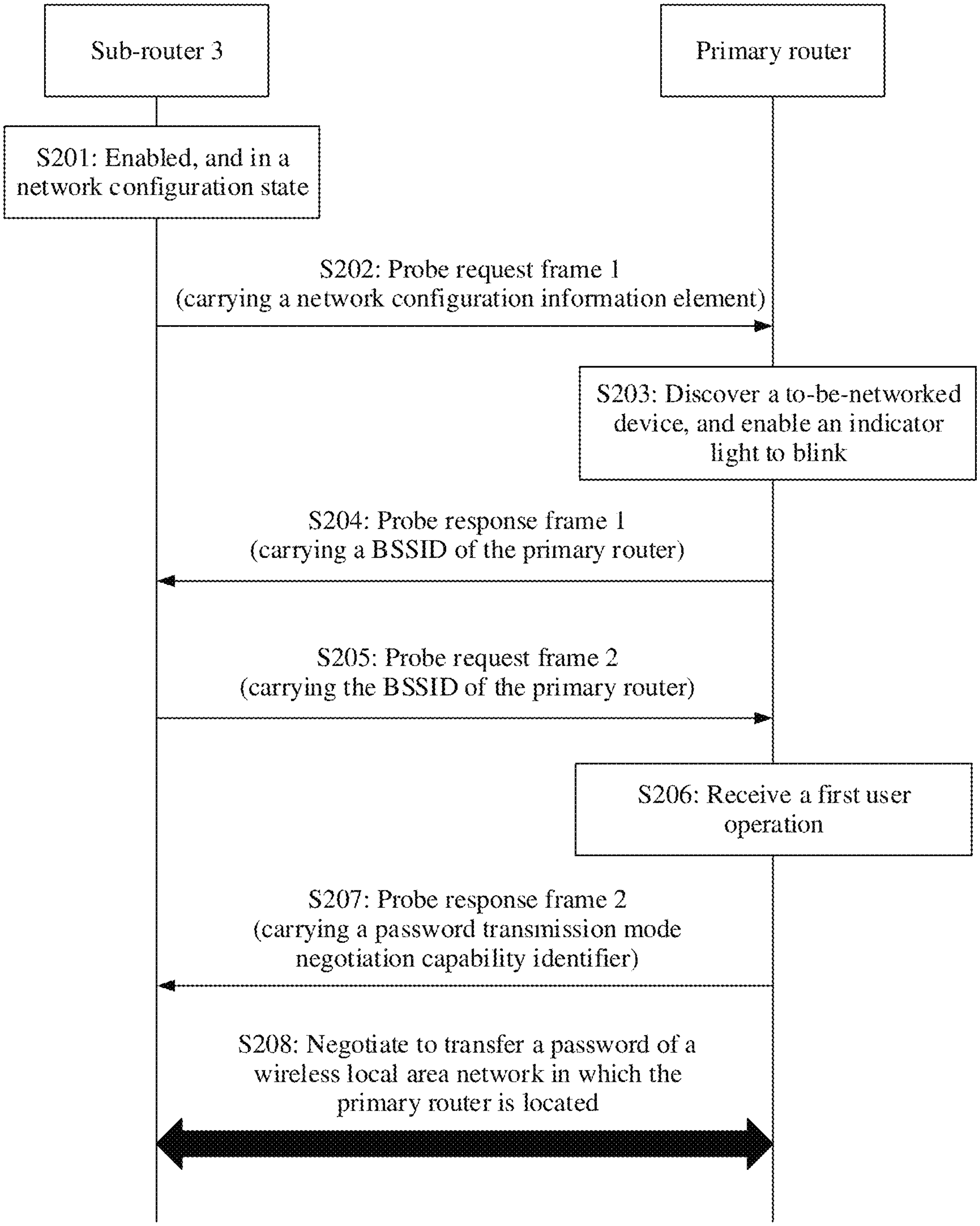
FIG. 2 shows an example of a method procedure for establishing a networking connection between a sub-router 3 and a primary router according to an embodiment of this application.

FIG. 2 shows an example of a method procedure for establishing a networking connection between a sub-router 3 and a primary router according to an embodiment of this application.

S201: The sub-router 3 is enabled, and the sub-router 3 is in a to-be-network-configured state.

When a user operation used to trigger the sub-router 3 to enter the to-be-network-configured state is received, the electronic device 100 is enabled and is in the to-be-network-configured state. The user operation used to trigger the sub-router 3 to be enabled and in the to-be-network-configured state may be a touch-and-hold operation (for example, press and hold for 3 seconds) on a related button (for example, a network configuration button) on the sub-router 3.

Optionally, the network configuration button may be a "Hi button", a "WPS button", or the like. A name of the network configuration button is not limited in this application.

A type of the network configuration button is a touch-and-hold type, or may be a rotating type, or may be a flipping type. The type of the network configuration button is not limited in this application.

In some embodiments, the user operation used to trigger the sub-router 3 to be enabled and in the to-be-network-configured state may be an operation of powering on the sub-router 3 that has not been connected to a wireless network in which another device is located, or an operation of powering on the sub-router 3 that has been connected to a wireless network in which another device is located, but is restored to factory settings.

Embodiments of this application do not limit the user operation used to trigger the sub-router 3 to be enabled and in the to-be-network-configured state. During actual application, the sub-router 3 may enter the to-be-network-configured state in a plurality of manners, for example, smart remote control or enabling in a mobile phone application APP.

S202: When the sub-router 3 is in a network configuration state, the sub-router 3 sends a probe request (probe request) frame 1.

The probe request frame 1 carries a network configuration information element (information element, IE) of the sub-router 3. The network configuration IE may include but is not limited to information like an identifier of the sub-router 3 and a capability of whether the sub-router 3 supports interconnection. The probe request frame 1 may further include more other information. This is not limited in this application.

The probe request frame 1 may be sent in a broadcast manner, and the probe request frame 1 is used by another nearby device to discover the sub-router 3.

When the probe request frame 1 is sent in a broadcast manner, the probe request frame 1 further carries a destination address of all "0"s. The destination address of the all "0"s in the probe request frame 1 indicates that the probe request frame 1 is a broadcast frame, and the sub-router 3 sends the probe request frame 1 in a broadcast manner, so that all other devices (including a router device and a non-router device) within a signal coverage area of the sub-router 3 can receive the broadcast frame. For example, the destination address sent by the probe request frame 1 may be represented as "00:00:00:00:00:00".

The probe request frame 1 may further carry a source address of the sub-router 3. The source address of the sub-router 3 in the probe request frame 1 is used by another device within the signal coverage area of the sub-router 3 to receive the probe request frame 1, and the another device sends, to the sub-router 3 in a unicast manner, a response request frame 1 in response to the probe request frame 1.

The sub-router 3 is in a network configuration state. When the sub-router 3 sends the probe request frame 1 in the broadcast manner, all devices within the signal coverage area of the sub-router 3 can receive the probe request frame 1. For example, if a plurality of routers are within the signal coverage of the sub-router 3, all the plurality of routers may receive the probe request frame 1 sent by the sub-router 3. For example, if devices within the signal coverage of the sub-router 3 include the primary router, the sub-router 1, and the sub-router 2, the primary router, the sub-router 1, and the sub-router 2 all may receive the probe request frame 1 sent by the sub-router 3.

It should be noted that the sub-router 3 may periodically (for example, every 200 ms) send the probe request frame 1 to the primary router. Before the sub-router 3 receives the probe response frame 1 sent by the primary router (that is, before S204), the sub-router 3 periodically sends the probe request frame 1 to the primary router. That is, before S204 is performed, S202 may be performed one or more times.

The primary router receives the probe request frame 1 sent by the sub-router 3, and the primary router sends the probe response frame 1 to the sub-router 3. After the sub-router 3 receives the probe response frame 1, the sub-router 3 stops sending the probe request frame 1.

S203: The primary router receives and responds to the probe request frame 1, discovers a to-be-networked device, and enables an indicator light of the primary router to blink.

The primary router receives and responds to the probe request frame 1, and identifies the network configuration information element that is of the sub-router 3 and that is carried in the probe request frame 1. When the sub-router 3 supports an interconnection capability, the primary device uses the sub-router 3 as the to-be-networked device. At the same time, the indicator light of the primary router blinks, and the indicator light of the primary router blinks to indicate that the primary router has discovered the to-be-networked device (the sub-router 3). The blinking of the indicator light of the primary router may be used as prompt information, to prompt the user that the primary router has discovered the to-be-networked device.

It can be learned from S202 that the sub-router 3 may send the probe request frame 1 in a broadcast manner. In this case, after other routers within the signal coverage area of the sub-router 3 receive the probe request frame 1, indicator lights of these routers blink. For example, if the sub-router 1, the sub-router 2, and the primary router are all located within the signal coverage area of the sub-router 3 and all receive the probe request frame 1 sent by the sub-router 3, indicator lights of the sub-router 1, the sub-router 2, and the primary router all blink. If the sub-router 1 and the sub-router 2 are not located within the signal coverage of the sub-router 3 and fail to receive the probe request frame 1 sent by sub-router 3, but the primary router is located within the signal coverage of the sub-router 3 and receives the probe request frame 1 sent by sub-router 3, the indicator lights of the sub-router 1 and sub-router 2 do not blink, but the indicator light of the primary router blinks.

It should be noted that a manner in which the primary router responds to and receives the probe request frame 1 is not limited in embodiments of this application. The primary router may respond to and receive the probe request frame 1 in a manner of blinking an indicator light, or the primary router may respond to and receive the probe request frame 1 in another manner, or the primary router may not respond to and receive the probe request frame 1 in an explicit manner visible to the user, or the primary router may not respond to and receive the probe request frame 1, or the like.

S204: In response to the probe request frame 1 sent by the sub-router 3, the primary router sends the probe response (probe response) frame 1 to the sub-router 3. Correspondingly, the sub-router 3 receives the probe response frame 1.

In response to the probe request frame 1 sent by the sub-router 3, the primary router sends the probe response frame 1 to the sub-router 3, where the probe response frame 1 is used to notify the sub-router 3 that the primary router receives the probe request frame 1.

The probe response frame 1 may carry a basic service set identifier (basic service set identifier, BSSID) of the primary router. The BSSID of the primary router may be understood as a name of a wireless local area network in which the primary router is located. For example, the BSSID of the primary router may be an identifier 312 in the following embodiment shown in FIG. 3C.

The probe response frame 1 may be sent by the primary router to the sub-router 3 in a unicast manner. In this case, the probe response frame 1 may further carry a source address (an address of the primary router) and a destination address (an address of the sub-router 3). The address of the sub-router 3 may be carried by the sub-router 3 in the probe request frame 1 and sent to the primary router in S202. It should be understood that the probe response frame 1 may further carry other information. This is not limited in embodiments of this application.

A sequence of performing S203 and S204 is not limited in this embodiment of this application. S203 may be performed before S204, or S204 may be performed before S203, or S203 and S204 may be simultaneously performed.

It may be learned from S202 that the sub-router 3 may periodically (for example, every 200 ms) send the probe request frame 1 to the primary router. Each time the primary router receives the probe request frame 1 sent by the sub-router 3, the primary router sends the probe response frame 1 to the sub-router 3. Because S202 is periodically performed, it may be considered that S204 is also periodically performed. That is, before S205 is performed, S204 may be performed one or more times.

S205: In response to the probe response frame 1 sent by the primary router, the sub-router 3 sends a probe request frame 2 to the primary router. Correspondingly, the primary router receives the probe request frame 2.

After the sub-router 3 receives the probe response frame 1 sent by the primary router in S204, the sub-router 3 sends the probe request frame 2 to the primary router, where the probe request frame 2 is used by the sub-router 3 to initiate a request for establishing a networking connection to the primary router.

The probe request frame 2 may carry the BSSID of the primary router.

The probe request frame 2 may be sent by the sub-router 3 to the primary router in a unicast manner. In this case, the probe request frame 2 may further carry a source address (the address of the sub-router 3) and a destination address (the address of the primary router). The address of the primary router may be carried by the primary router in the probe response frame 1 and sent to the sub-router 3 in S204.

It should be understood that the probe request frame 2 may further carry other information. This is not limited in embodiments of this application.

It should be noted that the sub-router 3 may periodically (for example, every 200 ms) send the probe request frame 2 to the primary router. Before the sub-router 3 receives a probe response frame 2 sent by the primary router (that is, before S207), the sub-router 3 periodically sends the probe request frame 2 to the primary router. That is, before S207 is performed, S205 may be performed one or more times.

The primary router receives the probe request frame 2 sent by the sub-router 3. If the primary router does not receive an operation that the user agrees to establish a networking connection between the primary router and the sub-router 3 at this time, for example, the user presses the network configuration button of the primary router (that is, S206 is not performed), the primary router may continue to send the probe response frame 1 to the sub-router 3. That is, when S205 is performed and S206 is not performed, S204 may be performed again.

S206: The primary router receives a first user operation.

When the user determines that the sub-router 3 and the primary router are networked, the user may perform the first user operation, and the primary router may receive the first user operation of the user on the primary router.

The first user operation may be a trigger operation (for example, pressing) of the user on the network configuration button of the primary router.

In an implementation, the network configuration button may be a "Hi button", a "WPS button", or the like. A name of the network configuration button is not limited in embodiments of this application. A type of the network configuration button is a touch-and-hold type, or may be a rotating type, or may be a flipping type. The type of the network configuration button is not limited in embodiments of this application.

In another implementation, the network configuration button may alternatively be a virtual key on the terminal device (for example, a mobile phone), and the user performs network configuration setting of the sub-router 3 or the primary router by performing an operation on a network configuration setting interface of the router.

A sequence of performing S205 and S206 is not limited in this embodiment of this application. S205 may be performed before S206, or S206 may be performed before S205, or S205 and S206 may be simultaneously performed.

S207: In response to the first user operation, the primary router sends the probe response frame 2 to the sub-router 3. Correspondingly, the sub-router 3 receives the probe response frame 2.

When the primary router receives the probe request frame 2 sent by the sub-router 3, and after the primary router receives the first user operation (that is, after S205 and S206 are both performed), the primary router sends the probe response frame 2 to the sub-router 3. After the sub-router 3 receives the probe response frame 2, the sub-router 3 stops periodically sending the probe request frame 2 to the primary router.

In response to the first user operation, the primary router sends the probe response frame 2 to the sub-router 3, where the probe response frame 2 is used to notify the sub-router 3 that the primary router agrees to establish a networking connection to the sub-router 3.

The probe response frame 2 may carry a password transmission mode negotiation capability identifier. The password transmission mode negotiation capability identifier may be a Wi-Fi protected setup (Wi-Fi protected setup, WPS) negotiation capability identifier or the like. This is not limited in embodiments of this application.

The probe response frame 2 may be sent by the primary router to the sub-router 3 in a unicast manner. In this case, the probe response frame 2 may further carry a source address (the address of the primary router) and a destination address (the address of the sub-router 3).

In some embodiments, the probe response frame 2 may further carry a media access control (media access control, MAC) address of the sub-router 3.

The MAC address of the sub-router 3 is used by the sub-router 3 to determine whether to respond to the probe response frame 2. Specifically, the probe response frame 2 carries the MAC address of the sub-router 3, the primary router sends the probe response frame 2 to the sub-router 3, and the sub-router 3 obtains the MAC address of the sub-router 3 carried in the probe response frame 2. If the sub-router 3 determines that the MAC address that is of the sub-router 3 and that is carried in the probe response frame 2 is the same as the locally stored MAC address of the sub-router 3, the sub-router 3 determines to receive and respond to the probe response frame 2. Then, the sub-router 3 negotiates with the primary router to transfer a password of the wireless local area network in which the primary router is located.

Optionally, the MAC address of the sub-router 3 and the password transmission mode negotiation capability identifier may be written into a message body of the probe response frame 2. The source address (the address of the primary router) and the destination address (the address of the sub-router 3) carried in the probe response frame 2 may be written into a message header of the probe response frame 2.

The probe response frame 2 may further carry other information. This is not limited in embodiments of this application.

S208: The sub-router 3 negotiates with the primary router to transfer the password of the wireless local area network in which the primary router is located.

In some embodiments, the sub-router 3 and the primary router may negotiate with the primary router in a WPS standard manner to transfer the password of the wireless local area network in which the primary router is located. The sub-router 3 and the primary router may alternatively negotiate, in another manner, to transfer the password of the wireless local area network in which the primary router is located. This is not limited in embodiments of this application.

How the sub-router 3 and the primary router negotiate with the primary router to transfer the password of the wireless local area network in the WPS manner is described in detail in a subsequent embodiment. Details are not described herein again.

It can be learned from the foregoing analysis that the solution shown in the embodiment in FIG. 2 has the following defects:

1. When a networking connection is established between the sub-router 3 and the primary router, the primary router can establish the networking connection to the sub-router 3 by sending information indicating that a network configuration connection is agreed to the sub-router 3 only after receiving a trigger (for example, pressing) operation from the user. If the primary router is placed in a corner or at a location that is inconvenient for the user to touch, for example, the primary router is placed on the top of a wardrobe or in a weak-current box of a home, when the primary router needs to receive the trigger operation from the user, the user operation is inconvenient and experience is poor.
2. In some embodiments, when the primary router receives a network configuration request from two or more sub-routers at the same time, the primary router receives a trigger (for example, pressing) operation from the user, and the primary router sends information indicating that a network configuration connection is agreed to the two or more sub-routers at the same time. In this case, the user does not know which sub-router of the two or more sub-routers establishes the network configuration connection to the primary router, which causes a disorder of a network topology.

FIG. 3A to FIG. 3D show examples of schematic diagrams of UIs for connecting a smart device 100 to a wireless local area network in which a primary router is located according to an embodiment of this application.

Figure 3A:
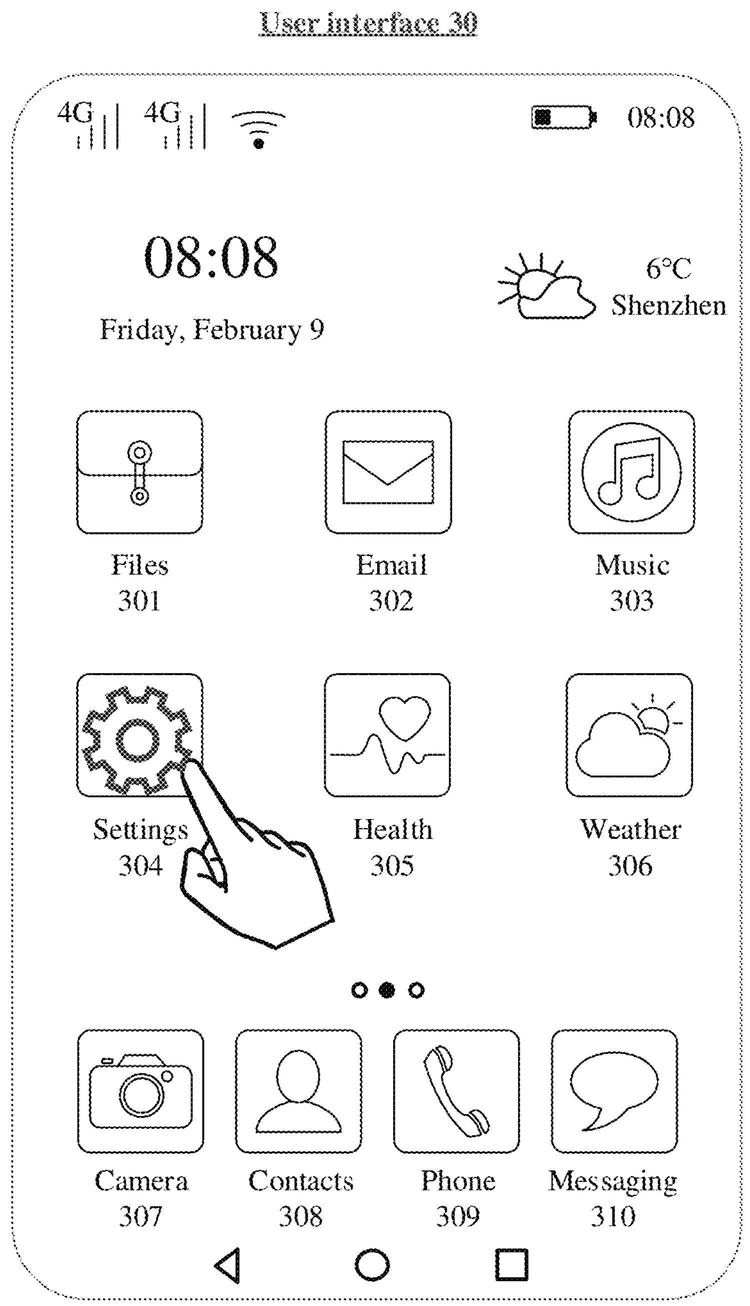
FIG. 3A to FIG. 3D show examples of schematic diagrams of UIs for connecting a smart device 100 to a wireless local area network in which a primary router is located according to an embodiment of this application.

FIG. 3A shows an example of a user interface 30 on the smart device 100 for displaying an installed application. The user interface 30 displays: a status bar, a calendar indicator, a weather indicator, a tray with a common used application icon, a navigation bar, a Files icon 301, an Email icon 302, a Music icon 303, a Settings icon 304, a Health icon 305, a Weather icon 306, and the like. The tray with the commonly used application icon includes a Camera icon 307, a Contacts icon 308, a Phone icon 309, and a Messaging icon 310. The status bar may include one or more signal strength indicators of a mobile communication signal (which may also be referred to as a cellular signal), an operator name (for example, “China Mobile”), one or more signal strength indicators of a Wi-Fi signal, a battery status indicator, a time indicator, and the like. The navigation bar may include system navigation buttons such as a back button, a home screen button, and a multitask button. In some embodiments, the user interface 30 shown in FIG. 3A as an example may be a home screen (Home screen).

Figure 3B:
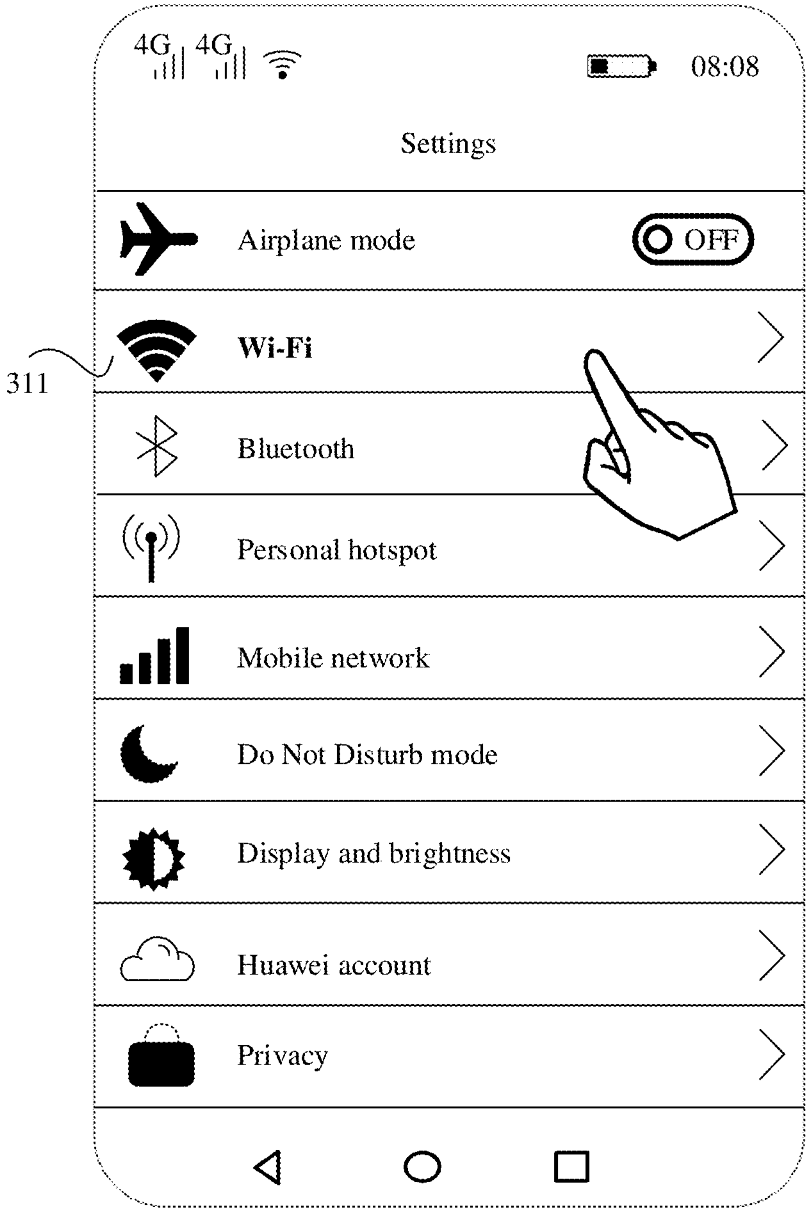

As shown in FIG. 3A, the smart device 100 receives and responds to an operation of tapping the Settings icon 304 by a user, and the smart device 100 displays a user interface 40 shown in FIG. 3B. As shown in FIG. 3B, the user interface 40 includes an airplane mode icon, an icon indicating an airplane mode of the smart device 100 is off, and a Wi-Fi icon 311. The user interface 40 further includes a Bluetooth icon, a personal hotspot icon, a mobile network icon, a Do Not Disturb mode icon, a display and brightness icon, a Huawei account icon, a privacy icon, and the like. As shown in FIG. 3B, the smart device 100 receives and responds to an operation of tapping the Wi-Fi icon 311 by the user, and the smart device 100 displays a user interface 50 shown in FIG. 3C.

Figure 3C:
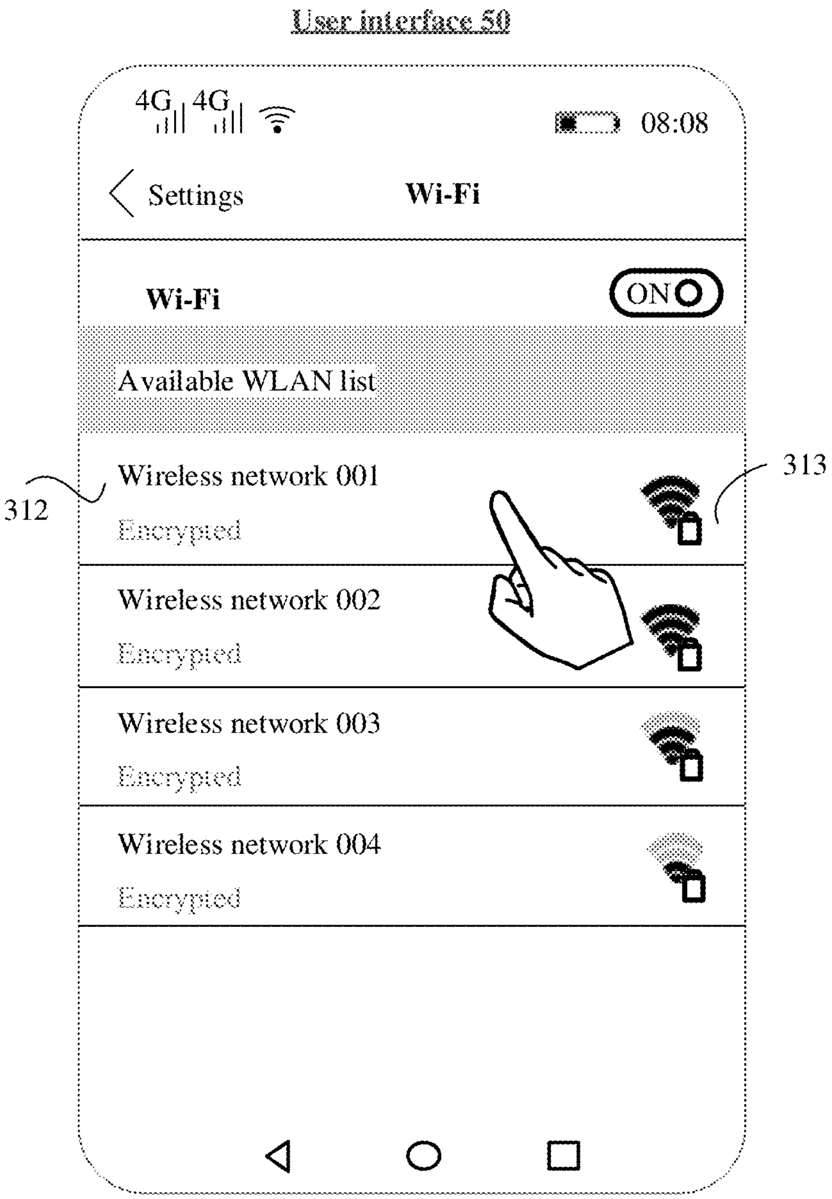

As shown in FIG. 3C, the user interface 50 includes a Wi-Fi icon, and an icon indicating a Wi-Fi function of the smart device 100 is on. The user interface 50 further includes an identifier 312 of a name of a wireless local area network in which a router near the smart device 100 is located. For example, the name of the wireless local area network in which the router is located may be "Wireless network 001", "Wireless network 002", "Wireless network 003", "Wireless network 004", or the like. The user interface 50 further includes an indicator 313 of signal strength of the wireless network.

As shown in FIG. 3C, all wireless networks in a Wi-Fi list shown in FIG. 3C are encrypted. When the smart device 100 establishes a connection to any wireless network in the Wi-Fi list, the user needs to enter a password of a corresponding wireless local area network to connect to the wireless network. For example, when the smart device 100 establishes a connection to a wireless local area network whose name is "Wireless network 001", as shown in FIG. 3C, the smart device 100 may receive and respond to a trigger operation (for example, a tap operation) of the user for the name identifier "Wireless network 001" 312 of the wireless local area network in which the router is located, and the smart device 100 displays a user interface 60 shown in FIG. 3D.

Figure 3D:
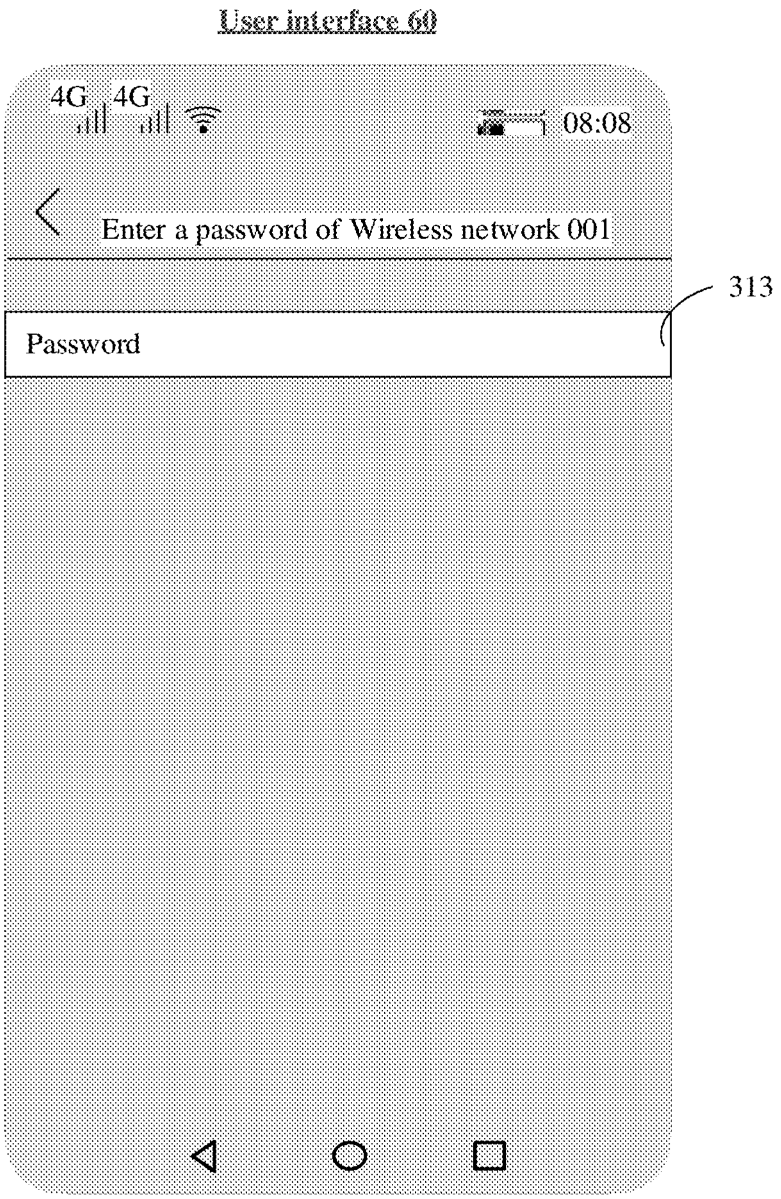

As shown in FIG. 3D, the user interface 60 includes a password entry bar 313 of the name identifier "Wireless network 001" 312 of the wireless local area network in which the router is located. The smart device 100 may receive an input operation performed by the user in the password entry bar 313. When the password entered by the user is consistent with a password of a wireless local area network corresponding to the name identifier "Wireless network 001" 312 of the wireless local area network in which the router is located, the smart device 100 establishes a connection to the wireless network "Wireless network 001".

It may be learned from the foregoing that when the smart device 100 is connected to a primary router, the user needs to perform a series of operations such as tapping setting, tapping a name of a wireless local area network in which the primary router is located in the Wi-Fi list, and manually entering a password by the user. Consequently, user operations are complex. The password of the wireless local area network in which the primary router is located may be composed of digits and/or uppercase letters and/or lowercase letters and/or special symbols. Manual input by the user may cause an input error. As a result, the user can input the correct password only after a plurality of attempts, and user experience is poor.

Therefore, an embodiment of this application provides a network configuration method. The method includes: After a router discovers a to-be-network-configured electronic device, the router sends, at ultra-low power, a name of a wireless local area network in which the router is located to the electronic device, and/or sends, at ultra-low power, a message in response to a network configuration request to the electronic device. Only when a distance between the electronic device and the router is close enough (for example, within a first distance), the electronic device can receive the name, sent by the router at the ultra-low power, of the wireless local area network in which the router is located, and/or the message, in response to the network configuration request, sent by the router at the ultra-low power. After the electronic device receives the name of the wireless local area network in which the router is located and the message in response to the network configuration request, the electronic device negotiates with the router to transmit a password of the wireless local area network in which the router is located. In this way, after obtaining the name and the password of the wireless local area network in which the router is located, the electronic device may be connected to the router.

The network configuration method provided in this embodiment of this application has the following beneficial effects.

First, the user does not need to perform manual intervention on the router or manually enter a router password on the electronic device, and only needs to make the electronic device close to the router (for example, make the distance between the electronic device and the router within the first distance), so that the electronic device can be automatically connected to the router. This reduces user operations and improves user experience.

Second, the router sends, at the ultra-low power, the name of the wireless local area network in which the router is located and/or the message in response to the network configuration request to the electronic device (for example, the electronic device 1) only in the network configuration process, and when the router sends, at the ultra-low power, the name of the wireless local area network in which the router is located and/or the message in response to the network configuration request to the electronic device 1, the router may send a message at normal power to another electronic device (for example, the electronic device 2) that is connected to the router. In this way, normal services of the electronic device 2 connected to the router are not affected.

That is, if at a first moment, the router needs to send, at ultra-low power, the name of the wireless local area network in which the router is located and/or the message in response to the network configuration request to the electronic device 1, the router needs to send a message to the electronic device 2 that is already connected to the router. In this case, at the first moment, the router may send a message to the electronic device 2 at normal power. In this way, a problem that the router cannot send a message at normal power when the router sends a message at ultra-low power can be avoided. If the electronic device 2 connected to the router is far away from the router (not within the first distance), a problem that the electronic device 2 connected to the router cannot receive a message sent by the router at ultra-low power can be avoided. The electronic device may be the sub-router (for example, the sub-router 3) described in the system architecture shown in FIG. 1, or may be the smart device 100 (for example, a mobile phone or an IoT device) described in the system architecture shown in FIG. 1, and the router may be the primary router described in the system architecture shown in FIG. 1.

Figure 4:
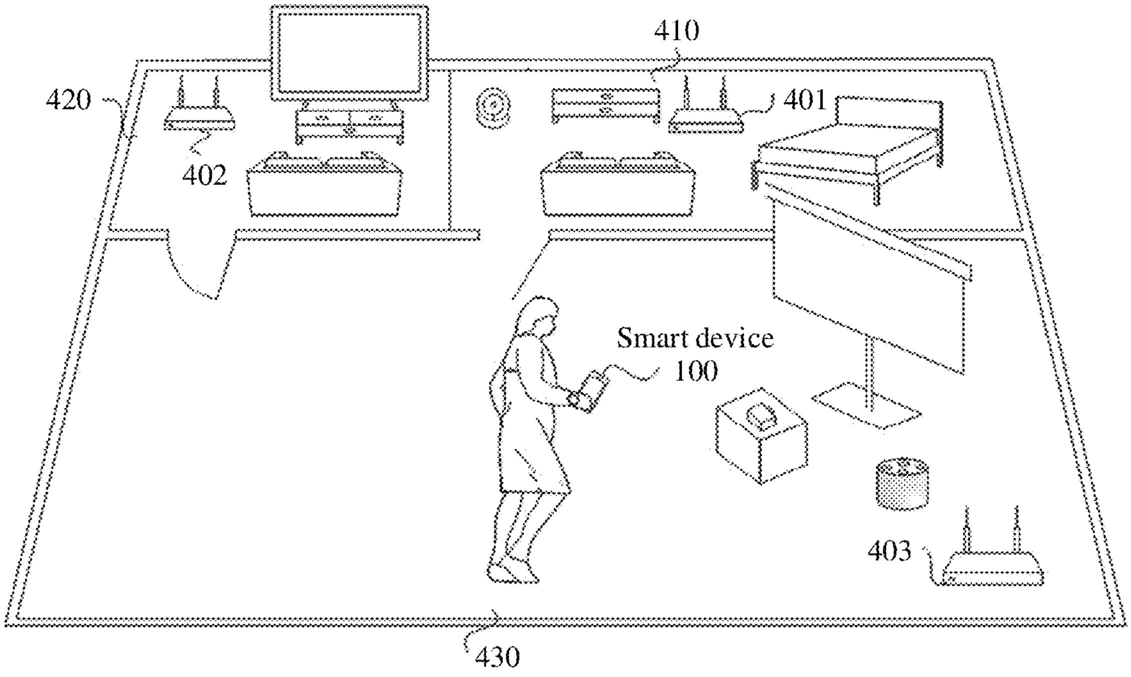
FIG. 4 shows an example of a schematic diagram of an application scenario according to an embodiment of this application.

FIG. 4 is a schematic diagram of an application scenario of a network configuration method according to an embodiment of this application.

As shown in FIG. 4, the home application scenario includes a first room area 410, a second room area 420, and a living room area 430. The first room area 410 includes a router 401, the second room area 420 includes a router 402, and the living room area 430 includes a router 403. In an implementation, the router 403 may be used as a primary router, and the router 401 and the router 402 may be used as sub-routers. The home application scenario further includes a user. The user may browse a web page, watch a video, or the like by using a smart device 100 (for example, a mobile phone) that accesses a wireless network provided by any router in FIG. 4.

The network configuration method provided in this embodiment of this application may be used for network configuration of a router, or may be used for network configuration of a smart device.

1. Network Configuration of a Router

For example, it is assumed that the router 401 and the router 403 have established a networking connection and form a mesh network, the router 401 may provide a wireless network for the first room area 410, and the router 403 may provide a wireless network for the living room area 430. In this case, if no sub-router networked with the primary router is configured in the second room area 420, and no router that independently provides a wireless network service is configured, because signals of the router 403 and the router 401 cannot cover the second room area 420, no wireless network exists in the second room area 420 or a signal of the wireless network is poor.

To improve signal strength of a wireless network in the second room area 420, a user may install the router 402 in the second room area 420, and add the router 402 to the mesh network formed by the router 401 and the router 403. Specifically, the user may make the router 402 close to the router 401 or the router 403. For example, the user may make the router 402 close to the router 401. When a distance between the router 402 and the router 401 is close enough, and the router 402 can receive a name of a wireless local area network in which the router 401 is located and/or a message that is sent by the router 401 at ultra-low power and that is in response to a network configuration request, the router 401 uses the router 402 as a to-be-networked device. Then, the router 402 obtains, through negotiation with the router 401, a password of the wireless local area network in which the router 401 is located, and is connected to the router 401 based on the name and the password of the wireless local area network in which the router 401 is located. Then, the router 402 and the router 401 complete a process of parameter negotiation and parameter synchronization, and the router 402 and the router 401 form a mesh network.

After the router 402, the router 401, and the router 403 form a mesh network, all routers in a same mesh network may have same parameter information. Therefore, when a smart device (for example, a mobile phone) is switched from a connection to the router 402 to a connection to the router 401 or the router 403, a current service interruption problem of the smart device does not occur. For example, the smart device (like the mobile phone) is initially located in a signal coverage area of the sub-router 402, and makes a video call with another device (for example, a tablet) by using a wireless network provided by the router 402. When the smart device moves, the smart device is moved from a location originally in the signal coverage area of the router 402 to a location in the signal coverage area of the router 401, and the smart device is switched from a connection to the router 402 to a connection to the router 401. Because the router 402 and the router 401 form the mesh network, in a process in which the smart device is switched from the connection to the router 402 to the connection to the router 401, a problem of interruption or frame freezing during a video call between the smart device and another device does not occur.

After the router 402, the router 401, and the router 403 form the mesh network, the user may place the router 402 in the second room area 420, and the router 402 may provide a wireless network for the second room area 420.

2. Network Configuration of a Smart Device

If the user wants to connect the smart device 100 to a wireless network, the user may make the smart device 100 close to any router (the router 401, the router 402, or the router 403) in the mesh network that has been formed. For example, the user makes the smart device 100 close to the router 401. When a distance between the smart device 100 and the router 401 is close enough, the smart device 100 may receive a name that is sent by the router 401 at ultra-low power and that is of a wireless local area network in which the router 401 is located and/or a message that is sent by the router 401 at ultra-low power and that is in response to a network configuration request, the router 401 uses the smart device 100 as a to-be-networked device. Then, the smart device 100 obtains, through negotiation with the router 401, a password of the wireless local area network in which the router 401 is located, and the smart device 100 is connected, based on the name and the password of the wireless local area network in which the router 401 is located, to the wireless local area network in which the router 401 is located.

After the smart device 100 is connected to the wireless local area network in which the router 401 is located, the smart device 100 may receive and send data with another device (for example, the smart device 200) by using a wireless network provided by the router 401.

Figure 5:
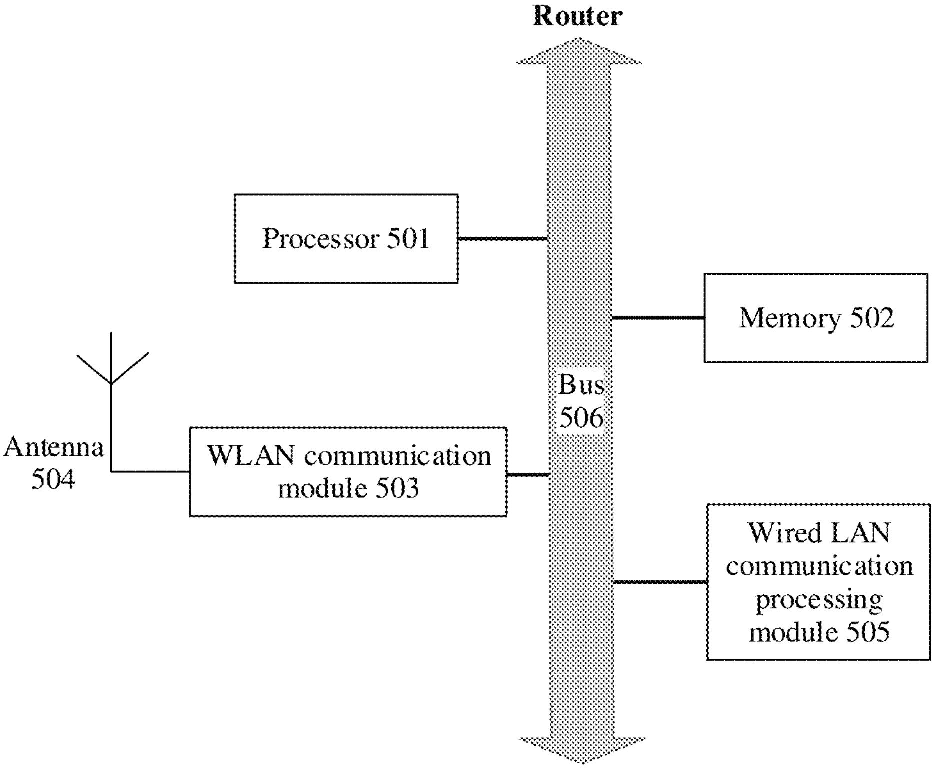
FIG. 5 shows an example of a schematic diagram of a structure of a router according to an embodiment of this application.

FIG. 5 shows an example of a schematic diagram of a structure of a router.

FIG. 5 shows a router according to some embodiments of this application. As shown in FIG. 5, the router may include a processor 501, a memory 502, a WLAN communication module 503, an antenna 504, a wired local area network (local area network, LAN) communication processing module 505, and a bus 506. The processor 501, the memory 502, the WLAN communication module 503, and the wired LAN communication processing module 505 may be connected by using the bus 506. Specifically:

It should be noted that the router shown in FIG. 5 is merely an example, and the router may have more or fewer components than those shown in FIG. 5, may combine two or more components, or may have different component configurations. The components shown in FIG. 5 may be implemented in hardware, software, or a combination of hardware and software including one or more signal processing and/or application-specific integrated circuits.

As shown in FIG. 5, the processor 501 may be configured to read and execute computer-readable instructions. During specific implementation, the processor 501 may mainly include a controller, an arithmetic unit, and a register. The controller is mainly responsible for instruction decoding, and sends a control signal for an operation corresponding to the instruction. The arithmetic unit is mainly responsible for storing a register operand, an intermediate operation result, and the like that are temporarily stored during instruction execution. In specific implementation, a hardware architecture of the processor 501 may be an application-specific integrated circuit (ASIC) architecture, an MIPS architecture, an ARM architecture, an NP architecture, or the like.

A memory may be further disposed in the processor 501, to store instructions and data. In some embodiments, the memory in the processor 501 is a cache. The memory may store instructions or data that is just used or cyclically used by the processor 501. If the processor 501 needs to use the instructions or the data again, the processor 501 may directly invoke the instructions or the data from the memory. This avoids repeated access, and reduces waiting time of the processor 501, thereby improving system efficiency.

The memory 502 is coupled to the processor 501, and is configured to store various software programs and/or a plurality of groups of instructions. During specific implementation, the memory 502 may include a high-speed random access memory, and may further include a non-volatile memory, for example, one or more disk storage devices, flash storage devices, or other non-volatile solid-state storage devices. The memory 502 may store an operating system, for example, an embedded operating system like uCOS, VxWorks, or RTLinux. The memory 502 may further store a communication program, and the communication program may be used to communicate with an electronic device or another device. The memory 502 may further store a current configuration, a routing table, and a forwarding table. The routing table can be used to store routing information. The routing table is generally maintained by a routing protocol and a routing table management module, and includes more information (a network address, a next hop, timeout time, and the like). The forwarding table can be generated based on the routing table and used by a router during actual forwarding. The router can send a data packet to a next-hop device based on the forwarding table.

The WLAN communication module 503 may be configured to modulate and demodulate an electromagnetic wave signal, and the WLAN communication module 503 may convert a digital signal that carries information and an instruction and that is sent by the processor 501 into an electromagnetic wave signal. The received electromagnetic wave signal is converted into a digital signal, and the digital signal is sent to the processor 501 for processing.

The antenna 504 may be configured to transmit and receive an electromagnetic wave signal, and the router may have one or more antennas.

When the router has a plurality of antennas, the antennas of the router may work in two modes. One mode is a spatial multiplexing mode in which the plurality of antennas of the router may send signals of different power to increase a data transmission rate. The other mode is a space diversity mode in which the plurality of antennas of the router can simultaneously send signals of same power to improve communication link quality.

In the spatial multiplexing mode, each antenna has fixed power for sending a signal, that is, each antenna may send a signal of different power. A receive end receives the signal of different power sent by each antenna, and separately demodulates the signal of different power sent by each antenna. In this way, a bandwidth for transmitting a signal by the router is increased, and a signal transmission rate of the router is also increased.

In this embodiment of this application, when the router needs to send a signal of ultra-low power by using an antenna, any one of the plurality of antennas of the router needs to perform time division multiplexing. That is, when the router does not need to send a signal of ultra-low power, any one of the plurality of antennas sends a signal of fixed power based on preset settings. When the router needs to send a signal of ultra-low power, any one of the plurality of antennas no longer sends a signal of fixed power based on preset settings, but sends the signal of the ultra-low power, and then sends the signal of the fixed power based on the preset settings.

In the space diversity mode, each antenna transmits a signal of same power. In this embodiment of this application, when the router needs to send a signal of ultra-low power by using an antenna, in any possible implementation, any one of the plurality of antennas of the router needs to perform time division multiplexing. That is, when the router does not need to send a signal of ultra-low power, any one of the plurality of antennas sends a signal of fixed power based on preset settings. When the router needs to send a signal of ultra-low power, any one of the plurality of antennas no longer sends a signal of fixed power based on preset settings, but sends the signal of the ultra-low power, and then sends the signal of the fixed power based on the preset settings. In another possible implementation, the plurality of antennas of the router perform time division multiplexing simultaneously. That is, when the router does not need to send a signal of ultra-low power, the plurality of antennas send a signal of fixed power based on preset settings. When the router needs to send a signal of ultra-low power, the plurality of antennas no longer send a signal of fixed power based on preset settings, but send the signal of the ultra-low power, and then send the signal of the fixed power based on the preset settings.

When the router has only one antenna, the antenna needs to be time-division multiplexed, that is, the antenna may send signals of different power. When the router needs to send a signal of ultra-low power, the antenna stops sending a signal of another power, and sends a current signal at ultra-low power. When the router does not need to send a signal of ultra-low power, the antenna may send a signal of another power.

The wired LAN communication processing module 505 may include one or more LAN physical interfaces. The one or more LAN physical interfaces may be used for another electronic device to establish a connection to the router through a network cable.

The router may further include a wired wide area network (WAN) communication processing module. The wired wide area network (WAN) communication processing module may include a WAN physical interface, and the WAN physical interface may be configured to connect the router to the Internet.

The router may further include a network configuration button. The network configuration button may be a "Hi button", a "WPS button", or the like. A name of the network configuration button is not limited in this application.

A type of the network configuration button is a touch-and-hold type, or may be a rotating type, or may be a flipping type. The type of the network configuration button is not limited in this application.

The router may further include a network configuration indicator light. The network configuration indicator light may blink, to prompt the user that the router discovers a to-be-network-configured device.

The router may further include a cellular communication module, configured to communicate with a cellular communication base station. In this case, the router may not include the wired LAN communication processing module 505.

It may be understood that the router may be the primary router, the sub-router 1, the sub-router 2, or the sub-router 3 in the system architecture shown in FIG. 1. The router shown in FIG. 5 is merely an implementation of this embodiment of this application. During actual application, the router may further include more or fewer components. This is not limited herein.

Figure 6:
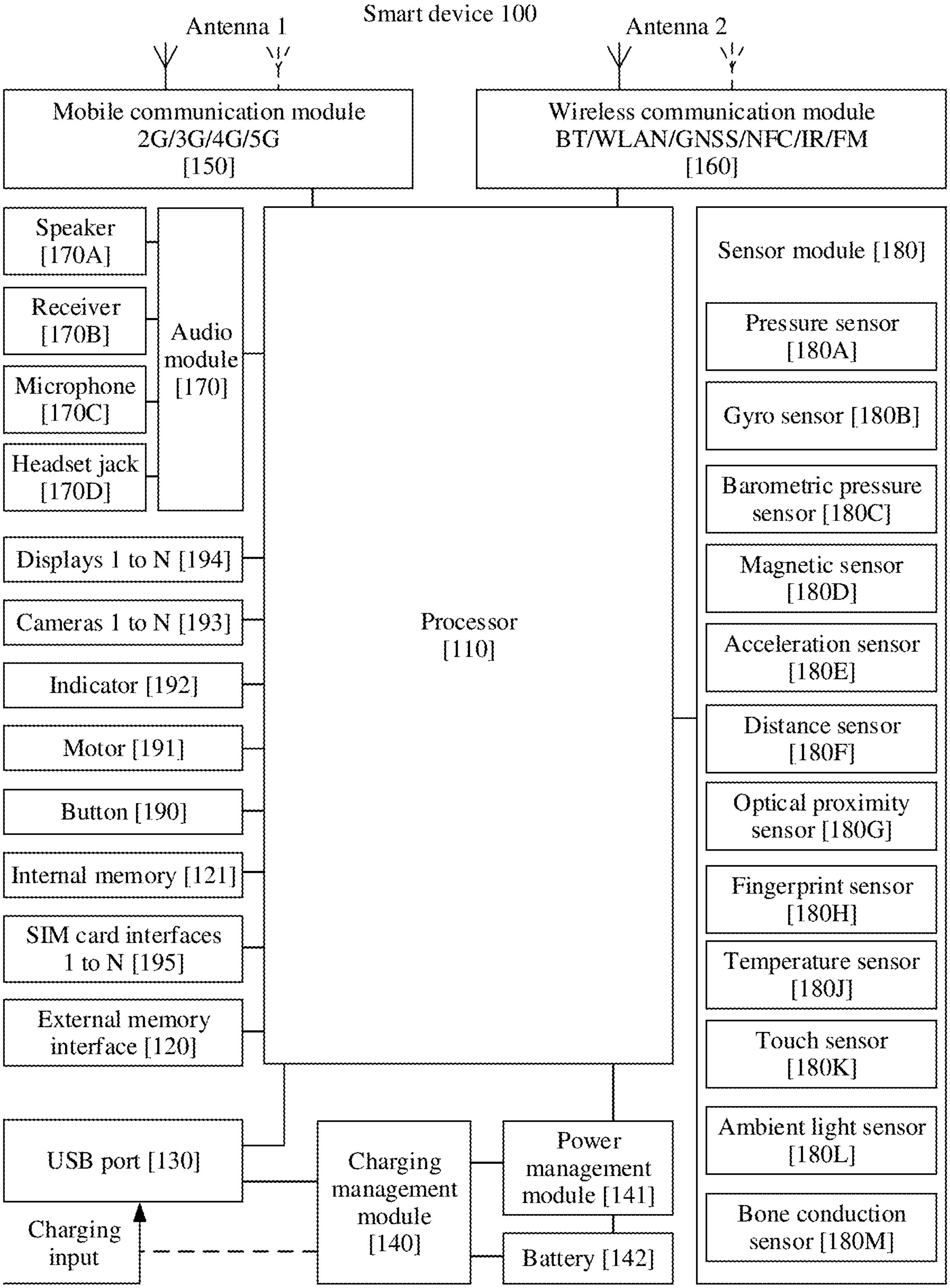
FIG. 6 shows an example of a schematic diagram of a structure of a smart device 100 according to an embodiment of this application.

FIG. 6 shows an example of a structure of a schematic diagram of the smart device 100.

As shown in FIG. 6, the smart device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention constitutes no specific limitation on the smart device 100. In some other embodiments of this application, the smart device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

In some embodiments, the processor 110 may include a softAP network configuration module. The softAP network configuration module may be integrated into an AP, an NPU, or another chip. When it is determined that NAN network configuration fails, the smart device 100 may wake up the softAP network configuration module, and perform network configuration for the smart device 100 by using a softAP network configuration method. In some other embodiments, the processor 110 may include a Bluetooth network configuration module, a sound wave network configuration module, and the like. A chip integrating the foregoing different types of network configuration modules is not limited in embodiments of this application. The foregoing different types of network configuration modules may be woken up after the smart device 100 determines that the NAN network configuration fails. The smart device 100 may provide a corresponding network configuration service for the smart device 100 by using the foregoing different types of network configuration modules.

The controller may be a nerve center and a command center of the smart device 100. The controller may generate an operation control signal based on instruction operation code and a time sequence signal, to complete control of instruction reading and instruction execution.

A memory may be further disposed in the processor 110, to store instructions and data. In some embodiments, the memory in the processor 110 is a cache. The memory may store instructions or data that is just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

The USB port 130 is an interface that conforms to a USB standard specification, and may be specifically a mini USB port, a micro USB port, a USB type-C port, or the like. The USB port 130 may be configured to connect to a charger to charge the smart device 100, or may be configured to transmit data between the smart device 100 and a peripheral device, or may be configured to connect to a headset for playing audio through the headset. The interface may be further configured to connect to another electronic device like an AR device.

The charging management module 140 is configured to receive a charging input from a charger.

The power management module 141 is configured to connect the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like.

A wireless communication function of the smart device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the smart device 100 may be configured to cover one or more communication frequency bands. Different antennas may be further multiplexed, to improve antenna utilization.

The mobile communication module 150 may provide a wireless communication solution that includes 2G/3G/4G/5G or the like and that is applied to the smart device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1.

The wireless communication module 160 may provide a solution, applied to the smart device 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The smart device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. In some embodiments, the smart device 100 may include one or N displays 194, where N is a positive integer greater than 1.

The smart device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the smart device 100 may include one or N cameras 193, where N is a positive integer greater than 1.

The digital signal processor is configured to process a digital signal, and may process another digital signal in addition to the digital image signal. For example, when the smart device 100 selects a frequency, the digital signal processor is configured to perform Fourier transformation on frequency energy.

The video codec is configured to compress or decompress a digital video. The smart device 100 may support one or more video codecs. In this way, the smart device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the smart device 100 may be implemented through the NPU, for example, image recognition, facial recognition, speech recognition, and text understanding.

The external memory interface 120 may be used to connect to an external storage card, for example, a micro SD card, to extend a storage capability of the smart device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the smart device 100 and data processing.

The smart device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset.

The pressure sensor 180A is configured to sense a pressure signal, and can convert the pressure signal into an electrical signal.

The gyro sensor 180B may be configured to determine a moving posture of the smart device 100. In some embodiments, an angular velocity of the smart device 100 around three axes (namely, x, y, and z axes) may be determined by using the gyro sensor 180B.

The barometric pressure sensor 180C is configured to measure barometric pressure.

The magnetic sensor 180D includes a Hall sensor.

The acceleration sensor 180E may detect accelerations in various directions (usually on three axes) of the smart device 100. When the smart device 100 is still, a magnitude and a direction of gravity may be detected. The acceleration sensor 180E may be further configured to identify a posture of the smart device 100, and is applied to applications such as a pedometer and switching between a landscape mode and a portrait mode.

The distance sensor 180F is configured to measure a distance. The smart device 100 may measure a distance by using infrared or laser.

The optical proximity sensor 180G may include, for example, a light-emitting diode (LED), and an optical detector, for example, a photodiode. The light-emitting diode may be an infrared light-emitting diode. The smart device 100 emits infrared light by using the light-emitting diode. The smart device 100 detects infrared reflected light from a nearby object by using the light-emitting diode. When sufficient reflected light is detected, it may be determined that there is an object near the smart device 100. When insufficient reflected light is detected, the smart device 100 may determine that there is no object near the smart device 100.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a touch panel. The touch sensor 180K may be provided in the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor to determine a type of a touch event.

The bone conduction sensor 180M may obtain a vibration signal.

The button 190 includes a power button, a volume button, and the like. The button 190 may be a mechanical button, or may be a touch button. The smart device 100 may receive a key input, and generate a key signal input related to a user setting and function control of the smart device 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement touch with or separation from the smart device 100. The smart device 100 may support one or N SIM card interfaces, where N is a positive integer greater than 1. In some embodiments, the smart device 100 uses an eSIM, namely, an embedded SIM card. The eSIM card may be embedded into the smart device 100, and cannot be separated from the smart device 100.

Embodiment 1

In a network configuration application scenario of a router, after a primary router discovers a to-be-network-configured electronic device (for example, a sub-router), the primary router returns, at ultra-low power, a name of a wireless local area network in which the primary router is located and/or returns, at ultra-low power, a message in response to a network configuration request to the sub-router. Only when a distance between the sub-router and the primary router is close enough (for example, within a first distance), the sub-router may receive the name, sent by the primary router at the ultra-low power, of the wireless local area network in which the primary router is located, and/or the message, in response to the network configuration request, sent by the primary router at the ultra-low power. After the sub-router receives the name of the wireless local area network in which the primary router is located and the message in response to the network configuration request, the sub-router negotiates with the primary router to transmit a password of the wireless local area network in which the primary router is located. In this way, after the sub-router obtains the name and the password of the wireless local area network in which the primary router is located, a user does not need to perform manual intervention on the primary router, and only needs to make the sub-router close to the primary router, so that the sub-router can be automatically connected to the primary router. This improves user experience.

It should be noted that, in the network configuration method provided in this embodiment of this application, the primary router sends a probe response message to the sub-router at ultra-low power only in a process of establishing a networking connection to the sub-router. After the networking connection is determined to be established between the sub-router and the primary router, the primary router no longer sends a packet frame to the sub-router at ultra-low power, but sends a packet frame at normal power. The ultra-low power is less than the normal power.

After the sub-router is connected to the primary router, the sub-router and the primary router complete a process of parameter information negotiation and synchronization, to ensure that parameter information of the sub-router is consistent with that of the primary router after the sub-router is connected to the primary router. In this way, the sub-router and the primary router can form a mesh network. The parameter information includes one or more of the following: a frequency band of a wireless network, a channel type, a data transmission rate, and the like. The parameter information may further include more other parameter information, which is not listed one by one in this application.

Figure 7:
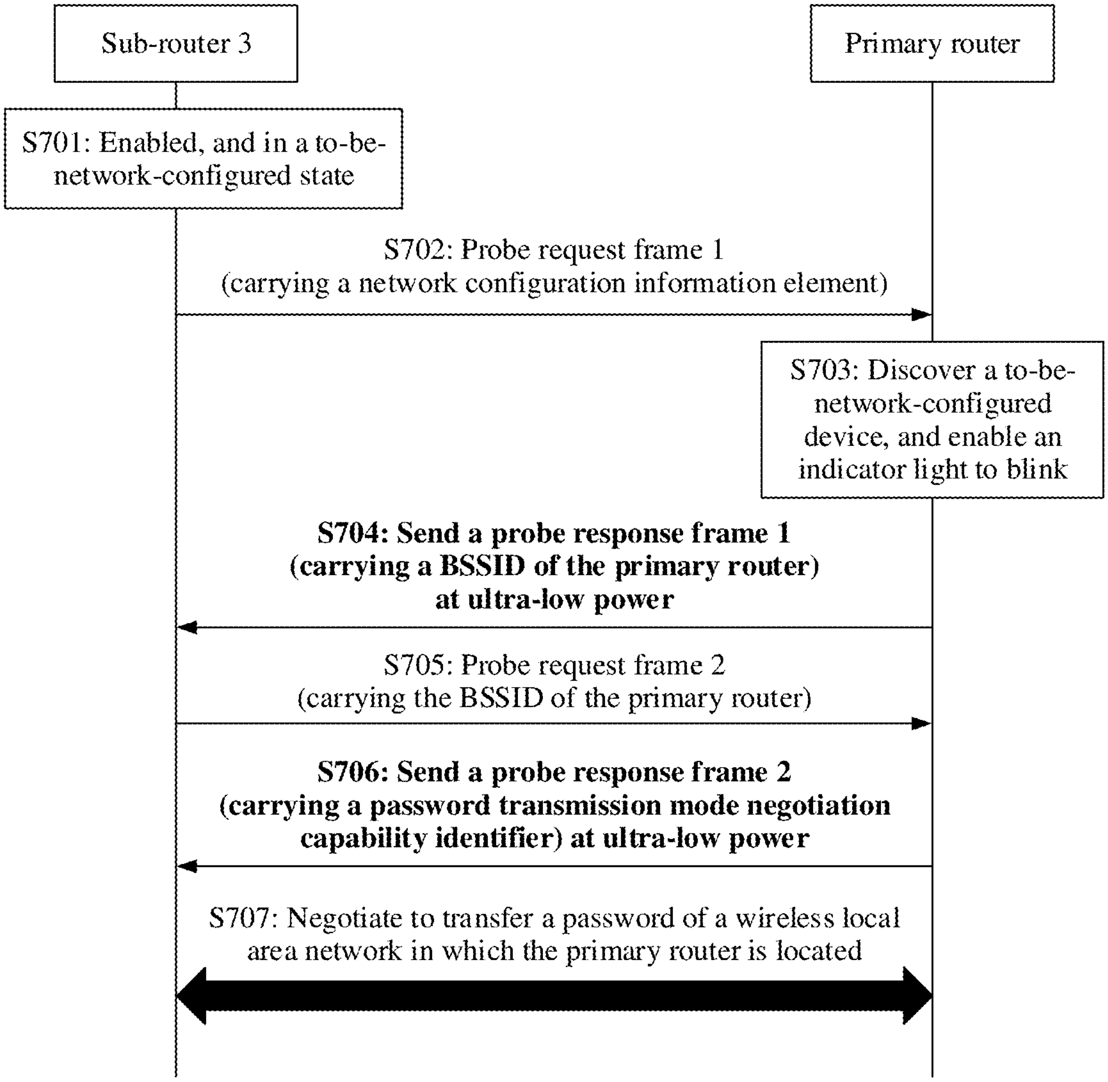
FIG. 7 shows an example of a flowchart of a network configuration method according to Embodiment 1 of this application.

FIG. 7 shows an example of a flowchart of a network configuration method according to Embodiment 1 of this application.

S701 to S703 are a process in which the primary router discovers a to-be-networked device.

S704 to S706 are a process in which a networking connection between a sub-router 3 and the primary router is determined to be established.

In S707, the sub-router 3 negotiates with the primary router to transfer the password of the wireless local area network in which the primary router is located.

S701: The sub-router 3 is enabled, and the sub-router 3 is in a network configuration state.

S701 is similar to S201. For details, refer to the related description in S201. Details are not described in this embodiment of this application again.

S702: When the sub-router 3 is in the network configuration state, the sub-router 3 sends a probe request (probe request) frame 1.

S702 is similar to S202. For details, refer to the related description in S202. Details are not described in this embodiment of this application again.

S703: The primary router receives and responds to the probe request frame 1, discovers the to-be-networked device, and enables an indicator light of the primary router to blink.

S703 is similar to S203. For details, refer to the related description in S203. Details are not described in this embodiment of this application again.

S704: In response to the probe request frame 1 sent by the sub-router 3, the primary router sends a probe response (probe response) frame 1 to the sub-router 3 at ultra-low power. Correspondingly, the sub-router 3 receives the probe response frame 1.

S704 is generally similar to S204, and a difference lies in that, in S704, the primary router sends the probe response frame 1 to the sub-router 3 at ultra-low power, while in S204, the primary router sends the probe response frame 1 to the sub-router 3 at normal power, where the normal power is greater than the ultra-low power. For a specific explanation of S704, refer to the related description in S204. Details are not described in this embodiment of this application again.

In some embodiments, after the primary router receives probe response frames 1 sent by a plurality of sub-routers (for example, a sub-router 2 and the sub-router 3) at the same time, the primary router sends probe response frames 1 to the plurality of sub-routers (for example, the sub-router 2 and the sub-router 3) at ultra-low power. Only a router that is located in coverage of a signal that can be received by the router and that is sent by the primary router at ultra-low power can receive the probe response frame 1. For example, it is assumed that the plurality of sub-routers are all very close to the primary router, and can receive the signal sent by the primary router at ultra-low power, the plurality of sub-routers can receive the probe response frames 1. In this case, the primary router can complete the network configuration process with the plurality of sub-routers at the same time. It is assumed that among the plurality of sub-routers, the sub-router 3 is very close to the primary router, and can receive the signal sent by the primary router at the ultra-low power, but the sub-router 2 is far away from the primary router, and cannot receive the signal sent by the primary router at the ultra-low power. In this case, the primary router can complete the network configuration process with the sub-router 3, but cannot complete the network configuration process with the sub-router 2.

Herein, after the primary router receives the probe request frame 1, the user does not need to perform manual intervention on the primary router, but only needs to make the sub-router 3 close to the primary router, and the primary router directly sends the probe response frame 1 to the sub-router 3 at ultra-low power, so that the sub-router 3 can be automatically connected to the primary router and complete network configuration with the primary router. This improves user experience. It may be understood that, only when a distance between the sub-router 3 and the primary router is within a first distance, the sub-router 3 can receive the probe response frame 1 sent by the primary router at the ultra-low power. For example, the ultra-low power may be −65 db. In this case, the first distance is not greater than 30 cm.

The primary router sends the probe response frame 1 to the sub-router 3 at the ultra-low power. On one hand, the sub-router 3 can receive the probe response frame 1 only when the sub-router 3 is close to the primary router and the distance between the sub-router 3 and the primary router is small enough. That is, when the sub-router 3 has an intention of establishing a networking connection to the primary router, the sub-router 3 can receive the probe response frame 1, so that reliability and security of the networking connection are ensured. On the other hand, a network configuration connection between the primary router and the sub-router 3 can be automatically completed without manual intervention (for example, a button pressing operation or an application operation), so that the network configuration process is simplified and user experience is improved.

Figure 7A:
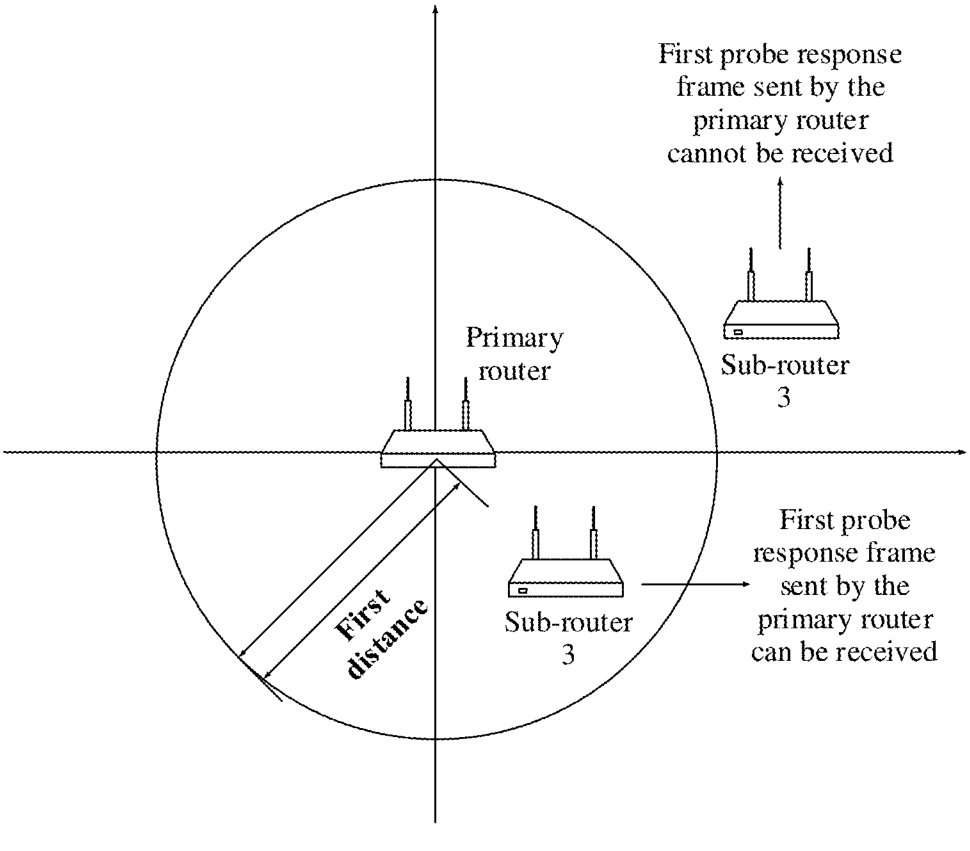
FIG. 7A and FIG. 7B show examples of a group of UI diagrams according to Embodiment 1 of this application.

FIG. 7A shows an example of a schematic diagram of a distance between the sub-router 3 and the primary router.

The distance between sub-router 3 and the primary router is a straight-line distance between sub-router 3 and the primary router.

FIG. 7A shows an example of a schematic diagram of a cross section of a sphere with the primary router as a center. The cross section of the sphere is a circle that uses the primary router as an origin and uses the first distance as a radius. That is, only when the straight-line distance between the sub-router 3 and the primary router is less than the first distance, the sub-router 3 can receive the probe response frame 1 sent by the primary router at the ultra-low power. When the straight-line distance between the sub-router 3 and the primary router is greater than the first distance, the sub-router 3 cannot receive the probe response frame 1 sent by the primary router at the ultra-low power.

The following describes how the primary router sends a probe response frame at ultra-low power.

The primary router determines whether to send the message at ultra-low power based on a type of a message sent to the sub-router 3. The primary router may send the message to the sub-router 3 at ultra-low power only when a message sent by the primary router to the sub-router 3 is a probe response message. A message of the probe response message type may include a probe response frame 1 and/or a probe response frame 2. Therefore, in S704, the primary router may send the probe response frame 1 at ultra-low power.

The primary router may send the probe response frame 1 at ultra-low power by using a radio frequency link of a Wi-Fi module of the primary router.

Figure 7B:
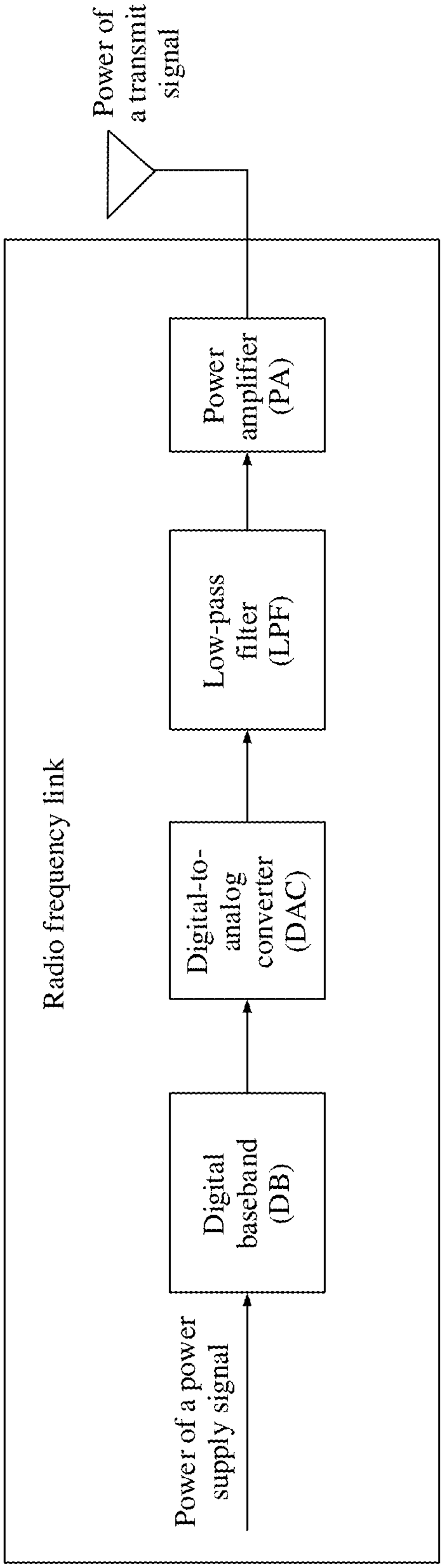

FIG. 7B shows an example of a schematic diagram of a structure of a radio frequency link. The schematic diagram of the structure of the radio frequency link shown in FIG. 7B is merely used to explain this application, and should not constitute a limitation.

The radio frequency link includes a digital baseband (digital baseband, DB), a digital-to-analog converter (digital-to-analog converter, DAC), a low-pass filter (low-pass filter, LPF), and a power amplifier (power amplifier, PA).

The digital baseband is configured to modulate, based on a feature of a carrier signal, an original electrical signal that is sent by a signal source and that is not modulated (without spectrum shift and conversion), to obtain a modulated signal, where the modulated signal is a high-frequency signal converted from the original signal. Modulation is an electrical signal conversion process in which an eigenvalue (for example, an amplitude, a frequency, and a phase) of the original signal is changed based on the feature of the carrier signal, so that the eigenvalue of the original signal is changed regularly.

The digital-to-analog converter is configured to convert a discrete digital signal into a continuously changing analog signal.

The low-pass filter is configured to filter a signal, so that a signal with a frequency lower than a cut-off frequency is allowed to pass through, and a signal with a frequency higher than the cut-off frequency cannot pass through.

The power amplifier is configured to produce a maximum power output at a given distortion rate.

The primary router supplies power to the radio frequency link by using a power supply signal, and power of the power supply signal input into the radio frequency link is a first value A. Then, the signal is modulated by the digital baseband, and the digital-to-analog converter converts a modulated signal from a digital signal into an analog signal. Then, the low-pass filter is used to remove interference of an impurity signal through low-pass filtering. After amplifying power of the signal, the power amplifier sends the signal by using an antenna of a router. Power of the signal sent by using the antenna of the router is a second value B. Based on the second value B, the first value A may be obtained based on the following formula (1):

$$A=(B+\text{device wall loss}+\text{antenna line loss})/\text{amplification multiple} \quad (1)$$

As shown in the foregoing formula (1), B is the power of the signal sent by the antenna of the router, namely, signal strength around a device, A is the power of the power supply signal input into the radio frequency link, the device wall loss is a power loss value of the radio frequency link, the antenna line loss is a line loss of the antenna of the router, and the amplification multiple is an amplification multiple of the power amplifier in the radio frequency link.

In this embodiment of this application, the ultra-low power is the second value B. Based on the second value B, the power A of the power supply signal input into the radio frequency link may be obtained based on the foregoing formula (1). In this way, a power supply signal whose power is the first value A is input into the radio frequency link of the router, to ensure that the power of the signal sent by the antenna of the router is the second value B.

For example, the device wall loss in the radio frequency link is 10 db, the antenna line loss is 20 db, the amplification multiple of the power amplifier in the radio frequency link is 10, and the ultra-low power B is −65 db. In this case, it may be obtained, based on the foregoing formula (1), that the power A of the power supply signal input into the radio frequency link is −3.5 db.

It should be noted that, if the device wall loss of each device, the antenna line loss, and the amplification capability of the power amplifier are different, the power A of the power supply signal input into the radio frequency link is also different.

In some embodiments, a transmit power level of the radio frequency link of the primary router may be adjusted to a first level, to enable the primary router to send a message at ultra-low power. In this way, the primary router may implement that the radio frequency link sends the probe response frame 1 at ultra-low power. Table 1 shows an example of a possible implementation of a correspondence between a transmit power level of a router and power of a power supply signal in a radio frequency link provided in this embodiment of this application.

TABLE 1

| Transmit power control (transmit power control, TPC) power level | Power of a power supply signal in a radio frequency link | Power of a transmit signal |
|---|---|---|
| TPC_POW_TH_0 | 0/0 | −145 db/−125 db |
| TPC_POW_TH_1 | 4 db/3 db | −65 db/−65 db |
| TPC_POW_TH_2 | 8 db/6 db | 15 db/−5 db |
| TPC_POW_TH_3 | 12 db/9 db | 95 db/55 db |
| TPC_POW_TH_4 | 14.4 db/12 db | 143 db/115 db |

As shown in Table 1, the transmit power control (transmit power control, TPC) power level is a power level of the radio frequency link. The power of the power supply signal in the radio frequency link shown in Table 1 is divided into power of a power supply signal in a 5 GHz frequency band and power of a power supply signal in a 2.4 GHz frequency band. It can be learned from the foregoing embodiment that the router may include one or more antennas. Table 1 shows an example of a correspondence between a transmit power level and power of a power supply signal in a radio frequency link when the router includes two transmit antennas. One antenna is configured to send a signal in a 5 GHz frequency band, and the other antenna is configured to send a signal in a 2.4 GHz frequency band. It may be understood that the router may alternatively include only one antenna, and the antenna may be time-division multiplexed, that is, a signal in a 5 GHz frequency band and a signal in a 2.4 GHz frequency band are sent by using the antenna in a time-division manner. The following embodiments of this application are described by using an example in which the router separately sends a signal in a 5 GHz frequency band and a signal in a 2.4 GHz frequency band by using two antennas.

When a TPC power level of the radio frequency link is TPC_POW_TH_0, power of a power supply signal in the radio frequency link is 0 db/0 db. When the power of the power supply signal in the radio frequency link is the power of the power supply signal in the 5 GHz frequency band, the power of the power supply signal in the radio frequency link is 0 db, and it may be deduced, based on the formula (1), that the power of the transmit signal of the antenna of the router may be −145 db. When the power of the power supply signal in the radio frequency link is the power of the power supply signal in the 2.4 GHz frequency band, the power of the power supply signal in the radio frequency link may be 0 db, and it may be deduced, based on the formula (1), that the power of the transmit signal of the antenna of the router may be −125 db.

When a TPC power level of the radio frequency link is TPC_POW_TH_1, power of a power supply signal in the radio frequency link is 4 db/3 db. When the power of the power supply signal in the radio frequency link is the power of the power supply signal in the 5 GHz frequency band, the power of the power supply signal in the radio frequency link is 4 db, and it may be deduced, based on the formula (1), that the power of the transmit signal of the antenna of the router may be −65 db. When the power of the power supply signal in the radio frequency link is the power of the power supply signal in the 2.4 GHz frequency band, the power of the power supply signal in the radio frequency link may be 3 db, and it may be deduced, based on the formula (1), that the power of the transmit signal of the antenna of the router may be −65 db.

When a TPC power level of the radio frequency link is TPC_POW_TH_2, power of a power supply signal in the radio frequency link is 8 db/6 db. When the power of the power supply signal in the radio frequency link is the power of the power supply signal in the 5 GHz frequency band, the power of the power supply signal in the radio frequency link is 8 db, and it may be deduced, based on the formula (1), that the power of the transmit signal of the antenna of the router may be 15 db. When the power of the power supply signal in the radio frequency link is the power of the power supply signal in the 2.4 GHz frequency band, the power of the power supply signal in the radio frequency link may be 6 db, and it may be deduced, based on the formula (1), that the power of the transmit signal of the antenna of the router may be −5 db.

When a TPC power level of the radio frequency link is TPC_POW_TH_3, power of a power supply signal in the radio frequency link is 12 db/9 db. When the power of the power supply signal in the radio frequency link is the power of the power supply signal in the 5 GHz frequency band, the power of the power supply signal in the radio frequency link is 12 db, and it may be deduced, based on the formula (1), that the power of the transmit signal of the antenna of the router may be 95 db. When the power of the power supply signal in the radio frequency link is the power of the power supply signal in the 2.4 GHz frequency band, the power of the power supply signal in the radio frequency link may be 9 db, and it may be deduced, based on the formula (1), that the power of the transmit signal of the antenna of the router may be 55 db.

When a TPC power level of the radio frequency link is TPC_POW_TH_4, power of a power supply signal in the radio frequency link is 14.4 db/12 db. When the power of the power supply signal in the radio frequency link is the power of the power supply signal in the 5 GHz frequency band, the power of the power supply signal in the radio frequency link is 14.4 db, and it may be deduced, based on the formula (1), that the power of the transmit signal of the antenna of the router may be 143 db. When the power of the power supply signal in the radio frequency link is the power of the power supply signal in the 2.4 GHz frequency band, the power of the power supply signal in the radio frequency link may be 12 db, and it may be deduced, based on the formula (1), that the power of the transmit signal of the antenna of the router may be 115 db.

It should be noted that this embodiment of this application merely lists some TPC power levels of the radio frequency link, and magnitudes of power supply signals corresponding to the TPC power levels as an example. The radio frequency link may further include more TPC power levels, or include a TPC power level division/design/naming manner different from those in Table 1. Details are not listed herein in this application.

In addition, it should be further noted that, because circuit compositions of different radio frequency links are different, Table 1 merely shows an example of a relationship between a TPC power level corresponding to a radio frequency link and a power supply signal in the radio frequency link. Relationships between TPC power levels corresponding to different radio frequency links and power supply signals in the radio frequency links may be different from that in Table 1. This is not limited in this application.

In an implementation, when the primary router needs to send a probe response frame (for example, the probe response frame 1) at ultra-low power, the primary router may control the TPC power level of the radio frequency link to be TPC_POW_TH_1. When the TPC power level is TPC_POW_TH_1, the power of the power supply signal in the radio frequency link is 4 db/3 db, and the frequency of the transmit signal in the radio frequency link is ultra-low power (for example, −65 db).

S705: The sub-router 3 receives and responds to the probe response frame 1 sent by the primary router at the ultra-low power, and sends a probe request (probe request) frame 2 to the primary router. Correspondingly, the primary router receives the probe request frame 2.

S705 is similar to S205. For details, refer to the related description in S205. Details are not described in this embodiment of this application again.

S706: The primary router receives and responds to the probe request frame 2, and sends a probe response (probe response) frame 2 to the sub-router 3 at ultra-low power. Correspondingly, the sub-router 3 receives the probe response frame 2.

S706 is generally similar to S207, and a difference lies in that, in S706, the primary router sends the probe response frame 2 to the sub-router 3 at ultra-low power, while in S207, the primary router sends the probe response frame 2 to the sub-router 3 at normal power, where the normal power is greater than the ultra-low power. For a specific explanation of S706, refer to the related description in S207. Details are not described in this embodiment of this application again.

The primary router may send the message to the sub-router 3 at ultra-low power only when a message sent by the primary router to the sub-router 3 is a probe response message. The probe response message may include the probe response frame 2. Therefore, in S706, the primary router may send the probe response frame 2 at ultra-low power.

The primary router may send the probe response frame 2 at ultra-low power by using a radio frequency link of a Wi-Fi module. Specifically, for how the primary router sends the probe response frame 2 at ultra-low power by using the radio frequency link of the Wi-Fi module, refer to the related description in S704. Details are not described herein again in this application.

In some embodiments, the primary router receives and responds to the probe request frame 2, and sends the probe response frame 2 at ultra-low power. If the distance between the sub-router 3 and the primary router exceeds the first distance, the sub-router 3 cannot receive the probe response frame 2 sent by the primary router at the ultra-low power. If the sub-router 3 is not connected to the primary router after a period of time, the primary router may receive and respond to a first user operation, and send the probe response frame 2 at normal power. In this case, even if the distance between the sub-router 3 and the primary router exceeds the first distance (for example, 30 cm), the sub-router 3 may still receive, within a second distance (for example, 100 cm), the probe response frame 2 sent by the primary router at the normal power. After receiving the probe response frame 2, the sub-router 3 may complete a network configuration procedure with the primary router.

The first user operation may be a trigger operation (for example, pressing) of the user on a network configuration button of the primary router.

Optionally, the network configuration button may be a "Hi button", a "WPS button", or the like. A name of the network configuration button is not limited in this application.

A type of the network configuration button is a touch-and-hold type, or may be a rotating type, or may be a flipping type. The type of the network configuration button is not limited in this application.

In another implementation, the network configuration button may alternatively be a virtual key on a terminal device (for example, a mobile phone), and the user performs an operation on a network configuration setting interface of the router, so that the primary router sends the probe response frame 2 at normal power.

The first user operation may alternatively be another operation. This is not limited in this application.

S707: The sub-router 3 negotiates with the primary router to transfer the password of the wireless local area network in which the primary router is located.

S707 is similar to S208. For details, refer to the related description in S208. Details are not described in this embodiment of this application again.

Figure 8:
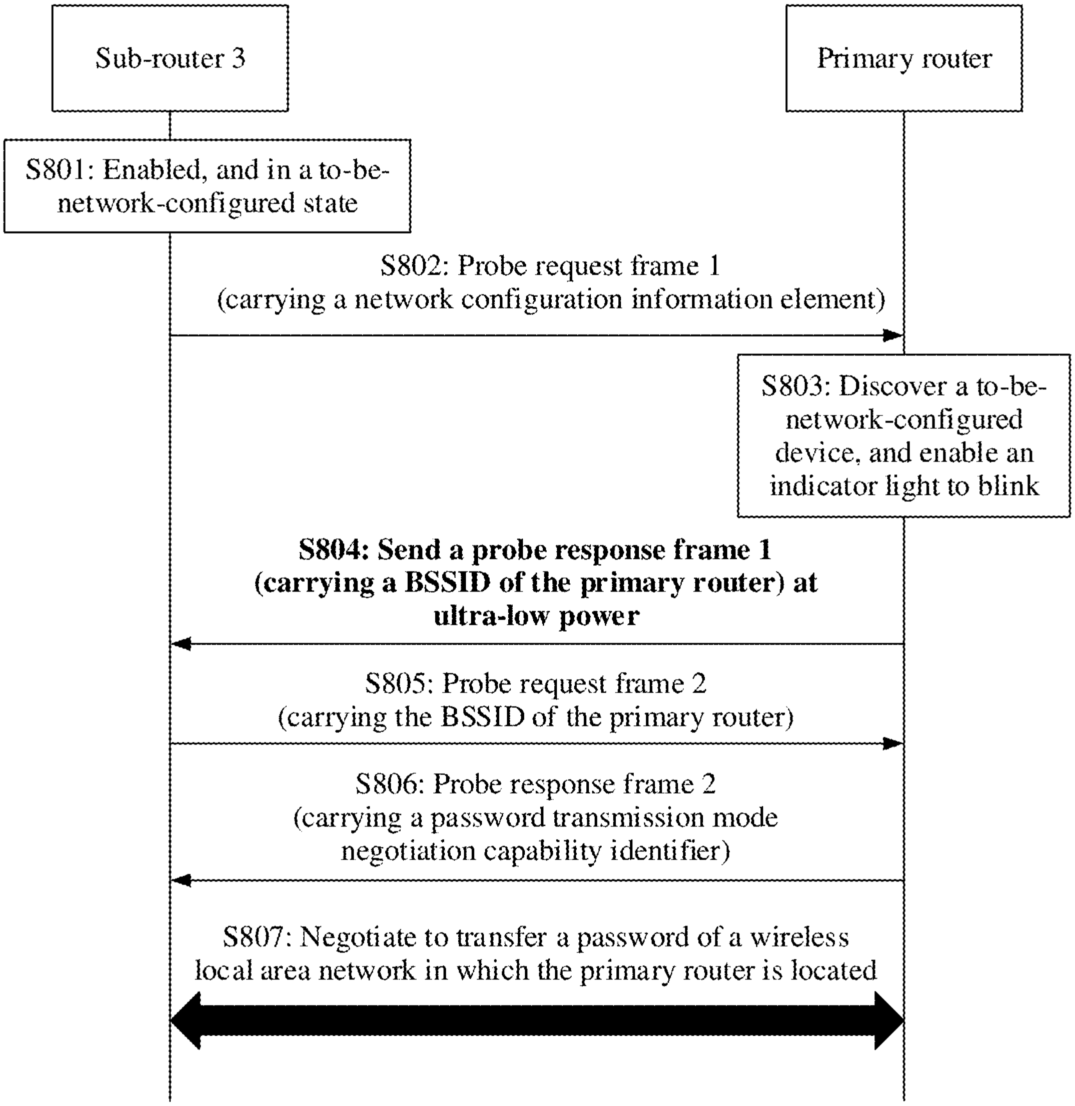
FIG. 8 shows an example of a flowchart of another network configuration method according to Embodiment 1 of this application.

FIG. 8 shows an example of a flowchart of another network configuration method according to Embodiment 1 of this application.

The embodiment shown in FIG. 8 is generally similar to the embodiment shown in FIG. 7, and the only difference lies in that in S806, the primary router sends a probe response frame 2 at normal power. In this way, after the sub-router 3 receives a probe response frame 1 sent by the primary router at ultra-low power, even if a distance between the sub-router 3 and the primary router is not within a first distance, the sub-router 3 may still receive the probe response frame 2 sent by the primary router at the normal power. In this way, in a network configuration process between the sub-router 3 and the primary router, after receiving the probe response frame 1, the sub-router 3 does not need to continue to be in a state of being close to the primary router. Compared with that in the embodiment in FIG. 7, duration in which the sub-router 3 needs to be in the state of being close to the primary router can be reduced.

That is, after the primary router discovers a sub-router 3 in a to-be-network-configured state, the primary router sends the probe response frame 1 at ultra-low power. If the distance between the sub-router 3 and the primary router is within the first distance, the sub-router 3 can receive the probe response frame 1 sent by the primary router at the ultra-low power. After receiving the probe response frame 1, the sub-router 3 sends a probe request frame 2 to the primary router. In response to the probe request frame 2 sent by the sub-router 3, the primary router may no longer send the probe response frame 2 at ultra-low power, but send the probe response frame 2 at normal power, where the normal power is greater than the ultra-low power. After the sub-router 3 receives the probe response frame 1, even if the distance between the sub-router 3 and the primary router is greater than the first distance, the sub-router 3 may still receive the probe response frame 2. In this way, in a network configuration process between the sub-router 3 and the primary router, after receiving the probe response frame 1, the sub-router 3 does not need to continue to be in the state of being close to the primary router. Compared with that in the embodiment in FIG. 7, duration in which the sub-router 3 needs to be in the state of being close to the primary router can be reduced.

Figure 9:
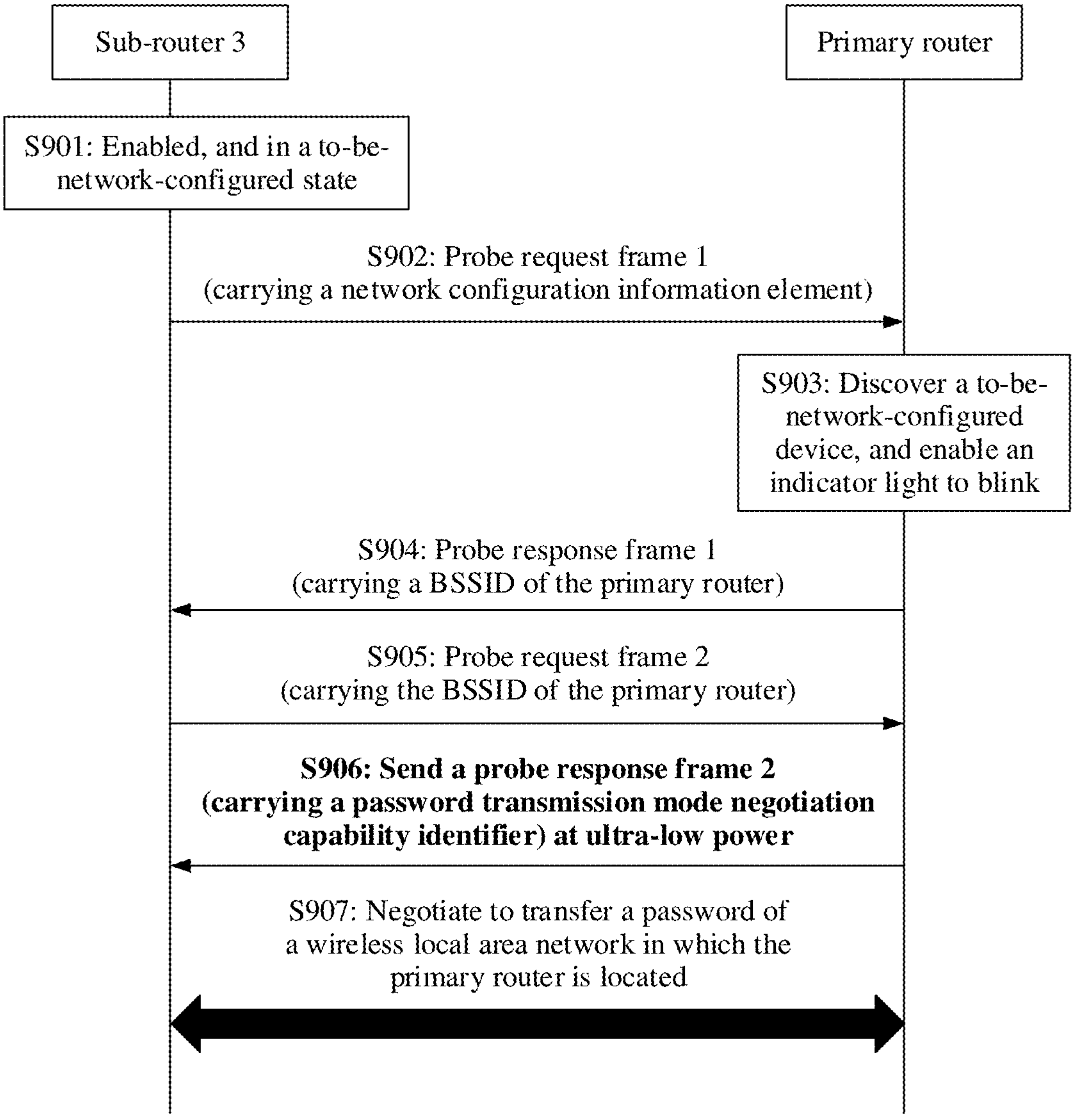
FIG. 9 shows an example of a flowchart of still another network configuration method according to Embodiment 1 of this application.

FIG. 9 shows an example of a flowchart of still another network configuration method according to Embodiment 1 of this application.

The embodiment shown in FIG. 9 is generally similar to the embodiment shown in FIG. 7, and the only difference lies in that in S904, the primary router sends a probe response frame 1 at normal power. In this way, the sub-router 3 does not need to be in a state of being close to the primary router at a timepoint other than a timepoint at which a probe response frame 2 is received. Compared with that in the embodiment in FIG. 7, duration in which the sub-router 3 needs to be in the state of being close to the primary router can be reduced.

That is, after the primary router discovers a sub-router 3 in a to-be-network-configured state, the primary router may not send the probe response frame 1 at ultra-low power, but send the probe response frame 1 at normal power. The normal power is greater than the ultra-low power. Even through a distance between the sub-router 3 and the primary router is not within a first distance, the sub-router 3 may still receive the probe response frame 1 sent by the primary router at the ultra-low power. After receiving the probe response frame 1, the sub-router 3 sends a probe request frame 2 to the primary router. In response to the probe request frame 2 sent by the sub-router 3, the primary router may send a probe response frame 2 at ultra-low power, and the sub-router 3 can receive the probe response frame 2 only when the distance between the sub-router 3 and the primary router is within the first distance. In this way, the sub-router 3 does not need to be in the state of being close to the primary router at a timepoint other than a timepoint at which the probe response frame 2 is received. Compared with that in the embodiment in FIG. 7, duration in which the sub-router 3 needs to be in the state of being close to the primary router can be reduced.

It can be learned from the embodiments shown in FIG. 7 to FIG. 9 that, in the network configuration method provided in embodiments of this application, at least one of one or more probe response messages sent by the primary router to the sub-router 3 is sent at ultra-low power. For example, at least one of the probe response frame 1 and the probe response frame 2 is sent at ultra-low power. Therefore, only when the sub-router 3 has an intention of actively approaching the primary router and establishing a networking connection, the sub-router 3 can receive the probe response message sent at ultra-low power. In this way, only when the sub-router 3 receives the probe response message sent at the ultra-low power, the subsequent steps can be performed, and the sub-router 3 can be added to a wireless local area network in which the primary router is located.

Figure 10:
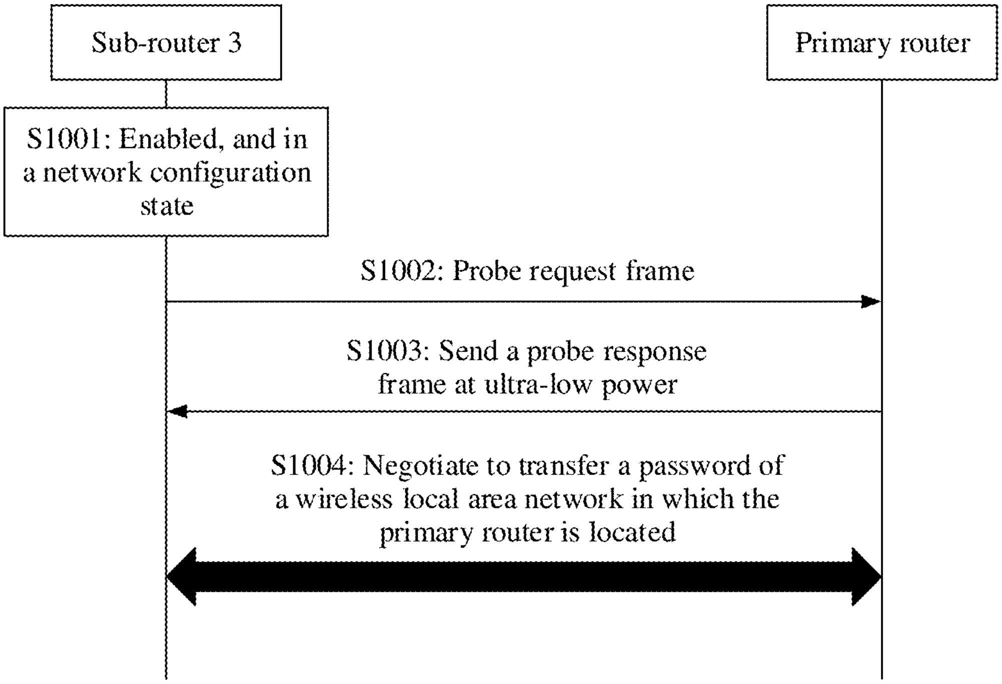
FIG. 10 shows an example of a flowchart of yet another network configuration method according to Embodiment 1 of this application.

FIG. 10 shows an example of a flowchart of yet another network configuration method according to Embodiment 1 of this application.

S1001: The sub-router 3 is enabled, and the sub-router 3 is in a network configuration state.

S1001 is similar to S201. For details, refer to the related description in S201. Details are not described in this embodiment of this application again.

S1002: When the sub-router 3 is in the network configuration state, the sub-router 3 sends a probe request (probe request) frame. Correspondingly, the primary router receives the probe request frame.

The probe request frame may be a probe request frame 1. The probe request frame 1 is used by another nearby device to discover the sub-router 3.

When the probe request frame is the probe request frame 1, the sub-router 3 sends the probe request frame 1 in a broadcast manner. If the primary router is within coverage of a transmit signal of the sub-router 3, the primary router receives and responds to the probe request frame 1, discovers a to-be-networked device, and enable an indicator light of the primary router to blink. The blinking of the indicator light of the primary router may be used as prompt information, to prompt a user that the primary router has discovered the to-be-networked device.

It should be noted that a manner in which the primary router responds to and receives the probe request frame 1 is not limited in embodiments of this application. The primary router may respond to and receive the probe request frame 1 in a manner of blinking an indicator light, or the primary router may respond to and receive the probe request frame 1 in another manner, or the primary router may not respond to and receive the probe request frame 1 in an explicit manner visible to the user, or the primary router may not respond to and receive the probe request frame 1, or the like.

The probe request frame 1 may be the probe request frame 1 sent by the sub-router 3 to the primary router in S702 in the embodiment in FIG. 7.

Alternatively, the probe request frame 1 may be the probe request frame 1 sent by the sub-router 3 to the primary router in S802 in the embodiment in FIG. 8.

Alternatively, the probe request frame 1 may be the probe request frame 1 sent by the sub-router 3 to the primary router in S902 in the embodiment in FIG. 9.

When the probe request frame is the probe request frame 1, S1002 is similar to S202. For a specific explanation of S1002, refer to the related description in S202. Details are not described in this embodiment of this application again.

Alternatively, the probe request frame may be a probe request frame 2. The probe request frame 2 is used by the sub-router 3 to initiate a request for establishing a networking connection to the primary router.

The probe request frame 2 may be the probe request frame 2 sent by the sub-router 3 to the primary router in S705 in the embodiment in FIG. 7.

Alternatively, the probe request frame 2 may be the probe request frame 2 sent by the sub-router 3 to the primary router in S805 in the embodiment in FIG. 8.

Alternatively, the probe request frame 2 may be the probe request frame 2 sent by the sub-router 3 to the primary router in S905 in the embodiment in FIG. 9.

When the probe request frame is the probe request frame 2, S1002 is similar to S205. For a specific explanation of S1002, refer to the related description in S205. Details are not described in this embodiment of this application again.

S1003: After receiving the probe request frame, the primary router sends a probe response (probe response) frame to the sub-router 3 at ultra-low power. Correspondingly, the sub-router 3 receives the probe response frame.

The probe response frame may be a probe response frame 1. The probe response frame 1 is used to notify the sub-router 3 that the primary router receives the probe request frame 1.

The probe response frame 1 may be the probe response frame 1 sent by the primary router to the sub-router 3 at ultra-low power in S704 in the embodiment in FIG. 7.

Alternatively, the probe response frame 1 may be the probe response frame 1 sent by the primary router to the sub-router 3 at ultra-low power in S804 in the embodiment in FIG. 8.

When the probe response frame is the probe response frame 1, S1003 is similar to S704. For a specific explanation of S1003, refer to the related description in S704. Details are not described in this embodiment of this application again.

The probe response frame may be a probe response frame 2. The probe response frame 2 is used to notify the sub-router 3 that the primary router agrees to establish a networking connection to the sub-router 3.

The probe response frame 2 may be the probe response frame 2 sent by the primary router to the sub-router 3 at ultra-low power in S706 in the embodiment in FIG. 7.

Alternatively, the probe response frame 2 may be the probe response frame 2 sent by the primary router to the sub-router 3 at ultra-low power in S906 in the embodiment in FIG. 9.

When the probe response frame is the probe response frame 2, S1003 is similar to S706. For a specific explanation of S1003, refer to the related description in S706. Details are not described in this embodiment of this application again.

The following describes a correspondence between the probe request frame 1 or the probe request frame 2 and the probe response frame 1 or the probe response frame 2.

When the probe request frame in S1002 is the probe request frame 1, the probe response frame in S1003 may be the probe response frame 1.

In S1002, the probe request frame sent by the sub-router 3 is the probe request frame 1, and the primary router receives the probe request frame 1, in S1003, in response to the probe request frame 1, the primary router sends the probe response frame 1 at ultra-low power.

In this case, after S1003 is performed and before S1004 is performed, the sub-router 3 receives the probe response frame 1 sent by the primary router at ultra-low power. In response to the probe response frame 1, the sub-router 3 sends the probe request frame 2 to the primary router.

After receiving the probe request frame 2, the primary router responds to the probe request frame 2. In a possible implementation, the primary router may send the probe response frame 2 to the sub-router 3 at ultra-low power. In another possible implementation, the primary router may alternatively send the probe response frame 2 to the sub-router 3 at normal power. The ultra-low power is less than the normal power.

When the probe request frame in S1002 is the probe request frame 1, the probe response frame in S1003 may be the probe response frame 2.

In S1002, the probe request frame sent by the sub-router 3 is the probe request frame 1, and the primary router receives the probe request frame 1. In this case, before S1003 is performed, in a possible implementation, the primary router may send the probe response frame 1 to the sub-router 3 at ultra-low power. In another possible implementation, the primary router may alternatively send the probe response frame 1 to the sub-router 3 at normal power. The ultra-low power is less than the normal power.

The sub-router 3 receives the probe response frame 1 sent by the primary router. In response to the probe response frame 1, the sub-router 3 sends the probe request frame 2 to the primary router.

Before S1003 is performed, the primary router receives the probe request frame 2. In S1003, in response to the probe request frame 2, the primary router sends the probe response frame 2 to the sub-router 3 at ultra-low power.

When the probe request frame in S1002 is the probe request frame 2, the probe response frame in S1003 may be the probe response frame 2.

In S1002, the probe request frame sent by the sub-router 3 is the probe request frame 2. In this case, after S1001 is performed and before S1002 is performed, the sub-router 3 sends the probe request frame 1 in a broadcast manner, the primary router receives and responds to the probe request frame 1, discovers a to-be-networked sub-router 3, and enables an indicator light of the primary router to blink. The blinking of the indicator light of the primary router may be used as prompt information, to prompt a user that the primary router has discovered the to-be-networked sub-router 3. Then, in another possible implementation, the primary router may send the probe response frame 1 to the sub-router 3 at ultra-low power. In another possible implementation, the primary router may alternatively send the probe response frame 1 to the sub-router 3 at normal power. The ultra-low power is less than the normal power.

After the sub-router 3 receives the probe response frame 1, in S1002, the sub-router 3 sends the probe request frame 2 to the primary router.

After the primary router receives the probe request frame 2, in S1003, the primary router sends the probe response frame 2 to the sub-router 3 at ultra-low power.

S1004: The sub-router 3 negotiates with the primary router to transfer a password of a wireless local area network in which the primary router is located.

S1004 is similar to S208. For details, refer to the related description in S208. Details are not described in this embodiment of this application again.

Figure 11:
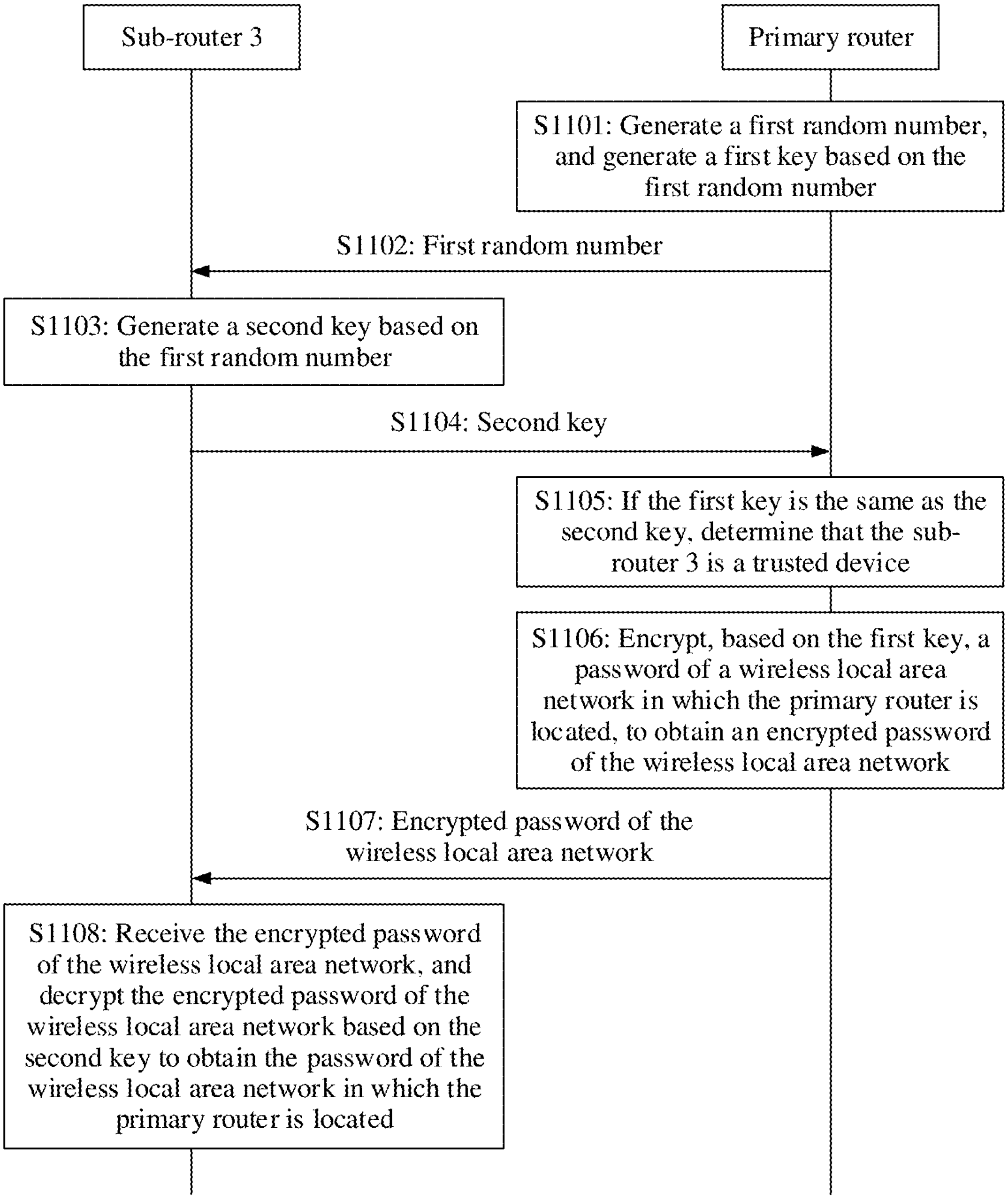
FIG. 11 shows an example of a process in which a sub-router 3 negotiates with a primary router to transfer a password of a wireless local area network in which the primary router is located according to Embodiment 1 of this application.

FIG. 11 shows an example of a process in which the sub-router 3 negotiates with the primary router to transfer a password of a wireless local area network in which the primary router is located according to Embodiment 1 of this application.

In some embodiments, in a process in which the sub-router 3 negotiates with the primary router to transfer the password of the wireless local area network in which the primary router is located, a message sent by the primary router to the sub-router 3 may be sent at ultra-low power. That is, before the sub-router 3 obtains the password of the wireless local area network in which the primary router is located (after S706 is performed and before S1108 is performed), the sub-router 3 needs to be always in a state of being close to the primary router.

In some other embodiments, in a process in which the sub-router 3 negotiates with the primary router to transfer the password of the wireless local area network in which the primary router is located, a message sent by the primary router to the sub-router 3 may be sent at normal power. That is, before the sub-router 3 obtains the password of the wireless local area network in which the primary router is located, the sub-router 3 does not need to be always in a state of being close to the primary router. The following embodiment of this application is described by using an example in which the primary router sends a message to the sub-router 3 at normal power in a process in which the sub-router 3 negotiates with the primary router to transfer the password of the wireless local area network in which the primary router is located.

After a networking connection between the sub-router 3 and the primary router is determined to be established, the primary router may no longer send a packet frame to the sub-router 3 at ultra-low power, but sends a packet frame at normal power. That is, in S1101 to S1108, the primary router may send a packet frame to the sub-router 3 at normal power. The normal power is greater than the ultra-low power. Therefore, for example, in the entire network configuration process, the user only needs to ensure that the sub-router 3 is close to the primary router within a short period of time after the indicator light of the primary router blinks (S703), so that the sub-router 3 and the primary router can complete the steps (S704 to S706) in which the networking connection is determined to be established within the short period of time. The short period of time may be several seconds, for example, within 5 seconds. In the steps after S706, a packet frame may be transmitted between the sub-router 3 and the primary router at normal power. In this case, the sub-router 3 does not need to be always in the state of being close to the primary router.

S1101: The primary router generates a first random number, and generates a first key based on the first random number.

S1102: The primary router sends the first random number to the sub-router 3.

S1103: The sub-router 3 receives the first random number, and generates a second key based on the first random number.

S1104: The sub-router 3 sends the second key to the primary router.

S1105: If the first key is the same as the second key, the primary router determines that the sub-router 3 is a trusted device.

Before the sub-router 3 negotiates with the primary router through WPS to transmit the password of the wireless local area network in which the primary router is located, a corresponding protocol is preset in the sub-router 3 and the primary router, and the primary router may generate the first key based on the first random number through the protocol. The sub-router 3 may also generate the second key based on the first random number through the protocol.

After the primary router receives the second key sent by the sub-router 3, the primary router determines whether the first key is the same as the second key. If the primary router determines that the first key is the same as the second key, the primary router determines that the sub-router 3 is a trusted device.

S1106: The primary router encrypts, based on the first key, the password of the wireless local area network in which the primary router is located, to obtain an encrypted password of the wireless local area network.

S1107: The primary router sends the encrypted password of the wireless local area network to the sub-router 3.

After the primary router determines that the sub-router 3 is a trusted device, the primary router encrypts, based on the first key, the password of the wireless local area network in which the primary router is located, to obtain the encrypted password of the wireless local area network.

The primary router sends the encrypted password of the wireless local area network to the sub-router 3.

S1108: The sub-router 3 receives the encrypted password of the wireless local area network, and decrypts the encrypted password of the wireless local area network based on the second key to obtain the password of the wireless local area network in which the primary router is located.

The sub-router 3 receives the encrypted password of the wireless local area network, and decrypts the encrypted password of the wireless local area network based on the second key to obtain the password of the wireless local area network in which the primary router is located.

S1101 to S1108 are a process in which the sub-router 3 negotiates with the primary router through WPS to transmit the password of the wireless local area network in which the primary router is located. The sub-router 3 may alternatively negotiate with the primary router in another manner to transfer the password of the wireless local area network in which the primary router is located. This is not limited in embodiments of this application.

After the networking connection between the sub-router 3 and the primary router is established, the sub-router 3 and the primary router complete a process of parameter negotiation and parameter synchronization, to ensure that parameter information of the sub-router 3 is consistent with that of the primary router after the networking connection between the sub-router and the primary router is established. In this way, the sub-router 3 and the primary router can form a mesh network.

In some embodiments, in a process in which the sub-router 3 and the primary router complete parameter negotiation and parameter synchronization, a message sent by the primary router to the sub-router 3 may be sent at ultra-low power. That is, before the sub-router 3 is successfully added to the mesh network in which the primary router is located (after S1108 is performed and before S1208 is performed), the sub-router 3 needs to be always in the state of being close to the primary router.

In some other embodiments, in a process in which the sub-router 3 and the primary router complete parameter negotiation and parameter synchronization, a message sent by the primary router to the sub-router 3 may be sent at normal power. That is, in the process in which the sub-router 3 and the primary router complete parameter negotiation and parameter synchronization, the sub-router 3 does not need to be always in the state of being close to the primary router. The following embodiment of this application is described by using an example in which the primary router sends a message to the sub-router 3 at normal power in the process in which the sub-router 3 and the primary router complete parameter negotiation and parameter synchronization.

After the sub-router 3 and the primary router form the mesh network, when a smart device (for example, a mobile phone) switches from a connection to the sub-router 3 to a connection to the primary router, a current service interruption problem of the smart device does not occur.

For example, the smart device (like the mobile phone) is initially located in a signal coverage area of the sub-router 3, and makes a video call with another device (for example, a tablet) by using a wireless network provided by the sub-router 3. When the smart device moves and is within the signal coverage of the sub-router 3, and within a signal coverage of the primary router, the smart device switches from the connection to the sub-router 3 to the connection to the primary router. Because the sub-router 3 and the primary router form the mesh network, in a process in which the smart device switches the connection to the sub-router 3 to the connection to the primary router, a problem of interruption or frame freezing during a video call between the smart device and the another device (for example, the tablet) does not occur.

The parameter information includes one or more of the following: a frequency band of a wireless network, a channel type, a data transmission rate, and the like. The parameter information of the primary router may further include more other information, which is not listed one by one in this embodiment of this application.

Figure 12:
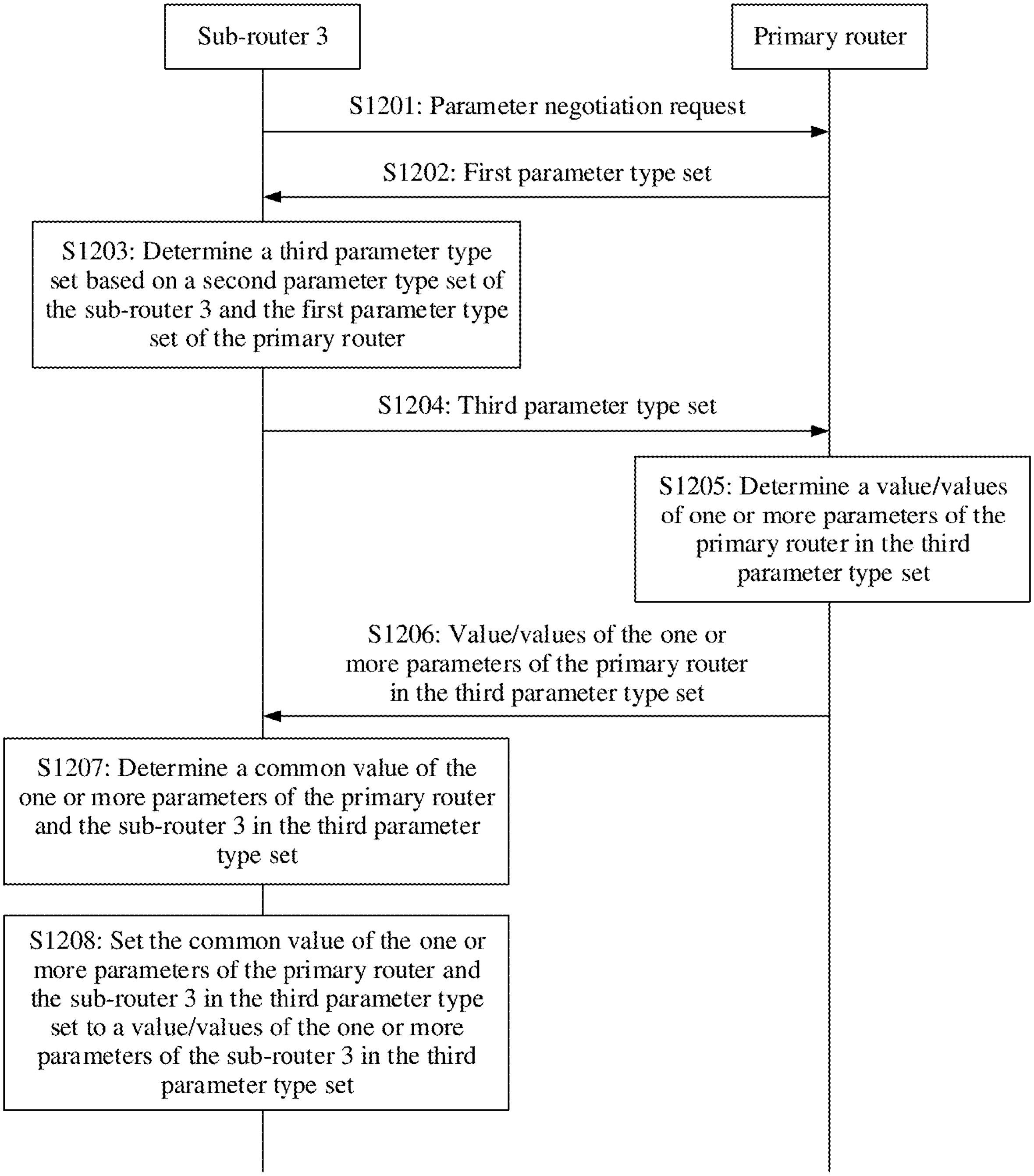
FIG. 12 shows an example of a schematic flowchart of a method for negotiating parameter information between a sub-router 3 and a primary router according to Embodiment 1 of this application.

As shown in FIGS. 12, S1201 to S1208 show an example of a schematic flowchart of a method for negotiating parameter information between the sub-router 3 and the primary router. S1201 to S1208 merely show an example of a process of negotiating parameter information between the sub-router 3 and the primary router. It should be noted that, in some embodiments, the process of negotiating parameter information between the sub-router 3 and the primary router may include more or fewer steps than S1201 to S1208. This is not limited in embodiments of this application. In addition, an execution sequence of steps S1201 to S1208 is not limited in this embodiment of this application.

After a networking connection between the sub-router and the primary router is determined to be established (that is, S706), the primary router no longer sends a packet frame to the sub-router 3 at ultra-low power, but sends a packet frame at normal power. That is, in S1201 to S1208, the primary router may send a packet frame to the sub-router 3 at normal power. The ultra-low power is less than the normal power.

S1201: The sub-router 3 sends a parameter negotiation request to the primary router.

After the sub-router 3 is connected to a wireless local area network in which the primary router is located, the sub-router 3 sends a parameter negotiation request to the primary router.

S1202: The primary router receives and responds to the parameter negotiation request sent by the sub-router 3, and the primary router sends a first parameter type set to the sub-router 3.

The first parameter type set may include all parameter types of the primary router, and all parameter types of the primary router include but are not limited to a frequency band of the primary router, a channel type of the primary router, a data transmission rate of the primary router, and the like. The first parameter type set may further include another parameter. This is not limited in this application.

S1203: After the sub-router 3 receives the first parameter type set sent by the primary router, the sub-router 3 determines a third parameter type set based on a second parameter type set of the sub-router 3 and the first parameter type set of the primary router.

The second parameter type set of the sub-router 3 may include all parameter types of the sub-router 3, and all parameter types of the sub-router 3 may include but are not limited to a frequency band of the sub-router 3, a channel type of the sub-router 3, a data transmission rate of the sub-router 3, and the like. The second parameter type set may further include another parameter. This is not limited in this application.

The third parameter type set may include a parameter type shared by the sub-router 3 and the primary router.

The sub-router 3 determines the third parameter type set based on the second parameter type set of the sub-router 3 and the first parameter type set of the primary router. For example, the first parameter type set includes the frequency band of the primary router, the channel type of the primary router, the data transmission rate of the primary router, and the like, and the second parameter type set includes the frequency band of the sub-router 3, the channel type of the primary router, the data transmission rate of the primary router, and the like. In this case, the sub-router 3 determines that the third parameter type set includes a frequency band, a channel type, and a data transmission rate. For example, the first parameter type set includes the frequency band of the primary router, the channel type of the primary router, the data transmission rate of the primary router, and the like, and the second parameter type set includes the channel type of the sub-router 3, the data transmission rate of the sub-router 3, and the like. In this case, the sub-router 3 determines that the third parameter type set includes a channel type, and a data transmission rate.

S1204: The sub-router 3 sends the third parameter type set to the primary router.

In some embodiments, to ensure security of data transmission between the sub-router 3 and the primary router, the sub-router 3 encrypts the third parameter type set based on a datagram transport layer security (datagram transport layer security, DTLS) protocol to obtain an encrypted third parameter type set, and the sub-router 3 sends the encrypted third parameter type set to the primary router.

S1205: After receiving the third parameter type set, the primary router determines a value/values of one or more parameters of the primary router in the third parameter type set.

In some embodiments, after the primary router receives the encrypted third parameter type set, the primary router decrypts the encrypted third parameter type set based on the DTLS protocol, to obtain the third parameter type set. The third parameter type set includes one or more parameters.

The primary router determines a value/values of one or more parameters of the primary router in the third parameter type set.

S1206: The primary router sends the value/values of the one or more parameters of the primary router in the third parameter type set to the sub-router 3.

In some embodiments, the primary router encrypts the value/values of the one or more parameters of the primary router in the third parameter type set based on the DTLS protocol, and then sends encrypted value/values to the sub-router 3.

For example, the primary router encrypts a value of the frequency band of the primary router, a value of the channel type of the primary router, and a value of the data transmission rate of the primary router, and then sends encrypted value to the sub-router 3. For example, the value of the frequency band of the primary router may include 150 M, 300 M, and 450 M; the value of the channel type of the primary router may include 2.4 G; and the value of the data transmission rate of the primary router may include 802.11n and 802.11ac.

S1207: The sub-router 3 receives the value/values that are of the one or more parameters of the primary router in the third parameter type set and that are sent by the primary router, and determines a common value of the one or more parameters of the primary router and the sub-router 3 in the third parameter type set based on the value/values of the one or more parameters of the primary router in the third parameter type set and the value/values of the one or more parameters of the sub-router 3 in the third parameter type set.

In some embodiments, after receiving the value/values, encrypted through the DTLS protocol, that are of the one or more parameters of the primary router in the third parameter type set and that are sent by the primary router, the sub-router 3 decrypts, through the DTLS protocol, the value/values, encrypted through the DTLS protocol, of the one or more parameters of the primary router in the third parameter type set, to obtain the value/values of the one or more parameters of the primary router in the third parameter type set.

The sub-router 3 determines a value/values of one or more parameters of the sub-router 3 in the third parameter type set.

For example, the value/values of one or more parameters of the sub-router 3 in the third parameter type set includes/include: a value of the frequency band of the sub-router 3 includes 150 M, 300 M, and 450 M; a value of the channel type of the primary router includes 2.4 G and 5 G; and a value of a data transmission rate of the primary router includes 802.11n and 802.11ac.

In this case, the sub-router 3 determines a common value of one or more parameters of the primary router and the sub-router 3 in the third parameter type set based on the value/values of the one or more parameters of the primary router in the third parameter type set and the value/values of the one or more parameters of the sub-router 3 in the third parameter type set.

For example, the common value of the one or more parameters of the primary router and the sub-router 3 in the third parameter type set includes: A value of a frequency band includes 150 M, 300 M, and 450 M; a value of a channel type is 2.4 G; and a data transmission rate includes 802.11n and 802.11ac.

S1208: The sub-router 3 sets the common value of the one or more parameters of the primary router and the sub-router 3 in the third parameter type set to the value/values of the one or more parameters of the sub-router 3 in the third parameter type set.

For example, the sub-router 3 sets the value of the frequency band of the sub-router 3 to 150 M, 300 M, and 450 M, the value of the channel type of the sub-router 3 to 2.4 G, and the data transmission rate of the sub-router 3 to 802.11n and 802.11ac.

After the sub-router 3 and the primary router complete parameter negotiation and parameter synchronization, an indicator light of the primary router is steady on. The steady-on of the indicator light of the primary router is used as indication information indicating that network configuration of the sub-router 3 succeeds, and the sub-router 3 is successfully added to the mesh network in which the primary router is located.

Embodiment 2

In an application scenario in which a smart device 100 (for example, a mobile phone) is networked to a primary router, after the primary router discovers the to-be-network-configured smart device 100, the primary router sends, at ultra-low power, a name of a wireless local area network in which the primary router is located and/or sends, at ultra-low power, a message in response to a network configuration request to the smart device 100. Only when a distance between the smart device 100 and the primary router is close enough (for example, within a first distance), the smart device 100 can receive the name, sent by the primary router at the ultra-low power, of the wireless local area network in which the primary router is located, and/or the message, in response to the network configuration request, sent by the primary router at the ultra-low power. After the smart device 100 receives the name of the wireless local area network in which the primary router is located and the message in response to the network configuration request, the smart device 100 negotiates with the primary router to transmit a password of the wireless local area network in which the primary router is located. In this way, after obtaining the name and the password of the wireless local area network in which the primary router is located, the smart device 100 may be connected to the primary router. According to the method, a user does not need to perform manual intervention on the primary router or manually enter a primary router password on the smart device 100, and only needs to make the smart device 100 close to the primary router (for example, make the distance between the smart device 100 and the primary router within the first distance), so that the smart device 100 can be automatically connected to the primary router. This improves user experience.

In Embodiment 2, the smart device 100 only needs to obtain the name and the password of the wireless local area network in which the primary router is located, and then is connected to the wireless local area network in which the primary router is located. The smart device 100 does not need to complete a process of parameter negotiation and parameter synchronization with the primary router as the smart device 100 does not need to form a mesh network with the primary router. That is, the smart device 100 is always in a STA mode, and the smart device 100 is only used as an access device of the primary router, and does not need to be in an AP mode as an access point of the another device. Therefore, the smart device 100 does not need to complete the process of parameter negotiation and parameter synchronization with the primary router.

Figure 13:
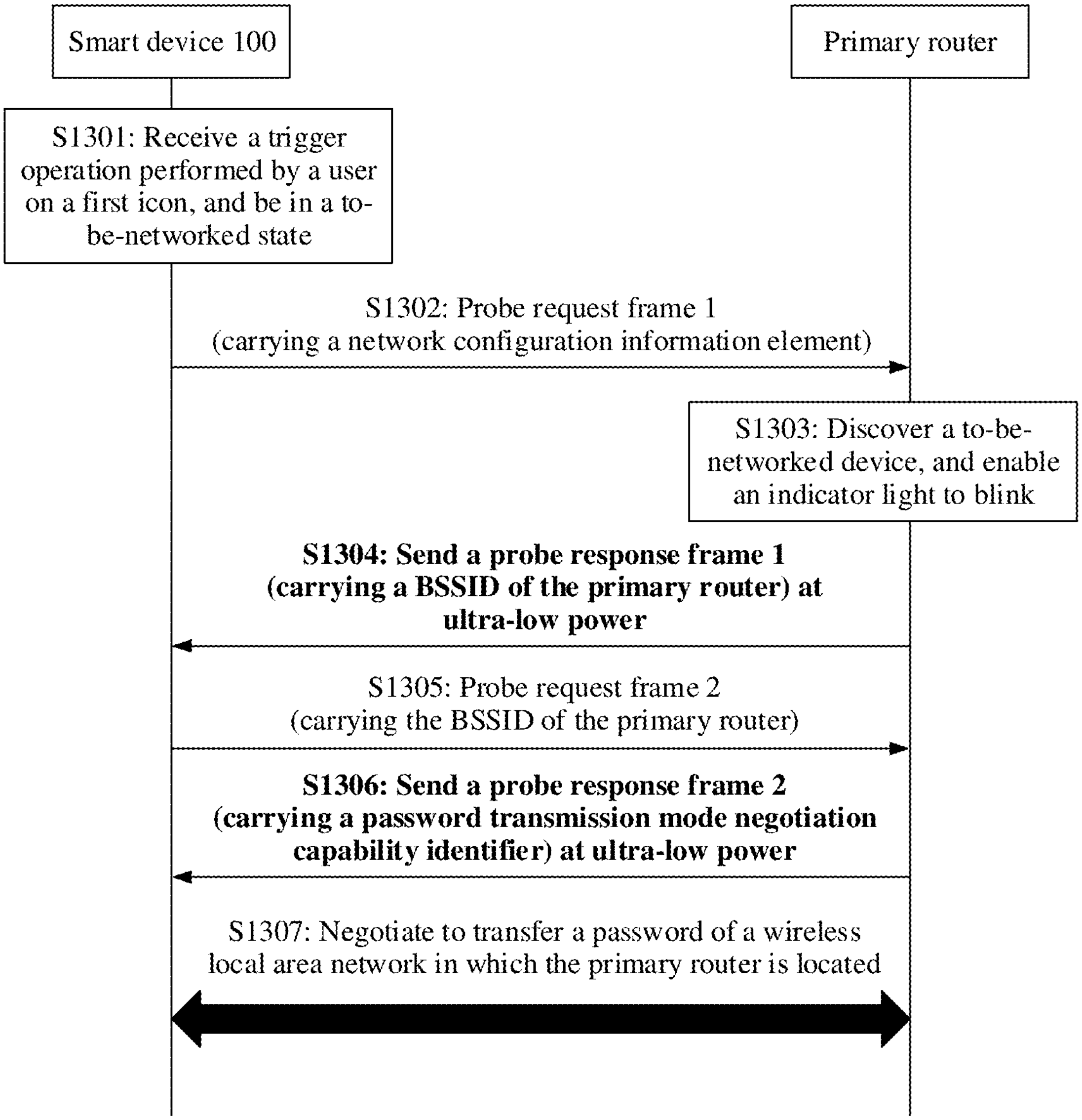
FIG. 13 shows an example of a flowchart of a network configuration method according to Embodiment 2 of this application.

FIG. 13 shows an example of a flowchart of a network configuration method according to Embodiment 2 of this application.

S1301 to S1303 are a process in which the primary router discovers a to-be-networked device.

S1304 to S1306 are a process in which a networking connection between the smart device 100 and the primary router is determined to be established.

In S1307, the smart device 100 negotiates with the primary router to transfer the password of the wireless local area network in which the primary router is located.

S1301: The smart device 100 receives a trigger operation performed by a user on a first icon, where the smart device 100 is in a to-be-networked state.

The first icon is the name of the wireless local area network in which the primary router is located. The smart device 100 receives the trigger operation (for example, a tap operation) performed by the user on the first icon, and the smart device 100 is in the to-be-networked state.

For example, as shown in FIG. 3C, the first icon may be the identifier 312 of "Wireless network 001" in FIG. 3C.

S1302: When the smart device 100 is in the to-be-networked state, the smart device 100 sends a probe request (probe request) frame 1.

S1303: The primary router receives and responds to the probe request frame 1, and discovers the to-be-networked device, and enables an indicator light of the primary router to blink.

S1304: In response to the probe request frame 1 sent by the smart device 100, the primary router sends a probe response (probe response) frame 1 to the smart device 100 at ultra-low power. Correspondingly, the smart device 100 receives the probe response frame 1.

S1305: The smart device 100 receives and responds to the probe response frame 1 sent by the primary router at ultra-low power, and sends a probe request (probe request) frame 2 to the primary router. Correspondingly, the primary router receives the probe request frame 2.

S1306: The primary router receives and responds to the probe request frame 2, and sends a probe response (probe response) frame 2 to the smart device 100 at ultra-low power. Correspondingly, the smart device 100 receives the probe response frame 2.

S1307: The smart device 100 negotiates with the primary router to transfer the password of the wireless local area network in which the primary router is located.

The embodiment shown in FIG. 13 is similar to the embodiment shown in FIG. 7, and a difference lies in that the embodiment shown in FIG. 7 describes a process of establishing a network connection between the sub-router 3 and the primary router, and the embodiment shown in FIG. 13 describes a process of establishing a network connection between the smart device 100 and the primary router. For a specific explanation of the embodiment shown in FIG. 13, refer to the embodiment shown in FIG. 7. Details are not described herein again in this embodiment of this application.

Figure 14:
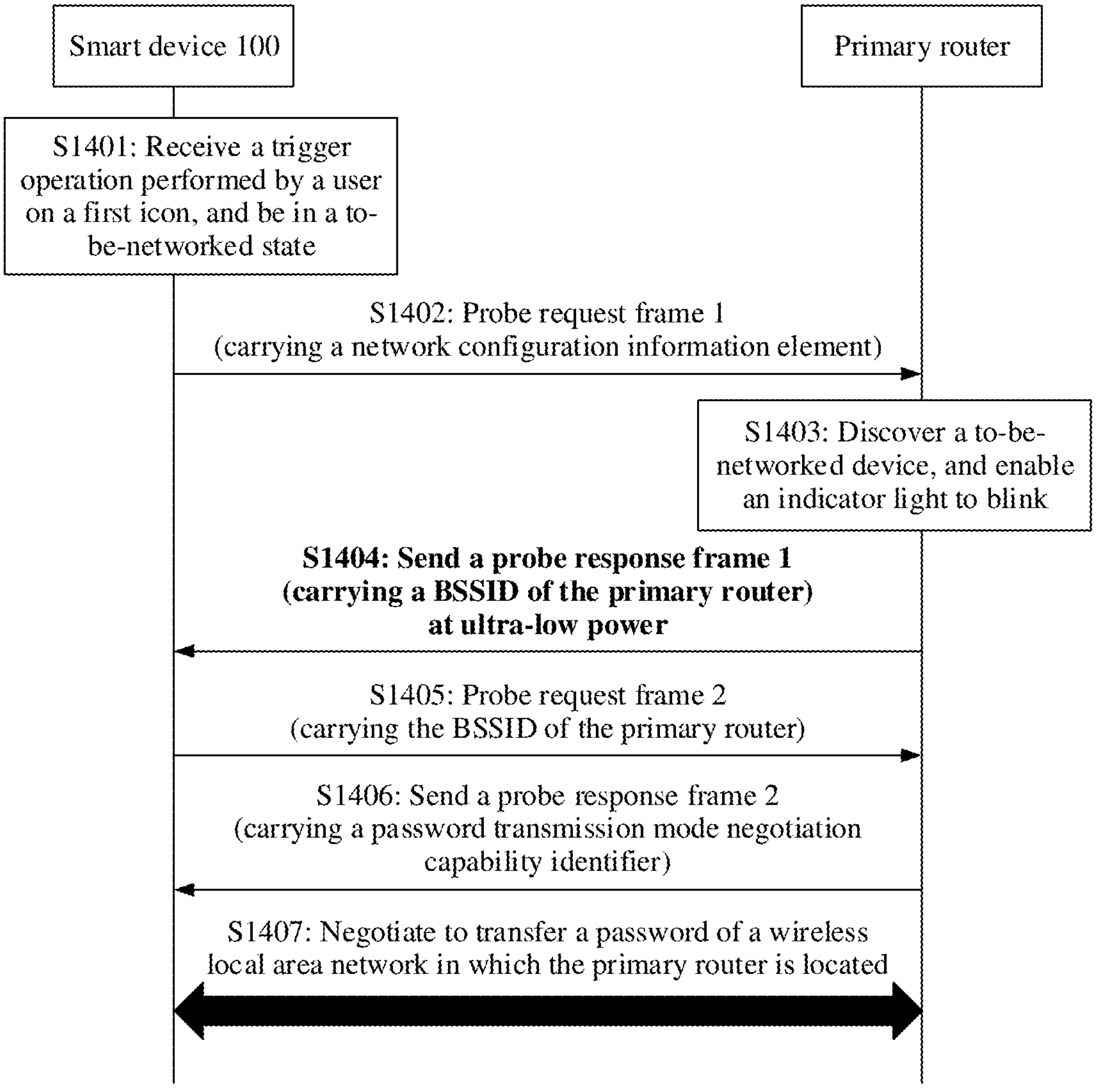
FIG. 14 shows an example of a flowchart of another network configuration method according to Embodiment 2 of this application.

FIG. 14 shows an example of a flowchart of another network configuration method according to Embodiment 2 of this application.

The embodiment shown in FIG. 14 is generally similar to the embodiment shown in FIG. 13, and the only difference lies in that in S1406, the primary router sends a probe response frame 2 at normal power. In this way, after the smart device 100 receives a probe response frame 1 sent by the primary router at ultra-low power, even if a distance between the smart device 100 and the primary router is not within a first distance, the smart device 100 may still receive the probe response frame 2 sent by the primary router at the normal power. In this way, in a network configuration process between the smart device 100 and the primary router, after receiving the probe response frame 1, the smart device 100 does not need to continue to be in a state of being close to the primary router. Compared with that in the embodiment in FIG. 13, duration in which the smart device 100 needs to be in the state of being close to the primary router can be reduced.

The embodiment shown in FIG. 14 is similar to the embodiment shown in FIG. 8, and a difference lies in that the embodiment shown in FIG. 8 describes a process of establishing a network connection between the sub-router 3 and the primary router, and the embodiment shown in FIG. 14 describes a process of establishing a network connection between the smart device 100 and the primary router. For a specific explanation of the embodiment shown in FIG. 14, refer to the embodiment shown in FIG. 8. Details are not described herein again in this embodiment of this application.

Figure 15:
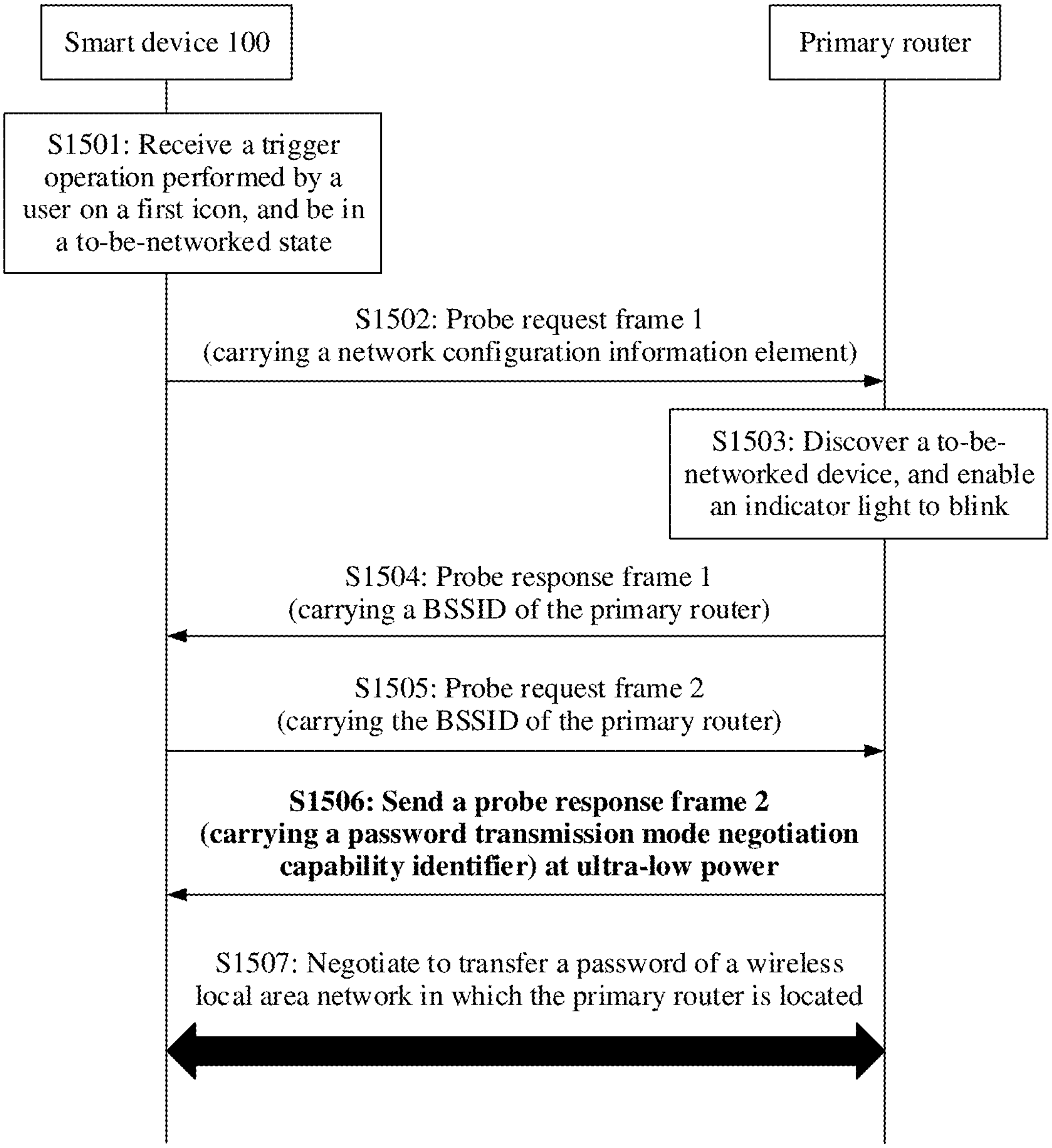
FIG. 15 shows an example of a flowchart of still another network configuration method according to Embodiment 2 of this application.

FIG. 15 shows an example of a flowchart of still another network configuration method according to Embodiment 2 of this application.

The embodiment shown in FIG. 15 is generally similar to the embodiment shown in FIG. 13, and the only difference lies in that in S1504, the primary router sends a probe response frame 1 at normal power. In this way, the smart device 100 does not need to be in a state of being close to the primary router at a timepoint other than a timepoint at which a probe response frame 2 is received. Compared with that in the embodiment in FIG. 13, duration in which the smart device 100 needs to be in the state of being close to the primary router can be reduced.

The embodiment shown in FIG. 15 is similar to the embodiment shown in FIG. 9, and a difference lies in that the embodiment shown in FIG. 9 describes a process of establishing a network connection between the sub-router 3 and the primary router, and the embodiment shown in FIG. 15 describes a process of establishing a network connection between the smart device 100 and the primary router. For a specific explanation of the embodiment shown in FIG. 15, refer to the embodiment shown in FIG. 9. Details are not described herein again in this embodiment of this application.

It can be learned from the embodiments shown in FIG. 13 to FIG. 15 that, in the network configuration method provided in embodiments of this application, at least one of one or more probe response messages sent by the primary router to the smart device 100 is sent at ultra-low power. For example, at least one of the probe response frame 1 and the probe response frame 2 is sent at ultra-low power. Therefore, only when the smart device 100 has an intention of actively approaching the primary router and establishing a networking connection, the smart device 100 can receive the probe response message sent at ultra-low power. In this way, only when the smart device 100 receives the probe response message sent at the ultra-low power, the subsequent steps can be performed, and the smart device 100 can be added to the wireless local area network in which the primary router is located.

Figure 16:
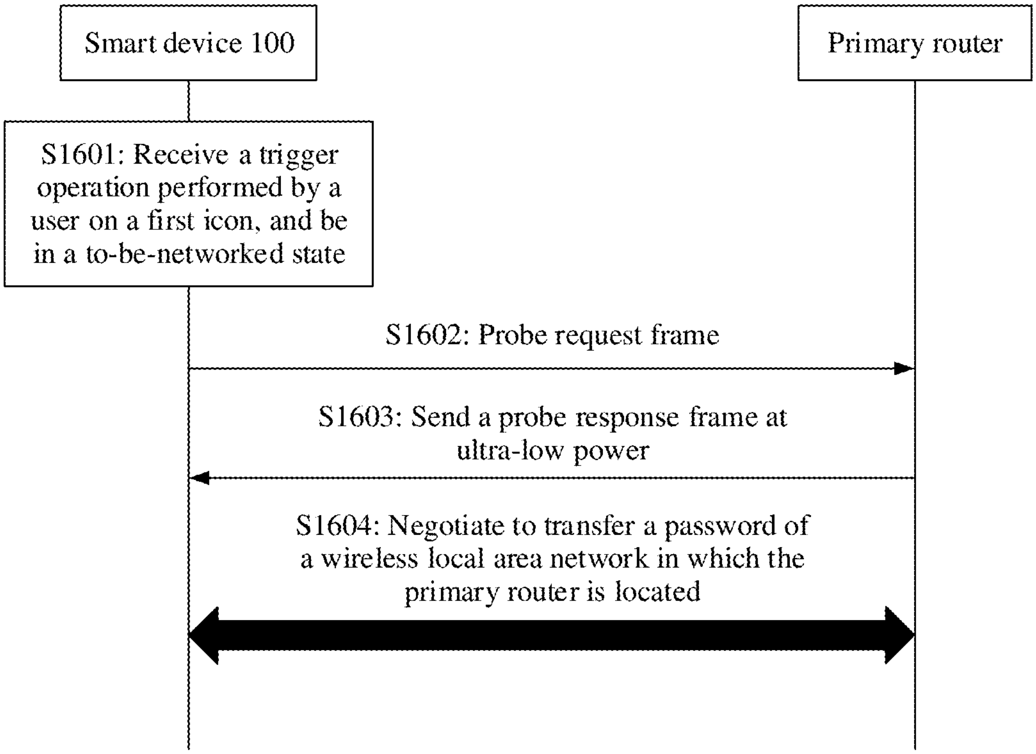
FIG. 16 shows an example of a flowchart of yet another network configuration method according to Embodiment 2 of this application.

FIG. 16 shows an example of a flowchart of yet another network configuration method according to Embodiment 2 of this application.

S1601: The smart device 100 receives a trigger operation performed by a user on a first icon, where the smart device 100 is in a to-be-networked state.

S1602: When the smart device 100 is in a network configuration state, the smart device 100 sends a probe request (probe request) frame. Correspondingly, the primary router receives the probe request frame.

S1603: After receiving the probe request frame, the primary router sends a probe response (probe response) frame to the smart device 100 at ultra-low power. Correspondingly, the smart device 100 receives the probe response frame.

S1604: The smart device 100 negotiates with the primary router to transfer the password of the wireless local area network in which the primary router is located.

The embodiment shown in FIG. 16 is similar to the embodiment shown in FIG. 10, and a difference lies in that the embodiment shown in FIG. 10 describes a process of establishing a network connection between the sub-router 3 and the primary router, and the embodiment shown in FIG. 16 describes a process of establishing a network connection between the smart device 100 and the primary router. For a specific explanation of the embodiment shown in FIG. 16, refer to the embodiment shown in FIG. 10. Details are not described herein again in this embodiment of this application.

Figure 17:
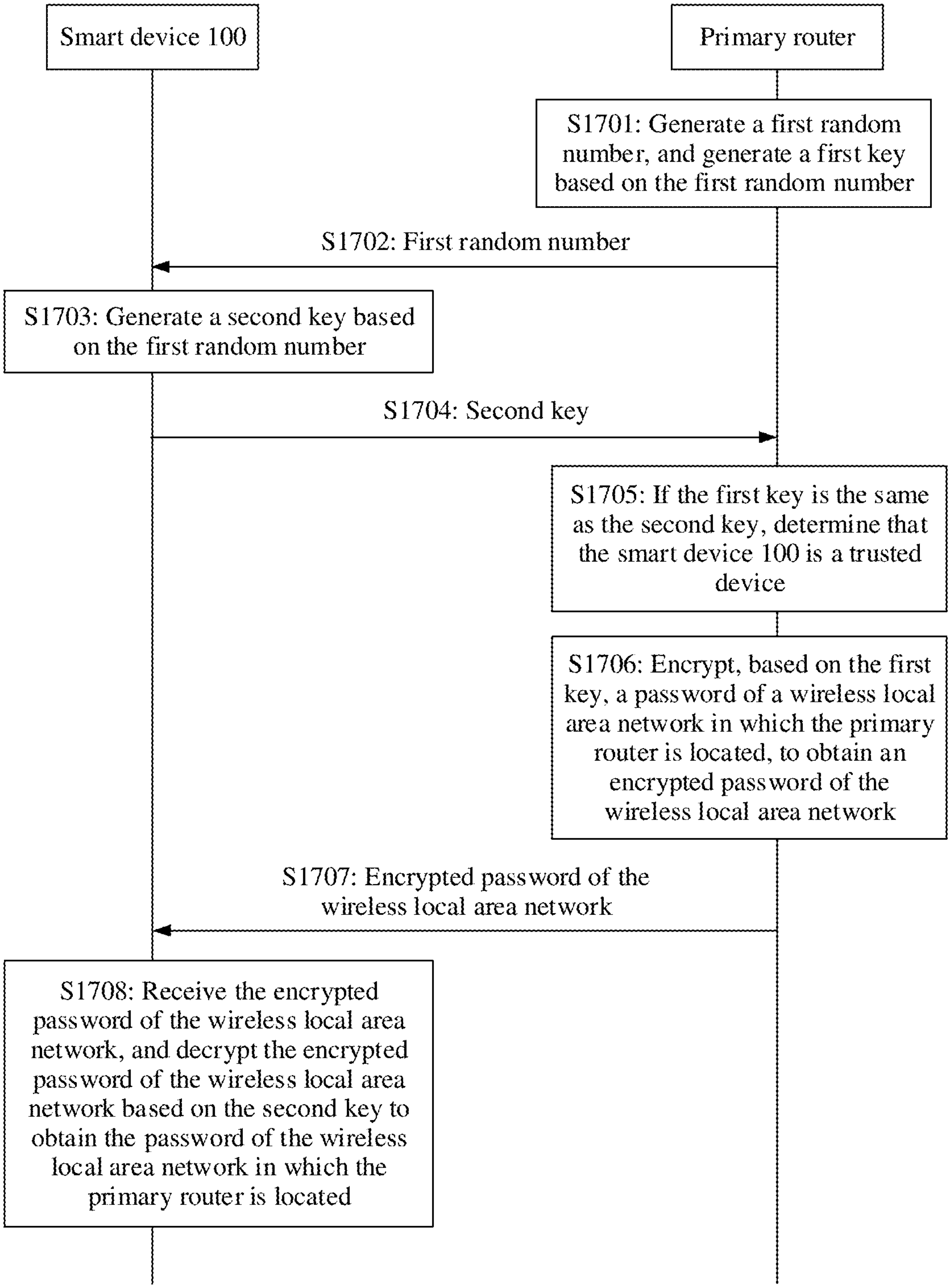
FIG. 17 shows an example of a process in which a smart device 100 negotiates with a primary router to transfer a password of a wireless local area network in which the primary router is located according to Embodiment 2 of this application.

FIG. 17 shows an example of a process in which the smart device 100 negotiates with the primary router to transfer the password of the wireless local area network in which the primary router is located according to Embodiment 2 of this application.

After a connection between the smart device 100 and the primary router is determined to be established, the primary router may no longer send a packet frame to the smart device 100 at ultra-low power, but send a packet frame at normal power. That is, in S1701 to S1708, the primary router may send a packet frame to the smart device 100 at normal power. The normal power is greater than the ultra-low power. Therefore, for example, in the entire network configuration process, the user only needs to ensure that the smart device 100 is close to the primary router within a short period of time after an indicator light of the primary router blinks (S1303), so that the smart device 100 and the primary router can complete the steps (S1304 to S1306) in which a networking connection is determined to be established within the short period of time. The short period of time may be several seconds, for example, within 5 seconds. In the steps after S1306, a packet frame may be transmitted between the smart device 100 and the primary router at normal power. In this case, the smart device 100 does not need to be always in a state of being close to the primary router.

S1701: The primary router generates a first random number, and generates a first key based on the first random number.

S1702: The primary router sends the first random number to the smart device 100.

S1703: The smart device 100 receives the first random number, and generates a second key based on the first random number.

S1704: The smart device 100 sends the second key to the primary router.

S1705: If the first key is the same as the second key, the primary router determines that the smart device 100 is a trusted device.

S1706: The primary router encrypts, based on the first key, the password of the wireless local area network in which the primary router is located, to obtain an encrypted password of the wireless local area network.

S1707: The primary router sends the encrypted password of the wireless local area network to the smart device 100.

S1708: The smart device 100 receives the encrypted password of the wireless local area network, and decrypts the encrypted password of the wireless local area network based on the second key to obtain the password of the wireless local area network in which the primary router is located.

The smart device 100 obtains the password of the wireless local area network in which the primary router is located, and the smart device 100 is connected, based on the name and the password of the wireless local area network in which the primary router is located, to the wireless local area network in which the primary router is located. The smart device 100 does not need to complete a process of parameter negotiation and parameter synchronization with the primary router as the smart device 100 does not need to form a mesh network with the primary router. That is, the smart device 100 is always in a STA mode, and the smart device 100 is only used as an access device of the primary router, and does not need to be in an AP mode as an access point of the another device. Therefore, the smart device 100 does not need to complete the process of parameter negotiation and parameter synchronization with the primary router.

The embodiment shown in FIG. 17 is similar to the embodiment shown in FIG. 11, and a difference lies in that, the embodiment shown in FIG. 11 describes a process in which the sub-router 3 negotiates with the primary router to transfer the password of the wireless local area network in which the primary router is located, and the embodiment shown in FIG. 17 describes a process in which the smart device 100 negotiates with the primary router to transfer the password of the wireless local area network in which the primary router is located. For a specific explanation of the embodiment shown in FIG. 17, refer to the embodiment shown in FIG. 11. Details are not described herein again in this embodiment of this application.

Figure 18:
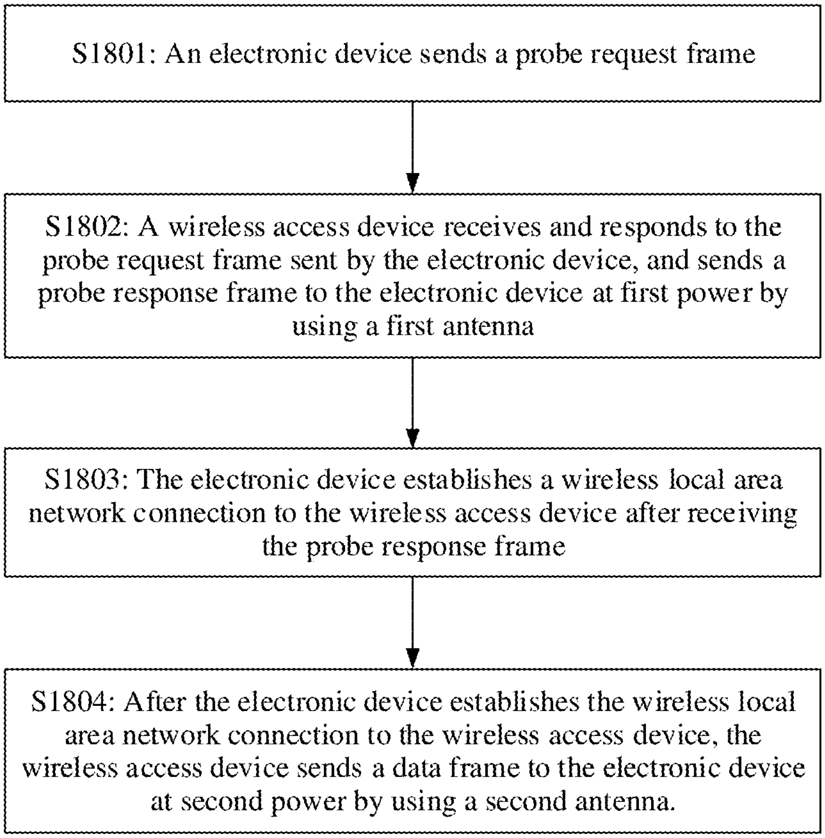
FIG. 18 shows an example of a schematic flowchart of a network configuration method according to an embodiment of this application.

FIG. 18 is a schematic flowchart of a network configuration method according to an embodiment of this application.

S1801: An electronic device sends a probe request frame.

The electronic device may be a sub-router 3, or may be a smart device 100.

The smart device 100 may be a smart home device, and the smart home device may be any one of the following: a smart light, a smart oven, a smart fan, a smart air conditioner, a smart television, a smart large screen, a smart band, a smart watch, a smart speaker, a smart refrigerator, a smart door or window, a smart car, a smart monitor, a smart robot, a smart camera, or the like.

The smart device 100 may alternatively be a terminal device, and the terminal device may be any one of the following: a mobile phone, a tablet computer, a smart screen, a desktop computer, a laptop computer, a handheld computer, a notebook computer, an ultra-mobile personal computer UMPC, or a netbook.

S1802: A wireless access device receives and responds to the probe request frame sent by the electronic device, and sends a probe response frame to the electronic device at first power by using a first antenna.

The wireless access device may be a primary router.

For how the wireless access device sends the probe response frame to the electronic device at the first power (ultra-low power) by using the first antenna, refer to the embodiments shown in FIG. 7A and FIG. 7B. Details are not described herein again in this embodiment of this application.

Optionally, the probe request frame includes a first probe request frame (a probe request frame 1) and a second probe request frame (a probe request frame 2), and the probe response frame includes a first probe response frame and a second probe response frame. That an electronic device sends a probe request frame includes: The electronic device sends the first probe request frame. That a wireless access device receives and responds to the probe request frame sent by the electronic device, and sends a probe response frame to the electronic device at first power by using a first antenna includes: The wireless access device receives and responds to the first probe request frame sent by the electronic device, and sends the first probe response frame to the electronic device at the first power by using the first antenna. That an electronic device sends a probe request frame includes: The electronic device receives and responds to the first probe response frame sent by the wireless access device, and sends the second probe request frame to the wireless access device. That a wireless access device receives and responds to the probe request frame sent by the electronic device, and sends a probe response frame to the electronic device at first power by using a first antenna further includes: The wireless access device receives and responds to the second probe request frame sent by the electronic device, and sends the second probe response frame to the electronic device at the first power by using the first antenna. That is, in the network configuration process, the wireless access device sends the first probe response frame and the second response frame at the ultra-low power (namely, the first power). In the network configuration process, the electronic device can receive the first probe response frame and the second response frame only when a distance between the electronic device and the wireless access device is close enough (for example, within a first distance). For details, refer to the embodiments shown in FIG. 7 and FIG. 13. Details are not described in this embodiment of this application again.

Optionally, the probe request frame includes a first probe request frame, and the probe response frame includes a first probe response frame. That an electronic device sends a probe request frame includes: The electronic device sends the first probe request frame. That a wireless access device receives and responds to the probe request frame sent by the electronic device, and sends a probe response frame to the electronic device at first power by using a first antenna includes: The wireless access device receives and responds to the first probe request frame sent by the electronic device, and sends the first probe response frame to the electronic device at the first power by using the first antenna. Before the electronic device establishes a wireless local area network connection to the wireless access device, the method further includes: The electronic device receives and responds to the first probe response frame sent by the wireless access device, and sends the second probe request frame to the wireless access device; and the wireless access device receives and responds to the second probe request frame sent by the electronic device, and sends the second probe response frame to the electronic device at second power (normal power) by using the second antenna. That is, the wireless access device only sends the first probe response frame at ultra-low power (for example, the first power). In this way, in a network configuration process between the electronic device and the wireless access device, after receiving a probe response frame 1 sent by the wireless access device at the first power, the electronic device does not need to continue to be in a state of being close to the wireless access device, and duration in which the electronic device needs to be in the state of being close to the primary router in the network configuration process can be reduced. For details, refer to the embodiments shown in FIG. 8 and FIG. 14. Details are not described in this embodiment of this application again.

Optionally, the probe request frame includes a second probe request frame, and the probe response frame includes a second probe response frame. Before the electronic device sends the probe request frame, the electronic device sends the first probe request frame. The wireless access device receives and responds to the first probe request frame sent by the electronic device, and sends the first probe response frame to the electronic device at the second power by using the second antenna. That an electronic device sends a probe request frame includes: The electronic device receives and responds to the first probe response frame sent by the wireless access device, and sends the second probe request frame to the wireless access device. That a wireless access device receives and responds to the probe request frame sent by the electronic device, and sends a probe response frame to the electronic device at first power by using a first antenna further includes: The wireless access device receives and responds to the second probe request frame sent by the electronic device, and sends the second probe response frame to the electronic device at the first power by using the first antenna. That is, the wireless access device only sends the second probe response frame at ultra-low power (for example, the first power). In this way, the electronic device does not need to be in the state of being close to the wireless access device at a timepoint other than a timepoint at which the second probe response frame is received, so that duration in which the electronic device needs to be in the state of being close to the wireless access device can be reduced. For details, refer to the embodiments shown in FIG. 9 and FIG. 15. Details are not described in this embodiment of this application again.

Optionally, the first probe request frame includes a network configuration information element of the electronic device, the first probe response frame includes a basic service set identifier of the wireless access device, and the second probe request frame includes the basic service set identifier of the wireless access device. The second probe response frame includes a password transmission mode negotiation capability identifier and a media access control address of the electronic device. The first probe request frame is used by another electronic device near the electronic device to discover an electronic device in a to-be-network-configured state. The first probe request frame may be sent by the electronic device in a broadcast manner. In a possible implementation, the electronic device periodically sends the first probe request frame. The electronic device stops sending the first probe request frame until the electronic device receives the first probe response frame.

The first probe request frame is used by another electronic device near the electronic device to discover an electronic device in a to-be-network-configured state. The first probe request frame may be sent by the electronic device in a broadcast manner.

Optionally, the electronic device periodically sends the first probe request frame. The electronic device stops sending the first probe request frame until the electronic device receives the first probe response frame.

Optionally, before the wireless access device sends the probe response frame to the electronic device at the first power by using the first antenna, only the wireless access device receives the first probe request frame, and enables a network configuration indicator light of the wireless access device to blink. In this way, the blinking of the network configuration indicator light of the wireless access device may be used as prompt information, to prompt the user that the wireless access device discovers a device in a to-be-network-configured state.

Optionally, before the electronic device sends the first probe request frame, when the electronic device is a terminal device, the electronic device displays a first user interface, where the first user interface includes a first icon; the electronic device receives a second operation performed by the user on the first icon in the first user interface; and the electronic device sends the first probe request frame in response to the second operation.

Optionally, before the electronic device sends the first probe request frame, when the electronic device is a wireless access device or a smart home device, the electronic device receives a first operation performed by a user on a first button on the electronic device; and the electronic device sends the first probe request frame to the wireless access device in response to the first operation.

The first probe response frame is used to notify the electronic device that the wireless access device discovers the electronic device in the to-be-network-configured state. The first probe response frame may be sent by the wireless access device in a unicast manner.

In a possible implementation, the wireless access device periodically sends the first probe response frame. Every time the wireless access device receives the first probe request frame once, the wireless access device sends the first probe response frame once.

The second probe request frame is used by the electronic device to send a connection establishment request to the wireless access device. The second probe request frame may be sent by the electronic device in a unicast manner.

Optionally, the electronic device periodically sends the second probe request frame. The electronic device stops sending the second probe request frame until the electronic device receives the second probe response frame.

The second probe response frame is used to notify the electronic device that the wireless access device agrees to establish a connection to the electronic device. The second probe response frame may be sent by the wireless access device in a unicast manner.

Optionally, if the distance between the electronic device and the wireless access device exceeds the first distance, the electronic device receives no second probe response frame sent by the wireless access device at ultra-low power. In this case, the wireless access device may receive and respond to the first user operation (for example, an operation of pressing a network configuration button), and send the second probe response frame at normal power. In this way, even if the distance between the electronic device and the wireless access device exceeds the first distance, the second probe response frame sent by the wireless access device at the normal power (namely, the second power) can be received.

S1803: The electronic device establishes a wireless local area network connection to the wireless access device after receiving the probe response frame.

After the electronic device receives the probe response frame and before the electronic device establishes the wireless local area network connection to the wireless access device, the wireless access device determines a first key through negotiation with the electronic device. The wireless access device encrypts based on the first key, a password of a wireless local area network in which the wireless access device is located to obtain an encrypted password, and sends the encrypted password to the electronic device. After receiving the encrypted password, the electronic device decrypts the encrypted password based on the first key to obtain the password of the wireless local area network in which the wireless access device is located. The electronic device establishes the wireless local area network connection to the wireless access device based on the password of the wireless local area network in which the wireless access device is located.

Optionally, that the wireless access device determines a first key through negotiation with the electronic device may include the following steps: The wireless access device generates a first random number before determining the first key through negotiation with the electronic device; the wireless access device generates a key 1 (the first key) based on the first random number; the wireless access device sends the first random number to the electronic device; after receiving the first random number, the electronic device generates a key 2 (a second key) based on the first random number; the electronic device further sends the key 2 to the wireless access device; and the wireless access device uses the key 1 as the first key after determining that the key 1 is the same as the key 2. In this way, the electronic device and the wireless access device transmit, by using the first key, the password of the wireless local area network in which the wireless access device is located, to ensure security of information transmission between the electronic device and the wireless access device, and avoid leakage of the password of the wireless local area network in which the wireless access device is located. For details, refer to the embodiments shown in FIG. 11 and FIG. 17. Details are not described in this embodiment of this application again.

Optionally, when a device type of the electronic device is a router, after the electronic device establishes the wireless local area network connection to the wireless access device, the electronic device synchronizes parameter information with the wireless access device through negotiation, where the parameter information includes one or more of the following: a frequency band of the wireless access device, a channel type of the wireless access device, and a data transmission rate of the wireless access device.

In a possible implementation, that the electronic device synchronizes parameter information with the wireless access device through negotiation may include the following steps: The electronic device sends a parameter negotiation request to the wireless access device after establishing the wireless local area network connection to the wireless access device. The wireless access device sends a first parameter type set to the electronic device in response to the parameter negotiation request. The electronic device is further configured to: receive the first parameter type set, and determine a third parameter type set based on the first parameter type set and a second parameter type set. The third parameter type set includes one or more parameters. The electronic device sends an identifier/identifiers of one or more parameters in the third parameter type set to the wireless access device. The wireless access device receives the identifier/identifiers of the one or more parameters in the third parameter type set. The wireless access device determines, based on the identifier/identifiers of the one or more parameters in the third parameter type set, a value/values of the one or more parameters of the wireless access device in the third parameter type set. The wireless access device sends the value/values of the one or more parameters of the wireless access device in the third parameter type set to the electronic device. The electronic device is further configured to receive the value/values of the one or more parameters in the third parameter type set from the wireless access device. The electronic device is further configured to determine a common value of the value/values of the one or more parameters of the third parameter type between the electronic device and the wireless access device based on the value/values of the one or more parameters of the electronic device in the third parameter type set and the value/values of the one or more parameters of the wireless access device in the third parameter type set. The electronic device sets the common value of the value/values of the one or more parameters of the electronic device and the wireless access device in the third parameter type to the value/values of the one or more parameters of the electronic device in the third parameter type. In this way, it is ensured that after the electronic device establishes a networking connection to the wireless access device, parameter information of the electronic device is consistent with parameter information of the wireless access device. In this way, the electronic device and the wireless access device can form a mesh network. For details, refer to the embodiment shown in FIG. 12. Details are not described in this embodiment of this application again.

Optionally, after the electronic device establishes the wireless local area network connection to the wireless access device, steady-on of the network configuration indicator light of the wireless access device may be used as prompt information, to prompt the user that network configuration between the device in the to-be-network-configured state and the wireless access device succeeds.

S1804: After the electronic device establishes the wireless local area network connection to the wireless access device, the wireless access device sends a data frame to the electronic device at the second power by using the second antenna.

That is, the wireless access device sends specific information (for example, a probe response frame) at the first power (ultra-low power) by using the first antenna only in the network configuration process. After the electronic device establishes the wireless local area network connection to the wireless access device, the wireless access device sends a data frame to the electronic device at the second power (normal power) by using the second antenna.

The first antenna and the second antenna may be a same antenna or may be two antennas, and the first power is less than the second power.

When the first antenna and the second antenna are a same antenna, the antenna needs to be multiplexed in a time division manner. Specifically, for a description of the antenna, refer to the description of the antenna 504 in FIG. 5. Details are not described in this embodiment of this application again.

Optionally, a coverage area of a signal that is sent by the wireless access device at the first power by using the first antenna is less than a coverage area of a signal that is sent by the wireless access device at the second power by using the second antenna. The wireless access device sends the probe response frame at ultra-low power (namely, the first power) only in the network configuration process. In this way, the probe response frame sent by the wireless access device at the ultra-low power (namely, the first power) can be received only when the distance between the electronic device and the wireless access device is close enough.

Optionally, when a distance between the electronic device and the wireless access device is less than a first distance, the electronic device is at a location at which the probe response frame and the data frame can be received; and when the distance between the electronic device and the wireless access device is greater than the first distance, the electronic device is at a location at which the probe response frame cannot be received but the data frame can be received. In this way, in the network configuration process, only when the distance between the electronic device and the wireless access device is close enough (for example, within the first distance), it may be considered that the electronic device has an intention of joining a wireless local area network in which the wireless access device is located. In this case, the electronic device can complete the network configuration process with the wireless access device.

Optionally, when the distance between the electronic device and the wireless access device is less than the first distance and a location of the electronic device is not moved, power of the probe response frame received by the electronic device is lower than power of the data frame received by the electronic device. In this way, in the network configuration process, the wireless access device sends the probe response frame at the ultra-low power (namely, the first power), to ensure that only an electronic device close to the wireless access device can receive the probe response frame. After the network configuration is completed, when the location of the electronic device is not moved, the electronic device receives, at a same location, a data frame sent by the wireless access device at the normal power (namely, the second power). Power of the probe response frame received by the electronic device is lower than power of the received data frame.

Optionally, when the wireless access device sends the probe response frame at the ultra-low power (namely, the first power), power of a power supply signal of a radio frequency link in the wireless access device is third power. When the wireless access device sends the data frame at the normal power (namely, the second power), the power of the power supply signal of the radio frequency link in the wireless access device is fourth power. The third power is less than the fourth power.

According to the method, first, it is implemented that the user does not need to perform manual intervention on the wireless access device or manually enter a primary router password on the electronic device, and only needs to make the electronic device close to the wireless access device, so that when the distance between the electronic device and the wireless access device is close enough (for example, within the first distance), the electronic device can automatically establish a wireless local area network connection to the wireless access device, and a user operation is simple. Second, the wireless access device sends a message to an electronic device that is being network-configured only at ultra-low power (namely, the first power) in the network configuration process, and when the wireless access device sends the message to the electronic device at the ultra-low power (namely, the first power), the wireless access device may send a message to another electronic device that is connected to the wireless access device at normal power (namely, the second power). In this way, normal services of the another electronic device connected to the wireless access device are not affected.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, wherein the method is applied to a system comprising an electronic device and a wireless access device, and the method comprises:

sending, by the electronic device, a probe request frame;

receiving, by the wireless access device, the probe request frame sent by the electronic device;

sending, by the wireless access device, a probe response frame to the electronic device at first power by using a first antenna, wherein the probe response frame excludes password information, and the wireless access device sends the probe response frame without signal strength measurement;

sending, by the electronic device, a second probe request frame;

receiving, by the wireless access device, the second probe request frame; and sending, by the wireless access device, a second probe response frame to the electronic device at the first power by using the first antenna, the second probe response frame indicating a password mode negotiation capability identifier;

after the sending the second probe response frame, performing password transfer negotiation between the electronic device and the wireless access device;

establishing, by the electronic device, a wireless local area network connection to the wireless access device after receiving the second probe response frame; and after the electronic device establishes the wireless local area network connection to the wireless access device, sending, by the wireless access device, a data frame to the electronic device at second power by using a second antenna, wherein the first antenna and the second antenna are a same antenna or two antennas, and the first power is less than the second power.

2. The method according to claim 1, wherein a first coverage area of a first signal that is sent by the wireless access device at the first power by using the first antenna is less than a second coverage area of a second signal that is sent by the wireless access device at the second power by using the second antenna.

3. The method according to claim 1, wherein a distance between the electronic device, the wireless access device is less than a first distance, and the electronic device is at a first location at which the probe response frame and the data frame can be received, or wherein the distance between the electronic device, the wireless access device is greater than the first distance, and the electronic device is at a second location at which the probe response frame cannot be received but the data frame can be received.

4. The method according to claim 3, wherein the distance between the electronic device and the wireless access device is less than the first distance, a location of the electronic device is not moved, and power of the probe response frame received by the electronic device is lower than power of the data frame received by the electronic device.

5. A method, wherein the method is applied to an electronic device, and the method comprises:

sending a probe request frame;

receiving a probe response frame from a wireless access device at first power by using a first antenna, wherein the probe response frame excludes password information;

sending a second probe request frame to the wireless access device;

receiving a second probe response frame from the wireless access device at the first power by using the first antenna, the second probe response frame indicating a password mode negotiation capability identifier;

after the receiving the probe response frame, performing password transfer negotiation with the wireless access device;

establishing a wireless local area network connection to the wireless access device after receiving the second probe response frame; and after the establishing the wireless local area network connection to the wireless access device, receiving a data frame from the wireless access device at second power by using a second antenna, wherein the first antenna and the second antenna are a same antenna or two antennas, and the first power is less than the second power.

6. The method according to claim 5, wherein a first coverage area of a first signal that is sent by the wireless access device at the first power by using the first antenna is less than a second coverage area of a second signal that is sent by the wireless access device at the second power by using the second antenna.

7. The method according to claim 5, wherein a distance between the electronic device, the wireless access device is less than a first distance, and the electronic device is at a first location at which the probe response frame and the data frame can be received, or wherein the distance between the electronic device, the wireless access device is greater than the first distance, and the electronic device is at a second location at which the probe response frame cannot be received but the data frame can be received.

8. The method according to claim 7, wherein the distance between the electronic device and the wireless access device is less than the first distance, a location of the electronic device is not moved, and power of the probe response frame received by the electronic device is lower than power of the data frame received by the electronic device.

9. The method according to claim 5, wherein the probe request frame comprises a first probe request frame and a second third probe request frame, and the probe response frame comprises a first probe response frame and a second third probe response frame;

the sending the probe request frame comprises:

sending the first probe request frame;

the receiving the probe response frame from the wireless access device at the first power by using the first antenna comprises:

receiving the first probe response frame from the wireless access device at the first power by using the first antenna;

the sending the probe request frame further comprises:

sending the second third probe request frame to the wireless access device in response to the first probe response frame from the wireless access device; and the receiving the probe response frame from the wireless access device at the first power by using the first antenna further comprises:

receiving the second third probe response frame from the wireless access device at the first power by using the first antenna.

10. The method according to claim 5, wherein the probe request frame comprises a first probe request frame, and the probe response frame comprises a first probe response frame;

the sending the probe request frame comprises:

sending the first probe request frame;

the receiving the probe response frame from the wireless access device at the first power by using the first antenna comprises:

receiving the first probe response frame from the wireless access device at the first power by using the first antenna; and before the establishing the wireless local area network connection to the wireless access device, the method further comprises:

sending a second third probe request frame to the wireless access device in response to the first probe response frame from the wireless access device; and receiving a second third probe response frame from the wireless access device at the second power by using the second antenna.

11. The method according to claim 5, wherein the probe request frame comprises a second third probe request frame, and the probe response frame comprises a second third probe response frame;

before the sending the probe request frame, the method further comprises:

sending a first probe request frame; and receiving a first probe response frame from the wireless access device at the second power by using the second antenna;

the sending the probe request frame comprises:

sending the second third probe request frame to the wireless access device in response to the first probe response frame sent by the wireless access device; and the receiving the probe response frame from the wireless access device at the first power by using the first antenna comprises:

receiving the second third probe response frame from the wireless access device at the first power by using the first antenna.

12. The method according to claim 5, wherein a device type of the electronic device is a router, and wherein, after the establishing the wireless local area network connection to the wireless access device, the method further comprises:

synchronizing parameter information with the wireless access device through negotiation, wherein the parameter information comprises one or more of: a frequency band of the wireless access device, a channel type of the wireless access device, or a data transmission rate of the wireless access device.

13. A method, wherein the method is applied to a wireless access device, and the method comprises:

receiving a probe request frame from an electronic device;

sending a probe response frame to the electronic device at first power by using a first antenna, wherein the probe response frame excludes password information, and the probe response frame is sent without signal strength measurement;

receiving a second probe request frame from the electronic device;

sending a second probe response frame to the electronic device at the first power by using the first antenna, the second probe response frame indicating a password mode negotiation capability identifier;

after the sending the second probe response frame, performing password transfer negotiation with the electronic device;

establishing a wireless local area network connection to the electronic device; and after the establishing the wireless local area network connection to the electronic device, sending a data frame to the electronic device at second power by using a second antenna, wherein the first antenna and the second antenna are a same antenna or two antennas, and the first power is less than the second power.

14. The method according to claim 13, wherein a first coverage area of a first signal that is sent by the wireless access device at the first power by using the first antenna is less than a second coverage area of a second signal that is sent by the wireless access device at the second power by using the second antenna.

15. The method according to claim 13, wherein a distance between the wireless access device, the electronic device is less than a first distance, and the electronic device is at a first location at which the probe response frame and the data frame can be received, or wherein the distance between the wireless access device, the electronic device is greater than the first distance, and the electronic device is at a second location at which the probe response frame cannot be received but the data frame can be received.

16. The method according to claim 15, wherein the distance between the electronic device, the wireless access device is less than the first distance and a location of the electronic device is not moved, and power of the probe response frame received by the electronic device is lower than power of the data frame received by the electronic device.

17. The method according to claim 13, wherein the probe request frame comprises a first probe request frame and a second third probe request frame, and the probe response frame comprises a first probe response frame and a second third probe response frame;

the receiving the probe request frame from the electronic device comprises:

receiving the first probe request frame from the electronic device;

the sending the probe response frame to the electronic device at the first power by using the first antenna comprises:

sending the first probe response frame to the electronic device at the first power by using the first antenna;

the receiving the probe request frame from the electronic device further comprises:

receiving the second third probe request frame from the electronic device; and the sending the probe response frame to the electronic device at the first power by using the first antenna further comprises:

sending the second third probe response frame to the electronic device at the first power by using the first antenna.

18. The method according to claim 13, wherein the probe request frame comprises a first probe request frame, and the probe response frame comprises a first probe response frame;

the receiving the probe request frame from the electronic device comprises:

receiving the first probe request frame from the electronic device;

the sending the probe response frame to the electronic device at the first power by using the first antenna comprises:

sending the first probe response frame to the electronic device at the first power by using the first antenna; and before the establishing the wireless local area network connection to the electronic device, the method further comprises:

receiving a second third probe request frame from the electronic device, and sending a second third probe response frame to the electronic device at the second power by using the second antenna.

19. The method according to claim 13, wherein the probe request frame comprises a second third probe request frame, and the probe response frame comprises a second third probe response frame;

before the receiving the probe request frame from the electronic device, the method further comprises:

receiving a first probe request frame from the electronic device, and sending a first probe response frame to the electronic device at the first power by using the first antenna;

the receiving the probe request frame from the electronic device comprises:

receiving and responding to the second third probe request frame from the electronic device; and the sending the probe response frame to the electronic device at the first power by using the first antenna comprises:

sending the second third probe response frame to the electronic device at the first power by using the first antenna.

20. The method according to claim 13, wherein a device type of the electronic device is a router, and wherein, after the establishing the wireless local area network connection to the electronic device, the method further comprises:

synchronizing parameter information with the electronic device through negotiation, wherein the parameter information comprises one or more of: a frequency band of the wireless access device, a channel type of the wireless access device, or a data transmission rate of the wireless access device.

* * * * *